US011494582B2

(12) United States Patent
Franca-Neto

(10) Patent No.: US 11,494,582 B2
(45) Date of Patent: Nov. 8, 2022

(54) CONFIGURABLE NEURAL NETWORK ENGINE OF TENSOR ARRAYS AND MEMORY CELLS

(71) Applicant: Western Digital Technologies, Inc., San Jose, CA (US)

(72) Inventor: Luiz M. Franca-Neto, Sunnyvale, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 751 days.

(21) Appl. No.: 16/233,876

(22) Filed: Dec. 27, 2018

(65) Prior Publication Data

US 2019/0244085 A1 Aug. 8, 2019

Related U.S. Application Data

(60) Provisional application No. 62/633,372, filed on Feb. 21, 2018, provisional application No. 62/628,168, filed on Feb. 8, 2018.

(51) Int. Cl.
*G06N 3/04* (2006.01)
*G06K 9/62* (2022.01)
(Continued)

(52) U.S. Cl.
CPC ......... *G06K 9/6217* (2013.01); *G06K 9/6215* (2013.01); *G06N 3/04* (2013.01);
(Continued)

(58) Field of Classification Search
CPC ............. G06K 9/6217; G06K 9/00973; G06K 9/6215; G06K 9/6262; G06K 9/00986;
(Continued)

(56) References Cited

U.S. PATENT DOCUMENTS 5,091,864 A 2/1992 Baji et al.
5,138,695 A 8/1992 Means et al.
(Continued)

FOREIGN PATENT DOCUMENTS

AU 197131902 A 2/1973
BE 771045 A 12/1971
(Continued)

OTHER PUBLICATIONS

Written Opinion from International Application No. PCT/US2018/066593, dated Mar. 29, 2019, 8 pages.
(Continued)

*Primary Examiner* — David R Vincent
(74) *Attorney, Agent, or Firm* — Barry IP Law, P.C.

(57) ABSTRACT

Devices and methods for performing computations of a neural network include determining, for a particular layer of the neural network, a number of input channels and a number of output maps generated for particular pixels of a plurality of pixels. A portion of a processing chip is configured into a plurality of processing units, with the processing chip including a plurality of tensor arrays and a plurality memory cells. A particular processing unit of the plurality of processing units performs computations associated with a particular pixel. Individual processing units of the plurality of processing units each include a number of tensor arrays determined based on the number of input channels and a number of memory cells or pixel arrays corresponding to a number of output maps. The plurality of processing units is assigned to perform computations of the particular layer.

20 Claims, 32 Drawing Sheets

(51) Int. Cl.
  *G06N 3/08* (2006.01)
  *G06T 5/00* (2006.01)
  *G06V 10/94* (2022.01)
  *G06N 3/063* (2006.01)

(52) U.S. Cl.
  CPC .......... *G06N 3/0445* (2013.01); *G06N 3/063* (2013.01); *G06N 3/08* (2013.01); *G06N 3/084* (2013.01); *G06T 5/00* (2013.01); *G06V 10/94* (2022.01); *G06K 9/6262* (2013.01); *G06T 2207/20081* (2013.01); *G06T 2207/20084* (2013.01)

(58) Field of Classification Search
  CPC ........ G06N 3/063; G06N 3/08; G06N 3/0445; G06N 3/084; G06N 3/04; G06N 3/0454; G06T 5/00; G06T 2207/20084; G06T 2207/20081
  See application file for complete search history.

(56) References Cited

U.S. PATENT DOCUMENTS

| | | | |
|---|---|---|---|
| 5,226,092 A | 7/1993 | Chen | |
| 5,337,395 A | 8/1994 | Vassiliadis | |
| 5,509,106 A | 4/1996 | Pechanek et al. | |
| 5,519,811 A | 5/1996 | Yoneda et al. | |
| 5,627,943 A | 5/1997 | Yoneda et al. | |
| 5,659,781 A | 8/1997 | Larson | |
| 5,799,134 A | 8/1998 | Chiueh et al. | |
| 5,812,993 A | 9/1998 | Ginosar et al. | |
| 7,085,749 B2 | 8/2006 | Matsugu | |
| 7,437,339 B2 | 10/2008 | Matsugu | |
| 7,489,834 B2 | 2/2009 | Kloth | |
| 7,564,996 B2 | 7/2009 | Kloth | |
| 7,743,004 B2 | 6/2010 | Matsugu | |
| 8,392,683 B1 | 3/2013 | Confalonieri | |
| 8,724,624 B2 | 5/2014 | Bazlamacci et al. | |
| 8,824,603 B1 | 9/2014 | Ge et al. | |
| 9,665,799 B1 | 5/2017 | Munteanu et al. | |
| 9,697,463 B2 | 7/2017 | Ross et al. | |
| 9,710,748 B2 | 7/2017 | Ross et al. | |
| 9,721,203 B1 | 8/2017 | Young et al. | |
| 9,747,548 B2 | 8/2017 | Ross et al. | |
| 9,805,303 B2 | 10/2017 | Ross et al. | |
| 9,928,460 B1 | 3/2018 | Nowatzyk et al. | |
| 9,959,500 B1 | 5/2018 | Torng et al. | |
| 10,019,668 B1 | 7/2018 | Woo | |
| 10,043,095 B2 | 8/2018 | Yang et al. | |
| 10,074,051 B2 | 9/2018 | Thorson et al. | |
| 10,083,171 B1 | 9/2018 | Yang et al. | |
| 10,083,395 B2 | 9/2018 | Young | |
| 10,102,453 B1 | 10/2018 | Yang et al. | |
| 10,459,849 B1 | 10/2019 | Shorb et al. | |
| 10,521,488 B1 | 12/2019 | Ross et al. | |
| 10,790,828 B1 | 9/2020 | Gunter et al. | |
| 10,817,802 B2 | 10/2020 | Bruestle et al. | |
| 2003/0004907 A1 | 1/2003 | Matsugu | |
| 2004/0156546 A1 | 8/2004 | Kloth | |
| 2004/0156547 A1 | 8/2004 | Kloth | |
| 2007/0011120 A1 | 1/2007 | Matsugu | |
| 2008/0270335 A1 | 10/2008 | Matsugu | |
| 2011/0029471 A1 | 2/2011 | Chakradhar et al. | |
| 2012/0257506 A1 | 10/2012 | Bazlamacci et al. | |
| 2014/0270494 A1 | 9/2014 | Sawhney et al. | |
| 2014/0289445 A1 | 9/2014 | Savich | |
| 2015/0006444 A1 | 1/2015 | Tamatsu et al. | |
| 2015/0112911 A1 | 4/2015 | Jackson et al. | |
| 2015/0170021 A1 | 6/2015 | Lupon et al. | |
| 2015/0178246 A1 | 6/2015 | Abellanas et al. | |
| 2016/0142731 A1 | 5/2016 | Nakagami et al. | |
| 2016/0342889 A1 | 11/2016 | Thorson et al. | |
| 2016/0342893 A1 | 11/2016 | Ross et al. | |
| 2017/0103313 A1 | 4/2017 | Ross et al. | |
| 2017/0103314 A1 | 4/2017 | Ross | |
| 2017/0103318 A1 | 4/2017 | Ross et al. | |
| 2017/0147942 A1 | 5/2017 | Gao et al. | |
| 2018/0005115 A1 | 1/2018 | Gokmen et al. | |
| 2018/0032835 A1 | 2/2018 | Shirahata | |
| 2018/0075350 A1 | 3/2018 | Gokmen | |
| 2018/0101743 A1 | 4/2018 | Yang et al. | |
| 2018/0101747 A1 | 4/2018 | Yang et al. | |
| 2018/0101748 A1 | 4/2018 | Yang et al. | |
| 2018/0107921 A1 | 4/2018 | Ross et al. | |
| 2018/0129936 A1 | 5/2018 | Young et al. | |
| 2018/0157465 A1 | 6/2018 | Bittner et al. | |
| 2018/0157940 A1 | 6/2018 | Yang et al. | |
| 2018/0165577 A1 | 6/2018 | Young et al. | |
| 2018/0173441 A1 | 6/2018 | Cargnini et al. | |
| 2018/0174031 A1 | 6/2018 | Yang et al. | |
| 2018/0189595 A1 | 7/2018 | Yang et al. | |
| 2018/0189642 A1 | 7/2018 | Boesch et al. | |
| 2018/0189648 A1 | 7/2018 | Sengupta et al. | |
| 2018/0247113 A1 | 8/2018 | Yang et al. | |
| 2018/0268234 A1 | 9/2018 | Yang et al. | |
| 2018/0285005 A1 | 10/2018 | Torng et al. | |
| 2018/0285006 A1 | 10/2018 | Torng et al. | |
| 2018/0285713 A1 | 10/2018 | Torng et al. | |
| 2018/0285714 A1 | 10/2018 | Torng et al. | |
| 2018/0285720 A1 | 10/2018 | Torng et al. | |
| 2018/0285722 A1 | 10/2018 | Torng et al. | |
| 2018/0285723 A1 | 10/2018 | Torng et al. | |
| 2018/0307438 A1 | 10/2018 | Huang et al. | |
| 2018/0307980 A1 | 10/2018 | Barik et al. | |
| 2018/0309050 A1 | 10/2018 | Torng et al. | |
| 2018/0314671 A1 | 11/2018 | Zhang et al. | |
| 2018/0336164 A1 | 11/2018 | Phelps et al. | |
| 2019/0042918 A1 | 2/2019 | Meyer et al. | |
| 2019/0043203 A1* | 2/2019 | Fleishman | G06N 3/04 |
| 2019/0073259 A1* | 3/2019 | Qin | G06N 3/063 |
| 2019/0114499 A1* | 4/2019 | Delaye | G06F 17/153 |
| 2019/0114548 A1 | 4/2019 | Wu et al. | |
| 2019/0121889 A1 | 4/2019 | Gold et al. | |
| 2019/0156187 A1 | 5/2019 | Dasari et al. | |
| 2019/0179795 A1* | 6/2019 | Huang | G06N 3/10 |
| 2019/0236049 A1* | 8/2019 | Vantrease | G06F 17/16 |
| 2019/0317901 A1 | 10/2019 | Kachare et al. | |
| 2020/0073726 A1 | 3/2020 | Lee et al. | |
| 2020/0127685 A1 | 4/2020 | Chen et al. | |
| 2020/0133531 A1 | 4/2020 | Subramaniam et al. | |
| 2020/0134462 A1 | 4/2020 | Gupta et al. | |
| 2020/0293866 A1 | 9/2020 | Guo | |
| 2020/0327367 A1* | 10/2020 | Ma | G06N 3/04 |
| 2020/0387798 A1* | 12/2020 | Hewage | G06N 3/08 |

FOREIGN PATENT DOCUMENTS

| | | | |
|---|---|---|---|
| CA | 930619 A1 | 7/1973 | |
| DE | 2139302 C3 | 10/1978 | |
| EP | 3373210 A1 | 9/2018 | |
| FR | 2104032 A5 | 4/1972 | |
| GB | 1316899 A | 5/1973 | |
| IL | 37434 A | 1/1974 | |
| KR | 197900473 B1 | 5/1979 | |
| SE | 361090 B | 10/1973 | |
| WO | WO 2017/006512 | 1/2017 | |
| WO | 2019075267 A1 | 4/2019 | |

OTHER PUBLICATIONS

Written Opinion from International Application No. PCT/US2018/066917, dated Mar. 29, 2019, 8 pages.

Pending U.S. Appl. No. 15/981,624, filed May 16, 2018, entitled "Systolic Neural Network Engine Capable of Forward Propagation", Luiz M. Franca-Neto.

Pending U.S. Appl. No. 15/981,679, filed May 16, 2018, entitled "Systolic Neural Network Engine With Crossover Connection Optimization", Luiz M. Franca-Neto.

Pending U.S. Appl. No. 15/981,711, filed May 16, 2018, entitled "Convolution Engines for Systolic Neural Network Processor", Luiz M. Franca-Neto.

(56) References Cited

OTHER PUBLICATIONS

Pending U.S. Appl. No. 15/981,719, filed May 16, 2018, entitled "Systolic Neural Network Processor With Feedback Control", Franca-Neto et al.
Pending U.S. Appl. No. 15/981,735, filed May 16, 2018, entitled "Multi-Core Systolic Processor System for Neural Networkprocessing", Luiz M. Franca-Neto.
Pending U.S. Appl. No. 16/233,968, filed Dec. 27, 2018, entitled "Reconfigurable Systolic Neural Network Engine", Luiz M Franca-Neto.
Pending U.S. Appl. No. 15/981,664, filed May 16, 2018, entitled "Systolic Neural Network Engine Capable of Backpropagation", Luiz M. Franca-Neto.
Pending U.S. Appl. No. 16/234,166, filed Dec. 27, 2018, entitled "Adjusting Enhancement Coefficients for Neural Network Engine", Luiz M. Franca-Neto.
Pending U.S. Appl. No. 16/234,184, filed Dec. 27, 2018, entitled "Configurable Neural Network Engine for Convolutional Filter Sizes", Luiz M. Franca-Neto.
Pending U.S. Appl. No. 16/363,744, filed Mar. 25, 2019, entitled "Enhanced Storage Device Memory Architecture for Machine Learning", Luiz M. Franca-Neto.
Pending U.S. Appl. No. 16/363,661, filed Mar. 25, 2019, entitled "Enhanced Memory Device Architecture for Machine Learning", Luiz M. Franca-Neto.
Chen et al., "Eyeriss: A Spatial Architecture for Energy-Efficient Dataflow for Convolutional Neural Networks", 2016, 2016 ACM/IEEE 43rd Annual International Symposium on Computer Architecture (ISCA), pp. 367-379, doi: 10.1109/ISCA.2016.40. (Year 2016).
Gokmen et al., "Training Deep Convolutional Neural Networks with Resistive Cross-Point Devices", Oct. 1, 20170, Front. Neurosci. 11 :538. doi: 10.3389/fnins.2017.00538 (Year: 2017).
James E. Smith, "Decoupled Access/Execute Computer Architectures", Apr. 1982, SIGARCH Comput Archit News 10, 3 (Apr. 1982), 112-119. DOI:https://doi.org/10.1145/1067649.801719(Year: 1982).
Jones et al., "Learning in Linear Systolic Neural Network Engines: Analysis and Implementation", Jul. 1994, IEEE Transactions on Neural Networks, vol. 5, No. 4, p. 584-593(Year: 1994).
Norman P. Jouppi, Cliff Young, Nishant Patil, David Patterson, et al., "In-Datacenter Performance Analysis of a Tensor Processing Unit", Jun. 24-28, 2017, In Proceedings of ISCA'17, 12 pages. (Year: 2017).
Ogunmolu et al.; "Nonlinear Systems Identification Using Deep Dynamic Neural Networks"; Oct. 2016; available at: https://www.researchgate.net/publication/308896333_Nonlinear_Systems_Identification_Using_Deep_Dynamic_Neural_Networks.
International Search Report, re PCT Application No. PCT/US2018/066593, dated Mar. 29, 2019.
International Search Report, re PCT Application No. PCT/US2018/066917, dated Mar. 29, 2019.
Sudipta, Mahapatra et al., Mapping of Neural Network Models onto Systolic Arrays In: Journal of Parallel and Distributed Computing, vol. 60, Issue 6, Jun. 2000, pp. 677-689.
Chi et al.; "PRIME: A Novel Processing-in-memory Architecture for Neural Network"; Jun. 2016; available at https://dl.acm.org/doi/10.1145/3007787.3001140.
Girones et al.; "Systolic Implementation of a Pipelined On-Line Backpropagation"; Sep. 1999; available at: https://ieeexplore.ieee.org/document/758891.
Du et al.; "A Reconfigurable Streaming Deep Convolutional Neural Network Accelerator for Internet of Things"; in IEEE Transactions on Circuits and Systems I: Regular Papers, vol. 65, No. 1, pp. 198-208; Jan. 2018; available at: https://ieeexplore.ieee.org/document/8011462.
Ogunmolu et al.; "Nonlinear Systems Identification Using Deep Dynamic Neural Networks"; in arXiv preprint arXiv: 1610.01439; Oct. 5, 2016.
Parhami et al.; "Periodically Regular Chordal Rings"; IEEE Transactions on Parallel and Distributed Systems; vol. 10, No. 6; Jun. 1999; available at: https://ieeexplore.ieee.org/document/774913.
Lu et al.; "FlexFlow: A Flexible Dataflow Accelerator Architecture for Convolutional Neural Networks"; 2017 IEEE International Symposium on High Performance Computer Architecture (HPCA); 2017; pp. 553-564; available at: https://ieeexplore.ieee.org/document/7920855.
Qi et al.; "FPGA design of a multicore neuromorphic processing system"; NAECON 2014; IEEE National Aerospace and Electronics Conference; 2014; pp. 255-258; available at: https://ieeexplore.ieee.org/abstract/document/7045812.
Shafiee et al.; "ISAAC: A Convolutional Neural Network Accelerator with in-Situ Analog Arithmetic in Crossbars"; In Proceedings of the 43rd ICSA; pp. 14-26; IEEE press Year: 2016; available at: https://ieeexplore.ieee.org/document/7551379.

* cited by examiner

Fundamental Convolutional Block

5x5x1

25 Mult-Accops

5x5x2 Filter/Kernel, 2Channels 3x3 and 1x1 Filters/Kernels are Padded Versions of 5x5

Fundamental Convolutional Block

5x5x2

50 Mult-Accops

5x5x2 Filter/Kernel, 2Channels 3x3 and 1x1 Filters/Kernels are Padded Versions of 5x5

Alternative Choice of Reinforcement Feedback

Single Map-Coincidence

More than One Map Coincidence

CONFIGURABLE NEURAL NETWORK ENGINE OF TENSOR ARRAYS AND MEMORY CELLS

CROSS REFERENCE TO RELATED APPLICATIONS

This application claims the benefit under 35 U.S.C. § 119(e) of both U.S. Patent Application No. 62/628,168, filed Feb. 8, 2018, and U.S. Patent Application No. 62/633,372, filed Feb. 21, 2018, the disclosures of which are hereby incorporated by reference herein in their entirety.

BACKGROUND

Computer learning models can process large volumes of data. For example, a model may be implemented as an artificial neural network. Artificial neural networks are artificial in the sense that they are computational entities, inspired by biological neural networks but modified for implementation by computing devices. A neural network typically comprises an input layer, one or more hidden layer(s) and an output layer. The nodes in each layer connect to nodes in the subsequent layer and the strengths of these interconnections are typically learnt from data during the training process. Once trained, a neural network can be used for inference, that is, provided with new input data in order to predict the corresponding output.

The parameters of a neural network can be set in a process referred to as training. For example, a neural network can be trained using training data that includes input data and the correct or preferred output of the model for the corresponding input data. Sets of individual input vectors ("minibatches") may be processed at the same time by using an input matrix instead of a single input vector, which may speed up training. The neural network can repeatedly process the input data, and the parameters (e.g., the weight matrices) of the neural network can be modified in what amounts to a trial-and-error process until the model produces (or "converges" on) results substantially close to the correct or preferred output. The modification of weight values may be performed through a process referred to as "backpropagation." Backpropagation includes determining the difference between the expected model output and the obtained model output, and then determining how to modify the values of some or all parameters of the model to reduce the difference between the expected model output and the obtained model output.

BRIEF DESCRIPTION OF DRAWINGS

Embodiments of various inventive features will now be described with reference to the following drawings and appendices. Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Figure 1A:
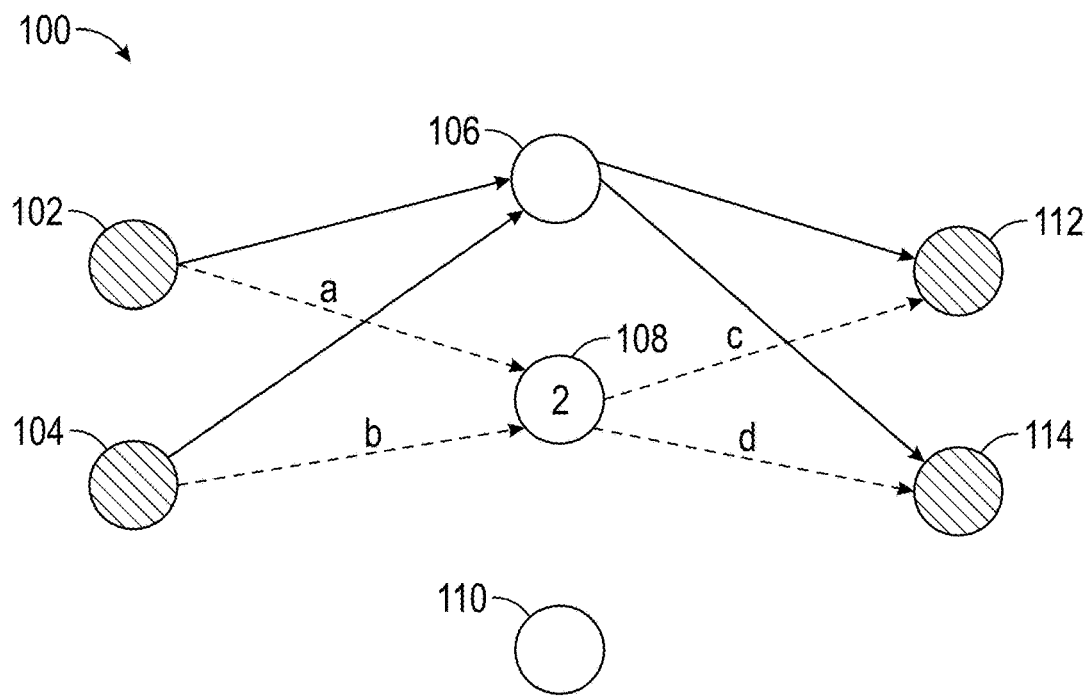
FIGS. 1A-1C depict illustrative examples of reconfiguring a fully connected neural network that may be implemented in accordance with at least some embodiments.

The systems, methods, and devices of this disclosure each have several innovative aspects, no single one of which is solely responsible for the all of the desirable attributes disclosed herein.

Some embodiments include a device for performing computations of a neural network comprising at least a first layer and a second layer, the device can comprise: an array comprising a plurality of processing units including processing circuitry and memory, wherein the array is configured to transmit data systolically between particular processing units; a computer-readable memory storing instructions for using the array to perform computations of the neural network; and a controller configured by the instructions to: determine a first computational load of the first layer and a second computational load of the second layer; determine that the second computational load is greater than the first computational load; assign a first subset of the processing units to perform computations of the first layer; and assign a second subset of the processing units to perform computations of the second layer, wherein the second subset includes a greater number of processing units than the first subset.

In the device of any of the preceding paragraphs or in any of the devices disclosed herein, the controller can be configured to assign the first subset of the processing units to perform computations of the first layer based on the first computational load relative to the second computational load.

In the device of any of the preceding paragraphs or in any of the devices disclosed herein, the controller can be configured to assign a first subset of the processing units to perform computations of the first layer based on a proportion of the first computational load to a total computational load of the neural network.

In the device of any of the preceding paragraphs or in any of the devices disclosed herein, the controller can be further configured to assign the first subset of the processing units such that the first subset takes a certain amount of time to perform the computations of the first layer and the controller is configured to assign the second subset of the processing units such that the second subset takes substantially the same certain amount of time to perform the computations of the second layer.

In the device of any of the preceding paragraphs or in any of the devices disclosed herein, the neural network can include additional layers, and wherein the controller is further configured by the instructions to assign an additional subset of processing units to the additional layers, such that the additional subset performs the computations of its associated additional layer in substantially the same duration of time as the first and second subset of processing nodes.

In the device of any of the preceding paragraphs or in any of the devices disclosed herein, the processing power of at least two processing units can be different, and wherein the controller can be configured to assign a first subset of the processing units to perform computations of the first layer based on a processing power of the first subset of processing units relative to a total available processing power of the array.

In the device of any of the preceding paragraphs or in any of the devices disclosed herein, the device can be configured to provide input into the array, wherein the first subset of the processing units are configured to perform the computations of the first layer, and the second subset of the processing units are configured to perform the computations of the second layer, and the device can be further configured to provide an output of the array as an output of the neural network.

In the device of any of the preceding paragraphs or in any of the devices disclosed herein, the array can comprise a plurality of systolic transfer structures including: a first arrangement of processing units within the array, a second arrangement of processing units within the array, and a third arrangement of processing units within the array; and a first bus configured to transfer data between the first and second arrangements, a second bus configured to transfer data between the second and third arrangements, wherein a particular processing unit of the second arrangement includes an input systolic element configured to receive data systolically pulsed along the first bus and an output systolic element that systolically pulses output data along the second bus.

In the device of any of the preceding paragraphs or in any of the devices disclosed herein, the controller can be configured to program the particular processing unit with an identity that enables the particular processing unit to selectively provide a subset of the data received along the first bus to its processing circuitry.

Some embodiments include a method for performing computations of a neural network comprising at least a first layer, the method can comprise, by a processor: determining a first computational load of the first layer and a total computational load of the neural network; determining a proportionality of the first computational load to the total computational load; and assigning a first subset of processing units to perform computations of the first layer based on the proportionality of the first computational load to the total computational load.

In the method of any of the preceding paragraphs or in any of the methods disclosed herein, determining the first computational load of the first layer can be based on at least a number of multiplications performed by nodes of the first layer.

In the method of any of the preceding paragraphs or in any of the methods disclosed herein, determining the first computational load of the first layer can be further based on at least one of: a size of an input to the neural network, a number of input channels, a number of output channels, or a size of a mask for a layer of the neural network.

In the method of any of the preceding paragraphs or in any of the methods disclosed herein, the neural network can further comprise a second layer, and the method further comprises: determining a second computational load of the second layer; and assigning a second subset of the processing units to perform computations of the second layer based on the first and second computational load.

In the method of any of the preceding paragraphs or in any of the methods disclosed herein, the first and second subset of the processing units can be assigned such that an amount of time used for the first subset to perform multiplications of the first layer is substantially equal to the amount of time required for the second subset to perform multiplications of the second layer.

Some embodiments include a controller including one or more processors configured to: determine computational loads of one or more layers of a neural network, wherein the neural network includes at least a first and second layer; and assign subsets of an array comprising a plurality of processing units to the one or more layers of the neural network, wherein the processing units include processing circuitry and memory, wherein the array is configured to transmit data systolically between particular processing units, wherein the subsets are assigned based on the computational load of the corresponding layer, wherein assigning subsets include assigning a first subset of processing units to the first layer and a second subset of processing units to the second layer.

In the controller of any of the preceding paragraphs or in any of the controllers disclosed herein, outputs from the first subset of processing units can be systolically pulsed along at least one systolic transfer structure to the second subset of processing units.

In the controller of any of the preceding paragraphs or in any of the controllers disclosed herein, outputs from the second subset of processing units can be systolically pulsed along at least one systolic transfer structure to the first subset of processing units.

In the controller of any of the preceding paragraphs or in any of the controllers disclosed herein, a first processing unit of the first subset can be configured to tag its output with an identifying tuple, and a second processing unit of the second subset can be configured by the controller to process the output of the first processing unit based on the identifying tuple.

In the controller of any of the preceding paragraphs or in any of the controllers disclosed herein, the identifying tuple can include a first piece of data indicating a layer to which the first processing unit is assigned, a second piece of data indicating a row in a pixel array where a pixel processed by the first processing unit is located, and a third piece of data indicating a column in the pixel array where the pixel processed by the first processing unit is located.

In the controller of any of the preceding paragraphs or in any of the controllers disclosed herein, outputs of the processing units of the first subset can be systolically pulsed to the second processing unit, and wherein the second processing unit can identify a subset of the outputs for use in computations based on the identifying tuple tagged on the outputs, wherein the controller can perform the operations by computer executable instructions stored in a non-transitory computer-readable medium.

Some embodiments include a device for performing computations of a convolutional neural network, the device can comprise: a processing chip including: a first arrangement of a plurality of tensor arrays; a second arrangement of a plurality of memory cells; a plurality of interconnects connecting particular ones of the tensor arrays to particular ones of the memory cells; a computer-readable memory storing instructions for configuring the processing chip to perform computations of the convolutional neural network; and a controller configured by the instructions to: determine, for a particular layer of the convolutional neural network, a number of input channels and a number of output maps generated for particular ones of a plurality of pixels; configure a portion of the processing chip into a plurality of processing units, wherein a particular processing unit performs computations associated with a particular one of the plurality of pixels; and wherein individual ones of the plurality of processing units include: a number of the tensor arrays determined based on the number of input channels, and a number of memory cells corresponding to the number of output maps; and assign the plurality of processing units to perform computations of the particular layer.

In the device of any of the preceding paragraphs or in any of the devices disclosed herein, the device can be configured to provide input into the processing chip, wherein a corresponding one of the processing units are configured to perform the computations of the particular layer for individual ones of the plurality of pixels using the number of tensor arrays and to store output using the number of memory cells, the device further configured to provide an output of the processing chip as an output of the convolutional neural network.

In the device of any of the preceding paragraphs or in any of the devices disclosed herein, for a particular processing unit, the tensor arrays of the number of tensor arrays can be configured to send output data to corresponding ones of the number of memory cells over a subset of the interconnects.

In the device of any of the preceding paragraphs or in any of the devices disclosed herein, a default processing unit can include one tensor array and one memory cell connected to one another by one interconnect, and wherein the default processing unit has capacity to process one channel and generate one output.

In the device of any of the preceding paragraphs or in any of the devices disclosed herein, the controller can be further configured by the instructions to: determine that the number of input channels for a particular one of the plurality of pixels in the particular layer exceeds the capacity of the default processing unit, and configure a corresponding one of the plurality of processing units to combine tensor arrays of multiple default processing units while using less than all of the memory cells of the plurality of processing units.

In the device of any of the preceding paragraphs or in any of the devices disclosed herein, the controller can be further configured by the instructions to: determine that the number of output maps generated for a particular one of the plurality of pixels in the particular layer exceeds the capacity of the default processing unit, and configure a corresponding one of the plurality of processing units to combine the memory cells of multiple default processing units while using less than all of the tensor arrays of the plurality of processing units.

In the device of any of the preceding paragraphs or in any of the devices disclosed herein, at least one tensor array of the plurality of tensor arrays can include circuitry to perform a single multiplication operation.

In the device of any of the preceding paragraphs or in any of the devices disclosed herein, at least one tensor array of the plurality of tensor arrays can include circuitry to perform a plurality of multiplication operations.

In the device of any of the preceding paragraphs or in any of the devices disclosed herein, the controller can be further configured by the instructions to configure the processing chip into a plurality of processing units that collectively perform the computations of multiple layers of the convolutional neural network.

In the device of any of the preceding paragraphs or in any of the devices disclosed herein, the plurality of processing units can form an array, wherein the array can comprise a plurality of systolic transfer structures to systolically transfer output maps generated by a first subset of the processing units for one layer of the convolutional neural network to a second subset of processing units assigned to a next layer of the convolutional neural network.

Some embodiments include a method for performing computations of a neural network, the method can comprise: determining, for a particular layer of the neural network, a number of input channels and a number of output maps generated for particular ones of a plurality of pixels; configuring a portion of a processing chip into a plurality of processing units, wherein the processing chip includes one or more tensor arrays and one or more memory cells, wherein a particular processing unit performs computations associated with a particular one of the plurality of pixels; and wherein individual ones of the plurality of processing units include: a number of the tensor arrays determined based on the number of input channels, and a number of memory cells corresponding to the number of output maps; and assign the plurality of processing units to perform computations of the particular layer.

In the method of any of the preceding paragraphs or in any of the methods disclosed herein, the method can further comprise: providing input into the processing chip to perform the computations of the particular layer for individual ones of the plurality of pixels using the number of tensor arrays and to store output using the number of memory cells, and providing an output of the processing chip as an output of the neural network.

In the method of any of the preceding paragraphs or in any of the methods disclosed herein, for a particular processing unit, the method can further comprise sending, by the tensor arrays of the number of tensor arrays, output data to corresponding ones of the number of memory cells over a subset of the interconnects connecting particular ones of the tensor arrays to particular ones of the memory cells.

In the method of any of the preceding paragraphs or in any of the methods disclosed herein, a default processing unit can include one tensor array and one memory cell connected to one another by one interconnect connecting the one tensor array to the one memory cell, and wherein the method can further comprise processing one channel and generate one output using the default processing unit.

In the method of any of the preceding paragraphs or in any of the methods disclosed herein, the method can further comprise: determining that the number of input channels for a particular one of the plurality of pixels in the particular layer exceeds a capacity of the default processing unit, and configuring a corresponding one of the plurality of processing units to combine tensor arrays of multiple default processing units while using less than all of the memory cells of the plurality of processing units.

In the method of any of the preceding paragraphs or in any of the methods disclosed herein, the method can further comprise: determining that the number of output maps generated for a particular one of the plurality of pixels in the particular layer exceeds a capacity of the default processing unit, and configuring a corresponding one of the plurality of processing units to combine the memory cells of multiple default processing units while using less than all of the tensor arrays of the plurality of processing units.

Some embodiments include a controller comprising one or more processors configured to: determine, for a particular layer of a neural network, a number of input channels and a number of output maps generated for particular ones of a plurality of pixels; configure a portion of a processing chip into a plurality of processing units, wherein the processing chip includes one or more tensor arrays and one or more pixel arrays, wherein a particular processing unit performs computations associated with a particular one of the plurality of pixels; and wherein individual ones of the plurality of processing units include: a number of the tensor arrays determined based on the number of input channels, and a number of pixel arrays corresponding to the number of output maps; and assign the plurality of processing units to perform computations of the particular layer.

In the controller of any of the preceding paragraphs or in any controller disclosed herein, the one or more processors can be further configured to: provide input into the processing chip to perform the computations of the particular layer for individual ones of the plurality of pixels using the number of tensor arrays and to store output using the number of pixel arrays, and provide an output of the processing chip as an output of the neural network.

In the controller of any of the preceding paragraphs or in any of the controllers disclosed herein, for a particular processing unit, one or more processors can be further configured to send, by the tensor arrays of the number of tensor arrays, output data to corresponding ones of the number of pixel arrays over a subset of the interconnects connecting particular ones of the tensor arrays to particular ones of the memory cells.

In the controller of any of the preceding paragraphs or in any of the controllers disclosed herein, a default processing unit can include one tensor array and one pixel array connected to one another by one interconnect connecting the one tensor array to the one memory cell for processing one channel and generate one output, and wherein one or more processors can be further configured to: determine that the number of input channels for a particular one of the plurality of pixels in the particular layer exceeds a capacity of the default processing unit, and configure a corresponding one of the plurality of processing units to combine tensor arrays of multiple default processing units while using less than all of the pixel arrays of the plurality of processing units, wherein the controller performs the operations by computer executable instructions stored in a non-transitory computer-readable medium.

Some embodiments include a device for performing computations of a convolutional neural network, the device can comprise: a processing chip including: a first arrangement of a plurality of tensor arrays including circuitry configured for performing computations according to a default convolutional filter size; a second arrangement of a plurality of memory cells configured to store outputs of corresponding ones of the tensor arrays; a plurality of interconnects connecting particular ones of the tensor arrays to particular ones of the memory cells; a computer-readable memory storing instructions for configuring the processing chip to perform computations of the convolutional neural network; and a controller configured by the instructions to: determine, for a particular convolution of a convolutional layer of the convolutional neural network, a particular convolutional filter size used for the particular convolution; when the particular convolutional filter size equals the default convolutional filter size, configure a processing unit to include one of the tensor arrays, and configure the processing unit to perform the particular convolution using the default convolutional filter size; when the particular convolutional filter size is less than the default convolutional filter size, configure the processing unit to include one of the tensor arrays, and configure the processing unit to perform the particular convolution using the default convolutional filter size padded with zeros such that a padded portion with an unpadded portion of the default convolutional filter corresponds to the particular convolutional filter size; and when the particular convolutional filter size is greater than the default convolutional filter size, configure the processing unit to include multiple tensor arrays to perform the particular convolution.

In the device of any of the preceding paragraphs or in any of the devices disclosed herein, the default convolutional filter size can be 5×5×1.

In the device of any of the preceding paragraphs or in any of the devices disclosed herein, the device can be configured to: provide input into the processing chip for the processing chip to perform the particular convolution using the processing unit; and provide an output of the processing chip as an output of the convolutional neural network.

In the device of any of the preceding paragraphs or in any of the devices disclosed herein, the controller can be further configured by the instructions to configure a particular tensor array to perform a computation of a fully connected layer of the convolutional neural network by instructing the tensor array to use a center value of the default convolutional filter for processing input data and pad remaining values of the default convolutional filter with zeros.

In the device of any of the preceding paragraphs or in any of the devices disclosed herein, at least one tensor array of the plurality of tensor arrays can include circuitry to perform a single multiplication operation.

In the device of any of the preceding paragraphs or in any of the devices disclosed herein, at least one tensor array of the plurality of tensor arrays can include circuitry to perform a plurality of multiplication operations.

In the device of any of the preceding paragraphs or in any of the devices disclosed herein, the controller can be further configured by the instructions to configure the processing chip into a plurality of processing units that collectively perform the computations of multiple layers of the convolutional neural network.

In the device of any of the preceding paragraphs or in any of the devices disclosed herein, the plurality of processing units can form an array, wherein the array can comprise a plurality of systolic transfer structures to systolically transfer outputs generated by a first subset of the processing units for one layer of the convolutional neural network to a second subset of processing units assigned to a next layer of the convolutional neural network.

Some embodiments include a method for performing computations of a neural network, the method comprising: identifying a default filter size of a plurality of tensor arrays included in a processing chip, wherein the processing chip further includes a plurality of memory cells for storing outputs of corresponding ones of the tensor arrays and a plurality of interconnects connecting particular ones of the tensor arrays to particular ones of the memory cells; determining, for a particular set of operations of a layer of the neural network, a particular filter size used for the particular set of operations; determining that a particular filter size is greater than the default filter size; and in response to determining that the particular filter size is greater than the default filter size, configuring a processing unit to include multiple tensor arrays to perform the particular set of operations.

In the method of any of the preceding paragraphs or in any of the methods disclosed herein, the default filter size can be 5×5×1.

In the method of any of the preceding paragraphs or in any of the methods disclosed herein, the method can further comprise: providing input into the processing chip for the processing chip to perform the particular set of operations using the processing unit; and providing an output of the processing chip as an output of the neural network.

In the method of any of the preceding paragraphs or in any of the methods disclosed herein, the method can further comprise configuring a particular tensor array to perform a computation of a fully connected layer of the neural network by instructing the tensor array to use a center value of the default filter for processing input data and padding remaining values of the default filter with zeros.

In the method of any of the preceding paragraphs or in any of the methods disclosed herein, at least one tensor array of the plurality of tensor arrays can include circuitry to perform a single multiplication operation.

In the method of any of the preceding paragraphs or in any of the methods disclosed herein, at least one tensor array of the plurality of tensor arrays can include circuitry to perform a plurality of multiplication operations.

In the method of any of the preceding paragraphs or in any of the methods disclosed herein, the method can further comprise configuring the processing chip into a plurality of processing units that collectively perform the computations of multiple layers of the neural network.

In the method of any of the preceding paragraphs or in any of the methods disclosed herein, the plurality of processing units can form an array, wherein the array can comprise a plurality of systolic transfer structures to systolically transfer outputs generated by a first subset of the processing units for one layer of the neural network to a second subset of processing units assigned to a next layer of the neural network.

Some embodiments include a controller comprising one or more processors configured to: identify a default filter size of a plurality of tensor arrays included in a processing chip, wherein the processing chip further includes a plurality of memory cells for storing outputs of corresponding ones of the tensor arrays and a plurality of interconnects connecting particular ones of the tensor arrays to particular ones of the memory cells; determine, for a particular set of operations of a layer of a neural network, a particular filter size used for the particular set of operations; when the particular filter size equals the default filter size, configure a processing unit to include one of the tensor arrays, and configure the processing unit to perform the particular set of operations using the default filter size; when the particular filter size is less than the default filter size, configure the processing unit to include one of the tensor arrays, and configure the processing unit to perform the particular set of operations using the default filter size padded with zeros such that an unpadded portion of the default filter corresponds to the particular filter size; and when the particular filter size is greater than the default filter size, configure the processing unit to include multiple tensor arrays to perform the particular set of operations.

In the controller of any of the preceding paragraphs or in any of the controllers disclosed herein, the default filter size can be 5×5×1.

In the controller of any of the preceding paragraphs or in any of the controllers disclosed herein, the one or more processors can be further configured to: provide input into the processing chip for the processing chip to perform the particular set of operations using the processing unit; and provide an output of the processing chip as an output of the neural network.

In the controller of any of the preceding paragraphs or in any of the controllers disclosed herein, the one or more processors can be further configured for a particular tensor array to perform a computation of a fully connected layer of the neural network by instructing the tensor array to use a center value of the default filter for processing input data and padding remaining values of the default filter with zeros, wherein the controller performs the operations by computer executable instructions stored in a non-transitory computer-readable medium.

Some embodiments include a device for training a convolutional neural network comprising a plurality of layers, the device can comprise: an array comprising a plurality of processing units including processing circuitry and memory, wherein the array is configured to transmit data systolically between particular processing units; a computer-readable memory storing instructions for using the array to perform computations of the neural network during the training; and a controller configured by the instructions to: provide input data representing an image into the array, the image including an array of pixels; perform a forward pass of the input data through the plurality of layers; for a particular location in the array of pixels, generate a pixel vector representing values output by the plurality of layers for that particular location, wherein the pixel vector includes a first value generated by a first layer of the plurality of layers and a second value generated by a second layer of the plurality of layers, wherein the second layer is deeper along the plurality of layers of the convolutional neural network than the first layer; and adjust an enhancement coefficient of the first value of the first layer based on the second value of the second layer.

In the device of any of the preceding paragraphs or in any of the devices disclosed herein, to adjust the enhancement coefficient can include increasing a weighting for the particular location based on finding a correspondence.

In the device of any of the preceding paragraphs or in any of the devices disclosed herein, the correspondence can include an identification of similar values occurring at similar pixel locations.

In the device of any of the preceding paragraphs or in any of the devices disclosed herein, to adjust the enhancement coefficient can include decreasing a weighting for the particular location based on not finding a correspondence.

In the device of any of the preceding paragraphs or in any of the devices disclosed herein, the controller can further be configured by the instructions to adjust the first value based on the enhancement coefficient to generate an adjusted output value; and provide the adjusted output value to the second layer.

In the device of any of the preceding paragraphs or in any of the devices disclosed herein, to adjust the enhancement coefficient can be based on image-correlated disturbance mode training by correlating disturbances to the image without a learned parameter.

In the device of any of the preceding paragraphs or in any of the devices disclosed herein, to adjust the enhancement coefficient can be based on set-correlated enhancement mode training using one or more learned parameters.

In the device of any of the preceding paragraphs or in any of the devices disclosed herein, to adjust the enhancement coefficient can include computing the enhancement coefficient via an enhancement matrix by summing over corresponding positions across maps using masks of different volumes, the mask volumes producing coefficients to be placed in an enhancement matrix.

In the device of any of the preceding paragraphs or in any of the devices disclosed herein, the different volumes of masks can include at least one of: a 1×1, a 3×3, a 5×5, or a 7×7 mask.

In the device of any of the preceding paragraphs or in any of the devices disclosed herein, the controller can further be configured by the instructions to randomly turn off one or more neurons of a layer in the neural network during the training.

Some embodiments include a method for performing computations of a neural network comprising a plurality of layers including at least a first layer and a second layer, the method can comprise: accessing data representing an image including an array of pixels; performing a forward pass of the data through the plurality of layers; for a particular location in the array of pixels, generating a pixel vector representing values output by the plurality of layers for that particular location, wherein the pixel vector includes a first value generated by a first layer of the plurality of layers and a second value generated by a second layer of the plurality of layers, wherein the second layer is deeper along the plurality of layers of the neural network than the first layer; and adjusting an enhancement coefficient of the first value of the first layer based on the second value of the second layer.

In the method of any of the preceding paragraphs or in any of the methods disclosed herein, adjusting the enhancement coefficient can include increasing a weighting for the particular location based on finding a correspondence.

In the method of any of the preceding paragraphs or in any of the methods disclosed herein, the correspondence can include an identification of similar values occurring at similar pixel locations.

In the method of any of the preceding paragraphs or in any of the methods disclosed herein, adjusting the enhancement coefficient can include decreasing a weighting for the particular location based on not finding a correspondence.

In the method of any of the preceding paragraphs or in any of the methods disclosed herein, the method can further include adjusting the first value based on the enhancement coefficient to generate an adjusted output value; and providing the adjusted output value to the second layer.

In the method of any of the preceding paragraphs or in any of the methods disclosed herein, adjusting the enhancement coefficient can be based on image-correlated disturbance mode training by correlating disturbances to the image without a learned parameter.

In the method of any of the preceding paragraphs or in any of the methods disclosed herein, adjusting the enhancement coefficient can be based on set-correlated enhancement mode training using one or more learned parameters.

Some embodiments include a controller comprising one or more processors configured to: perform a forward pass of input data of an array of pixels through a plurality of layers of a neural network; for a particular location in the array of pixels, generate a pixel vector representing values output by each of the plurality of layers for that particular location, wherein the pixel vector includes a first value generated by a first layer of the plurality of layers and a second value generated by a second layer of the plurality of layers; and adjust an enhancement coefficient of the first value of the first layer based on the second value of the second layer.

In the controller of any of the preceding paragraphs or in any of the controllers disclosed herein, adjustment of the enhancement coefficient can include increase of a weighting for the particular location based on finding a correspondence.

In the controller of any of the preceding paragraphs or in any of the controllers disclosed herein, the correspondence can include an identification of similar values occurring at similar pixel locations.

Generally, as described herein, neural networks, including but not limited to deep neural networks ("DNNs"), have multiple layers of nodes. Illustratively, a neural network may include an input layer, and output layer, and any number of intermediate, internal, or "hidden" layers between the input and output layers. The individual layers may include any number of separate nodes. Nodes of adjacent layers may be logically connected to each other, and each logical connection between the various nodes of adjacent layers may be associated with a respective weight. Conceptually, a node may be thought of as a computational unit that computes an output value as a function of a plurality of different input values. Nodes may be considered to be "connected" when the input values to the function associated with a current node include the output of functions associated with nodes in a previous layer, multiplied by weights associated with the individual "connections" between the current node and the nodes in the previous layer. Each node passes the result of this weighted sum of inputs through a non-linear function (such as a sigmoid, tangent hyperbolic, RELU, and/or the like) before sending its output to the next layer nodes.

The nodes in each layer connect to some (e.g., partially connected layers) or all (e.g., fully connected layers) of the nodes in the subsequent layer and the weights of these connections are typically learnt from data during the training process, for example through backpropagation in which the network parameters are tuned to produce expected outputs given corresponding inputs in labeled training data. Thus, the artificial neural network is an adaptive system that is configured to change its structure (e.g., the connection configuration and/or weights) based on information that flows through the network during training, and the weights of the hidden layers can be considered as an encoding of meaningful patterns in the data.

In general, embodiments of this disclosure relate to a special-purpose hardware processor that accelerates computation using neural networks, both during the training and inference stages of machine learning. Hardware acceleration is the use of computer hardware to perform some functions more efficiently than is possible in software running on a more general-purpose central processing unit ("CPU"). Due to the large volume of computations performed while training or using neural networks, such neural network computations are considered to be computationally expensive in that they consume large amounts of processing resources. Further, neural networks are inherently parallel algorithms, meaning that different computations within the network can be executed a piece at a time on different processing devices, with the computations later combined to get the end result.

For this reason, conventional CPUs are typically considered not to be most well suited for neural network processing. This can be due to the time required to complete neural network calculations using a CPU, as well as the high usage of CPU bandwidth while the CPU is still needed for managing other computer functions. Some existing approaches take advantage of the parallel processing capabilities of graphics processing units ("GPUs") for this purpose, however the power costs of using the GPU are much higher than those of the CPU. The tensor processing unit ("TPU") is a special-purpose machine learning processor, however the TPU is only usable for inference and does not support the types of computations that are required for training a new neural network.

The present disclosure addresses these problems, among others, by, for example, using a special-purpose hardware accelerator and associated data processing techniques that can perform specialized machine learning tasks during both training and inference stages more efficiently than conventional processors (e.g., using less processing time and/or power costs). For example, this hardware accelerator (referred to herein as a "systolic neural network engine") uses a systolic array having a number of data processing units ("DPUs") that are each connected to a small number of other DPUs in a local region. Data from the many nodes of a neural network is pulsed through these DPUs with associated tags that identify where such data was originated or processed, such that each DPU has knowledge of where incoming data originated and thus is able to compute the data as specified by the architecture of the neural network. These tags enable the systolic neural network engine to perform computations during backpropagation, such that the systolic neural network engine is able to support training. In addition, these tags provide flexibility for reconfiguration of the DPUs to accommodate different types of neural network architectures having varying numbers of layers, nodes per layer, node computations, and node interconnections. Further details of the systolic neural network engine are provided in the detailed description.

As described above, embodiments of the present disclosure relate to an improved processor for use in machine learning training and inference, sometimes referred to herein as a systolic neural network engine. The systolic neural network engine defines reconfigurable functional blocks and interconnect resources. The functional blocks can include a processing unit. Each processing unit can include one or more tensor arrays for performing processing of neural network nodes and/or one or more memory arrays for storing values output by the tensor arrays. Some implementations are used for processing images, and so the memory arrays can be referred to as pixel arrays. A control processor or controller can execute instructions based on user-facing software that enables users to specify particular deep neural network ("DNN") architectures and parameters to be used, where the instructions map these DNNs to the available hardware of the systolic neural network engine. This available hardware is sometimes referred to herein as a field-programmable fabric. Besides the field-programmable fabric, systolic neural network engine chips, substrates, or dies can include the control processor for communicating identities to each worker and setting up the interconnects on the die.

In some embodiments, a worker can include specialized hardware and/or logic circuitry that utilizes an activation signal and/or input. For example, the worker can include at least one tensor processing unit (e.g. a tensor array) and at least one memory unit (e.g., a pixel value storage element, a memory array). The particular number of tensor processing units and memory units assigned to a particular worker can vary based on the types of computations the worker is to perform, as well as the number of activation outputs or neural network nodes to which the worker is assigned. The interconnects between memory arrays and tensor arrays enables flexibility in the physical resources of the systolic neural network engine die that are assigned to a given worker. The worker can calculate a weighted sum of its inputs and pass the weighted sum through one or more activation functions. A single worker can perform the functions of one or more nodes of a neural network, and produce a corresponding number of activation outputs. The worker can include one or more hardware resources to perform a computation (e.g. the computation of one or more nodes of a neural network).

The control processor together with the programmable fabric and workers of the systolic neural network engine may be implemented in some embodiments as a system on chip ("SoC"). A SoC refers to an integrated circuit (also known as an "IC") that integrates or embeds the components of the system into a single substrate (or a bonded stack of substrates). The substrate of the SoC refers to a thin, planar wafer of material (e.g., a semiconductive material such as silicon) that serves as the foundation upon which electronic components of the SoC (e.g., transistors, diodes, electronic circuits) are deposited. Thus, the disclosed systolic neural network engine, in some embodiments, includes a substrate provided with electronic components that form the memory and processing components of the SoC as described in more detail below. As such, the memory and processing components of the SoC are referred to as "embedded" in the chip of the SoC.

For example, a control processor can allocate workers on a die to dynamically create a package for a particular neural network configuration (e.g., number of layers, number of nodes per layer, node interconnections, and node computations). If a particular convolutional layer of a convolutional neural network, for example, requires more input channels, more output maps (e.g. the number of pixel outputs), more pixel calculations per worker, and/or the like, the control processor can assign a plurality of workers for the convolutional layer. The die can be reconfigured using data buses that transport data to and from one workers.

Control processor can inform the workers on the die(s) of their identities according to the best mapping to implement a given neural network from a user's specified DNN architecture. For example, the control processor can communicate an identity for each worker via a software stack interface that the user uses to describe a desired DNN of interest. The user can inform the software stack on the computer of the chip's resources and the software stack can map the user's DNN to the resources on the die. The central processor can receive and/or generate a final mapping that sends specific configuration commands to workers on the die along with their identities. The worker can be assigned to one or more nodes of a particular layer of the neural network, can be tasked to perform certain mathematical operations of the particular layer, instructed to ignore or accept certain input data, and/or the like. The workers can be assigned to a particular physical location on the die, each worker is assigned to perform the job of a certain number of nodes of the neural network.

In some embodiments, the control processor can assign a number of workers to particular layers of the neural network. The control processor can determine the assignment of the workers based on the computational load of the neural network. For example, the neural network can include convolutional layers with certain activation sizes, activation counts, and computational loads. In some embodiments, the control processor assigns more workers to layers with higher computational loads. In contrast, traditional CPUs or GPUs assign all workers to a single layer, and after completing all computations for the layer, the output values are stored in a memory or buffer, and fetched back to the same workers to perform computations for the following layer. In some embodiments of the present disclosure, advantageously the workers are assigned to a plurality of layers (and, in some implementations, all of the layers), reducing the need to read and write to the memory. In some embodiments, the assignments of workers based on the computational load allows for a substantially similar computational delay across two or more layers (e.g. substantially the same computational delay across all layers of the neural network). For example, substantially the same amount of time can include a percentage threshold (e.g. 0.01%, 0.1%, 1%, 10%, and/or the like) or an amount of time (1 ms, 10 ms, 100 ms, and/or the like).

In some embodiments, a processor (e.g., the control processor) can be used to reinforce certain nodes by looking for patterns across layers (e.g., convolutional layers that can be used to detect particular patterns in data). The processor can implement multiple convolutional layers on a single neural network layer to be performed in parallel. For example, the parallel convolutional layers can include a 1×1 convolutional filter, a 3×3 convolutional filter, and a 5×5 convolutional filter. In order to reduce the quantity of data, max pooling (or other suitable pooling) techniques can be used to select one value from within the filter region to output for subsequent processing. The output of the parallel convolutional layers can be sent to a coincidence mapping layer that determines coincidences (e.g., whether the value identified during pooling occurs in the same location or region within the filter) across the filters of the convolutional layers. If a coincidence is found, the outputs of the associated convolutional layers can be reinforced by increasing the weighting. If a coincidence is not found, the weightings for the outputs of the associated convolutional layers can be reduced. In some embodiments, the coincidence mapping layer can identify a maximum value for each of the parallel convolutional layers and check if the locations of the maximum values coincide among the parallel convolutional layers. If the maximum values coincide for two or more of the parallel convolutional layers, then the weightings for the parallel convolutional layers that coincide can be reinforced. Alternatively, the coincidence layers can also be used to augment the data and provide protection against overfitting. In these cases, the coincidence layers can randomly move the activation output positions by a lateral offset as if the image has bene moved laterally. These coincidence layers can also zero in on certain outputs according to criteria, which is advantageous over traditional pruning layers.

Although described within the context of neural networks, it will be appreciated that the training and/or interference concepts described herein could be applied to other machine learning models including decision trees, semi-supervised expectation maximization functions, and/or the like.

Various aspects of the disclosure will now be described with regard to certain examples and embodiments, which are intended to illustrate but not limit the disclosure. Although the examples and embodiments described herein will focus, for the purpose of illustration, specific calculations and algorithms, one of skill in the art will appreciate the examples are illustrate only, and are not intended to be limiting.

EXAMPLE FULLY CONNECTED NEURAL NETWORK

Figure 1B:
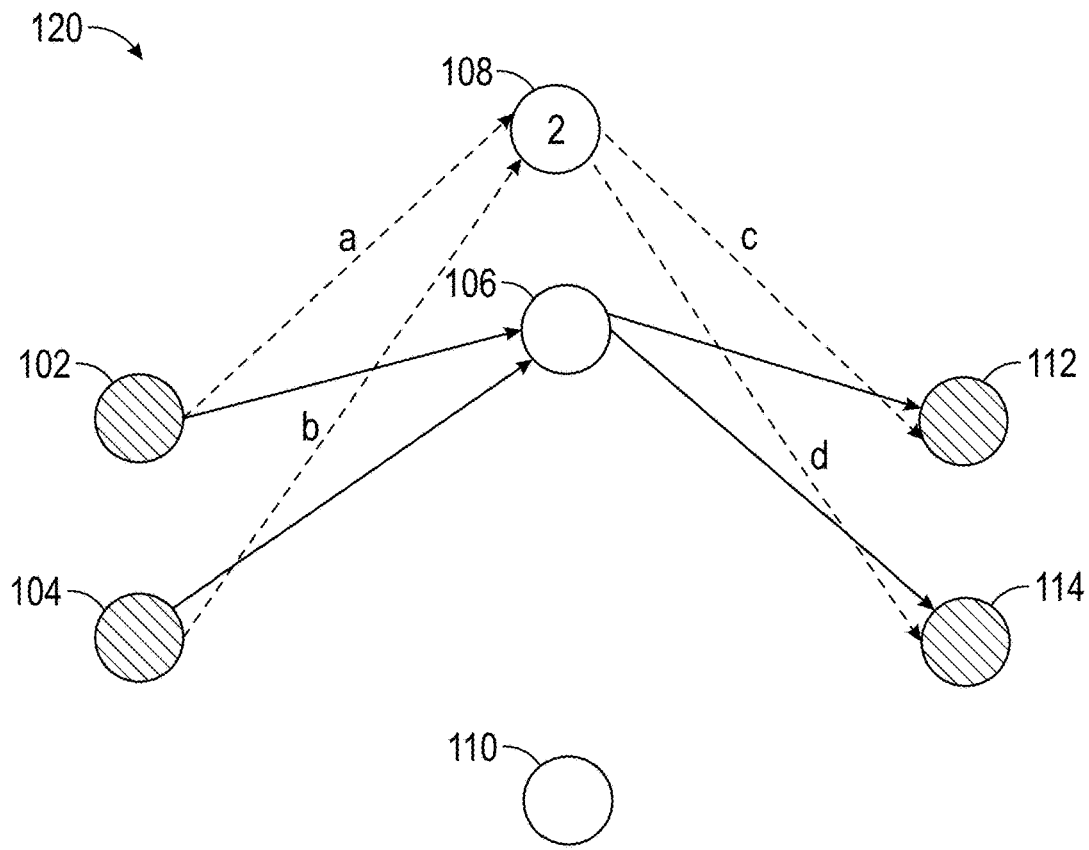
Figure 1C:
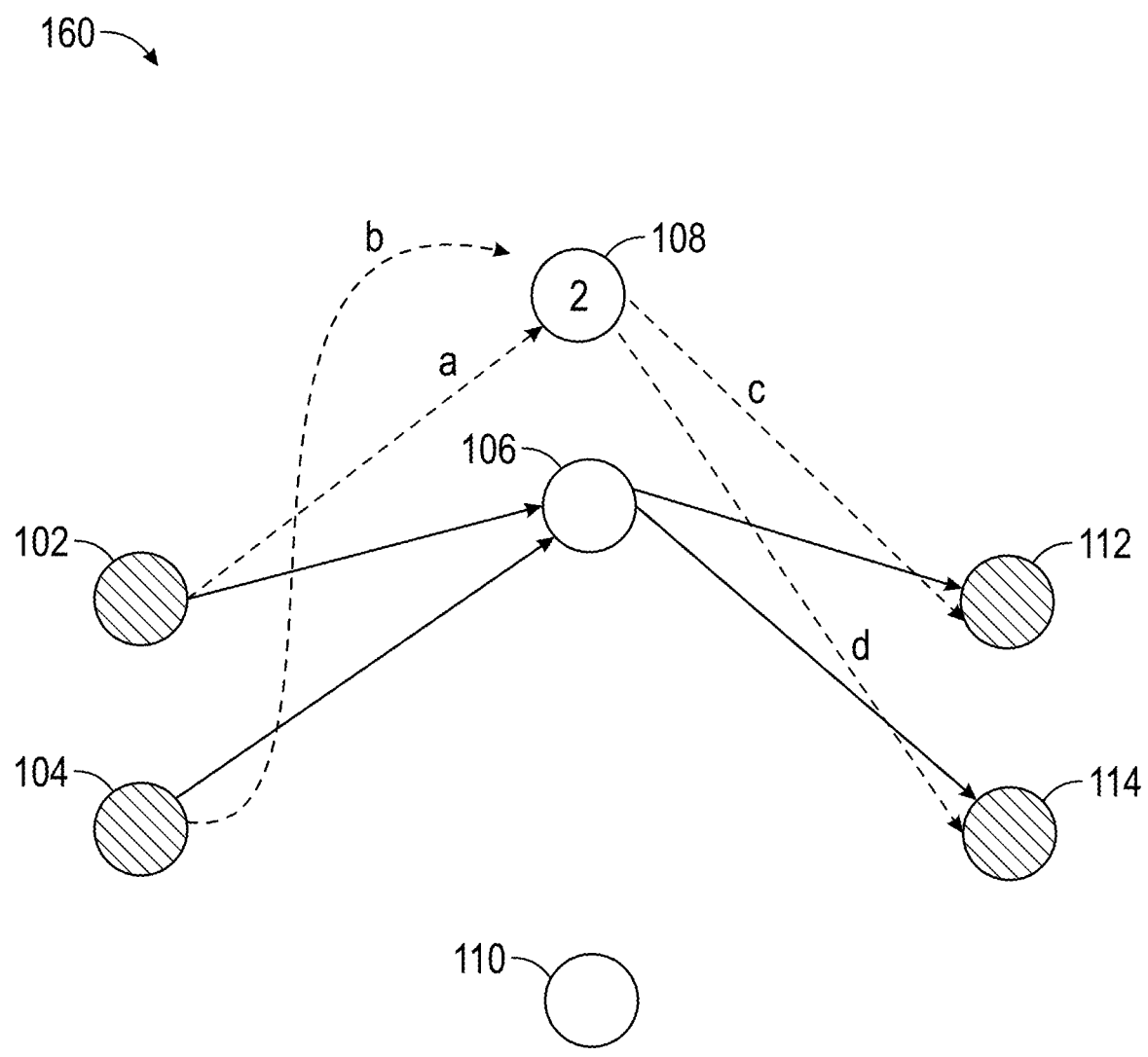

FIGS. 1A-1C depict illustrative examples of a fully connected neural network that may be implemented in some embodiments of the disclosed systolic neural network engine. FIG. 1A illustrates an example of a fully connected neural network with input nodes 102, 104, hidden layer nodes 106, 108, 110, and output nodes 112, 114. Specifically, the input layer nodes 102, 104 are connected with at least some of the hidden layer nodes 106, 108, 110, and at least some of the hidden layer nodes 106, 108, 110 are connected with the output nodes 112, 114. A layer can include a convolution layer, a pooling layer, a normalization layer, a fully connected layer, a rectified linear unit (ReLu) layer, and/or the like.

In some embodiments, it may be desirable to reposition the location of a node. If a chip were designed with node-to-node wiring connections that mirror the full connections of the example neural network, such repositioning would not be possible. However, various embodiments of the disclosed systolic neural network engine support repositioning nodes such as the example hidden layer node 108, which as illustrated in FIG. 1B has been repositioned above the hidden layer node 106. In such circumstances, the systolic connections to and from the hidden layer node 108 can also be repositioned. For example, the connections a and b between input nodes 102, 104 and hidden layer node 108 can be repositioned. Thus, the functionality of the neural network can be minimally affected and/or not affected. Such a repositioning of nodes sometimes happens for efficient distribution of data from one layer to the next in a systolic movement of data inside the chip.

In some embodiments, the input to and/or output from a hidden layer node can be repositioned. As illustrated in FIG. 1C, the electric connection b between input node 104 and hidden layer node 108 can be repositioned on the chip. In such circumstances, the functionality of the neural network may be minimally affected or not affected.

However, if the original neural network configuration was used to identify weighting for the hidden layers (e.g. identify optimal weightings for the nodes using training data), the weights may not match with the corresponding nodes and/or the connection between nodes once the network has been reconfigured. Accordingly, weights that were identified using the original neural network configuration may not simply be imported to the reconfigured neural network. The nodes may need to be mapped between the new inputs and the old inputs to apply the appropriate weightings.

EXAMPLE SYSTOLIC NEURAL NETWORK ENGINE

Figure 2A:
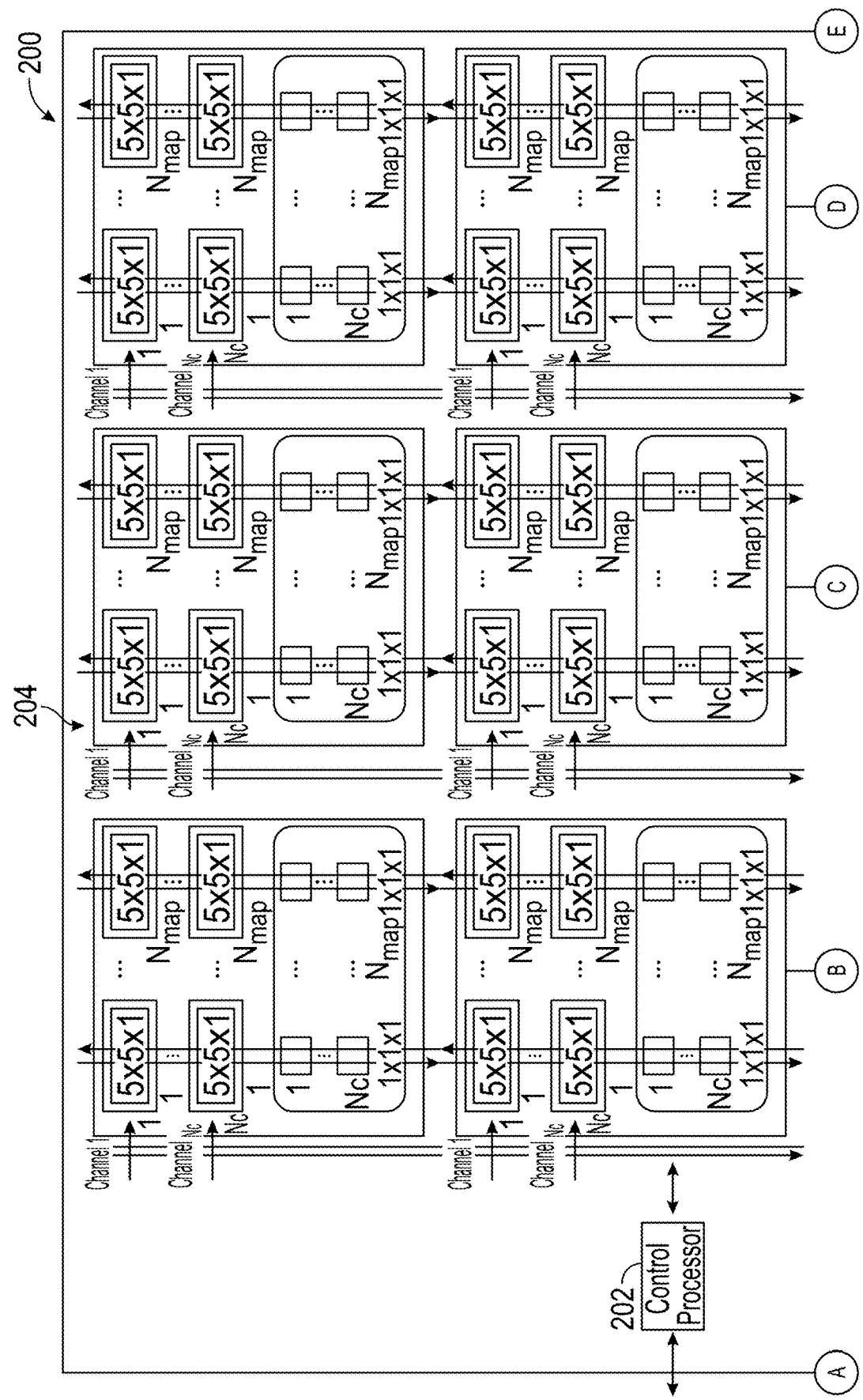
FIG. 2A depicts an illustrative example of a field-programmable systolic neural network engine that represents a plurality of functional elements that are repeated throughout a die to enable programmability and reconfigurability to implement a neural network in accordance with at least some embodiments.
Figure 2A:
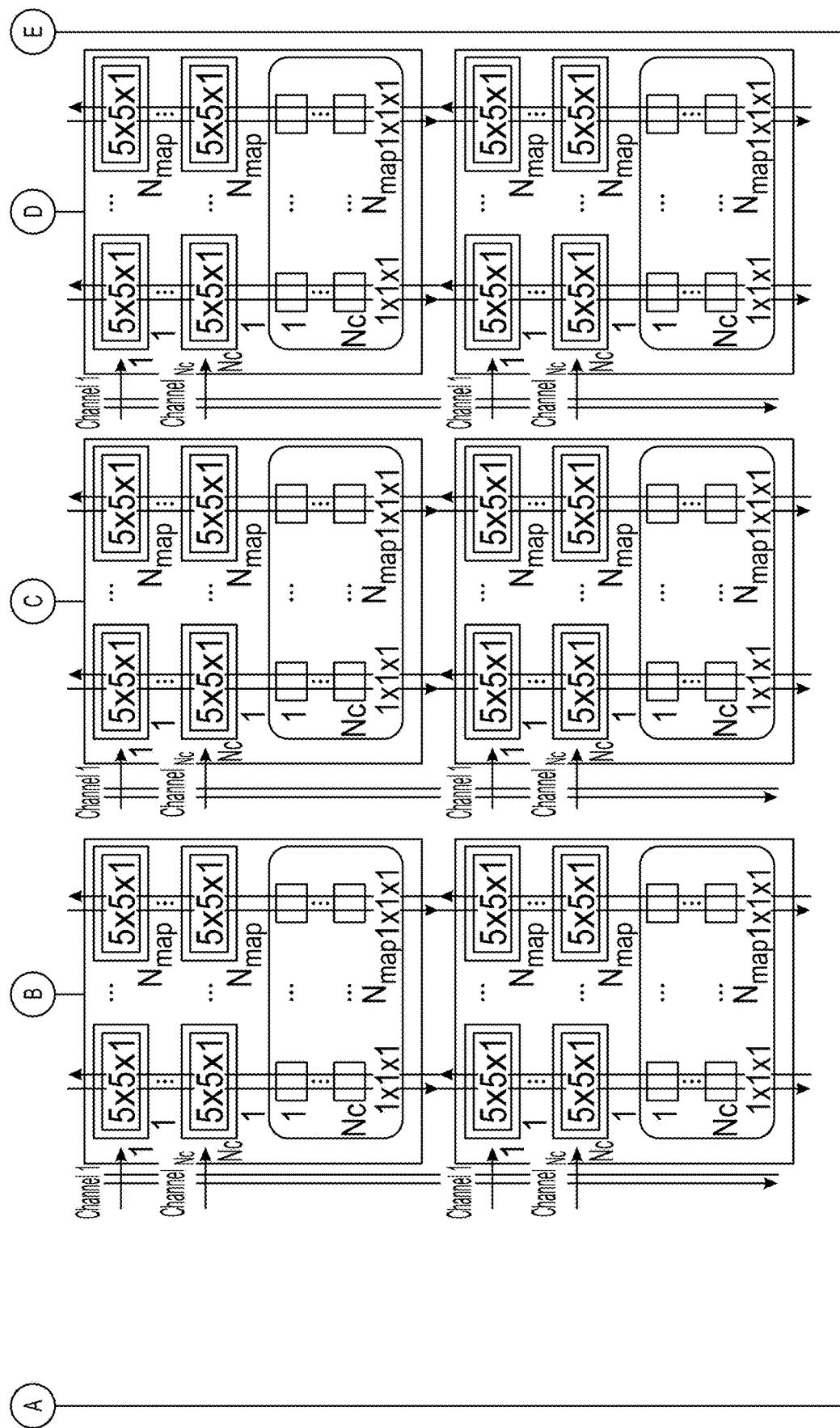
Figure 2B:
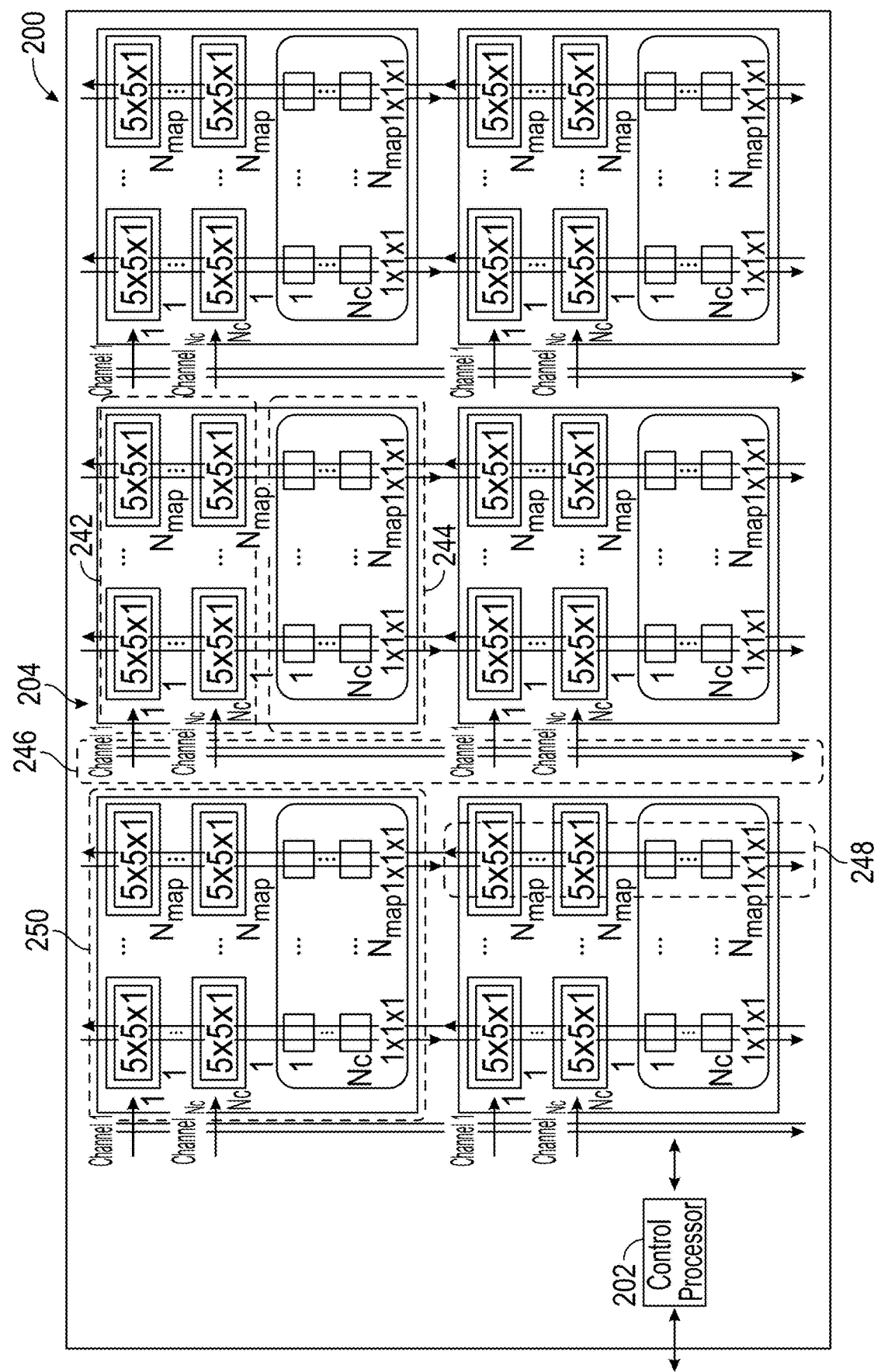
FIG. 2B depicts an illustrative example of components for the field-programmable systolic neural network engine in accordance with at least some embodiments.

FIG. 2A depicts an illustrative example of a field-programmable systolic neural network engine that represents a plurality of functional elements that are repeated throughout a die to enable programmability and reconfigurability to implement a neural network in accordance with at least some embodiments. FIG. 2A illustrates reconfigurable functional blocks 204 and a control processor 202. Inside the reconfigurable functional blocks, interconnect channels can be alternated with reconfigurable functional blocks. FIG. 2B depicts an illustrative example of components for the field-programmable systolic neural network engine in accordance with at least some embodiments. As shown in the example illustrated in FIG. 2B, the functional blocks can be either tensor arrays 242 or memory arrays, such as pixel arrays 244. A pair of tensor array fields and pixel array fields can be represented by a core 250. The intra-element buses 248 can enable systolic transmission of data between the tensor arrays and memory arrays, and the particular manner in which this data is transmitted across the inter-element buses 246 across cores 250 can be dynamically determined based on how the tensor arrays and memory arrays are allocated to workers.

Figure 2C:
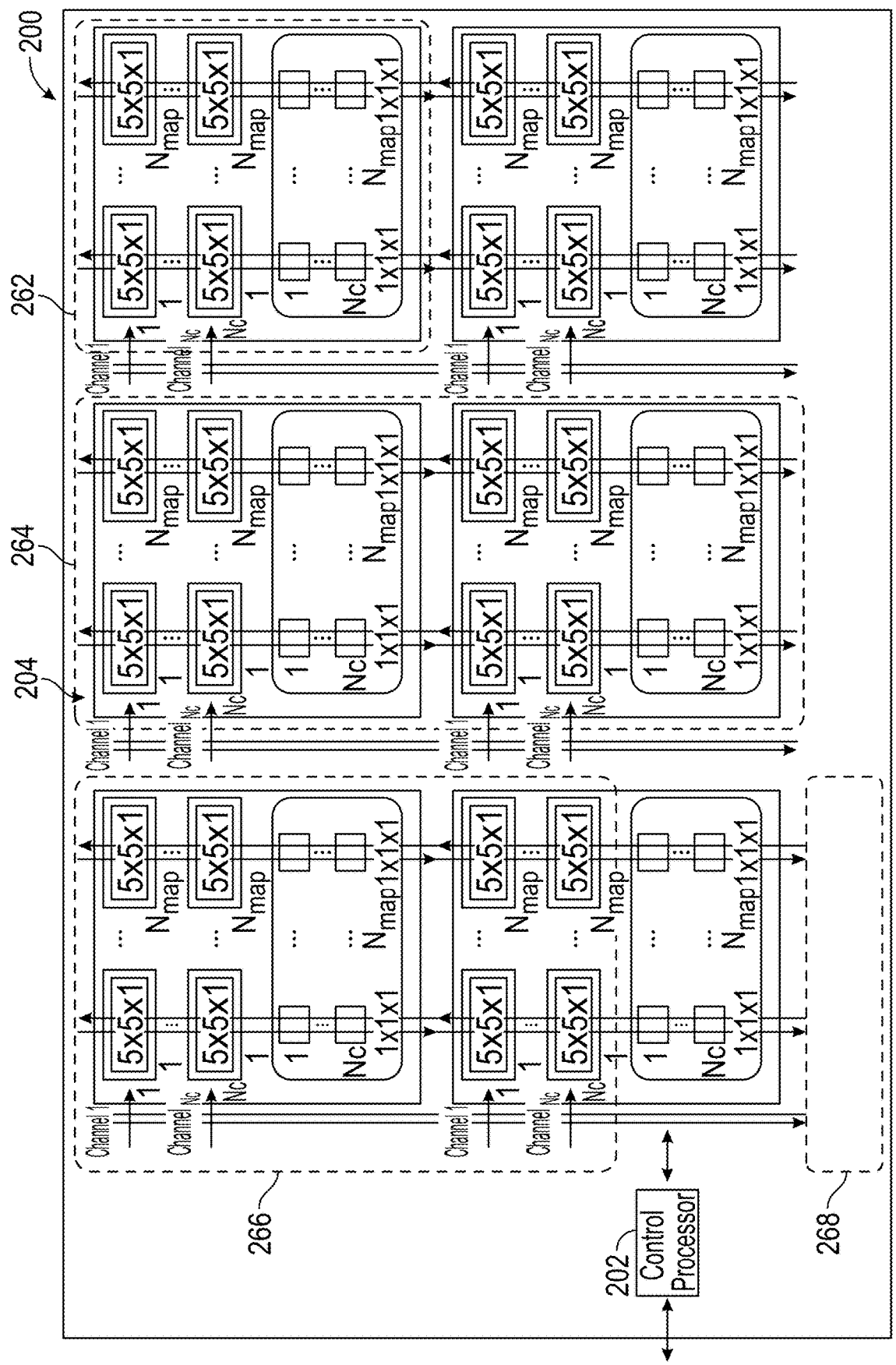
FIG. 2C depicts an illustrative example of workers on the field-programmable systolic neural network engine in accordance with at least some embodiments.

Workers may be realized with a different number of tensor array field and pixel array fields. FIG. 2C depicts an illustrative example of workers on the field-programmable systolic neural network engine in accordance with at least some embodiments.

A first portion of worker 1 266 can be assigned to layer 1, a second portion of worker 2 264 can be assigned to layer 2, and a third portion of worker 1 262 can be assigned to layer 3. Worker 2 268 can also be assigned to layer 1.

Figure 2D:
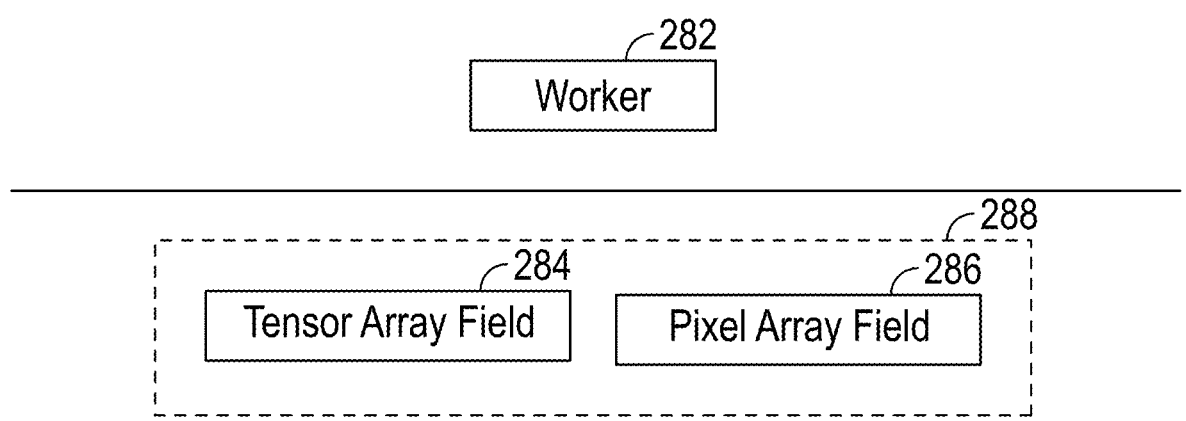
FIG. 2D depicts an illustrative example of a worker, a tensor array field, a pixel array field, and a core in accordance with at least some embodiments.

FIG. 2D depicts an illustrative example of a worker, a tensor array field, a pixel array field, and a core in accordance with at least some embodiments. A worker 282 can include a combination of one or more tensor array fields and/or one or more pixel array fields. A core 288 can include a pair of a tensor array field 284 and a pixel array field 286.

Each tensor array can be coupled to a destination systolic element that acts as a shift register to transfer tagged data received from other workers, where the data tags indicate a source of the data (e.g., which other worker processed the data). The destination systolic element can function to systolically pass such tagged data through the systolic neural network engine, as well as to identify (based on the tags) which of that data is to be processed by the tensor array.

After processing of designated data by a tensor array, the processed output can be systolically pulsed (or transferred) via an interconnect to a corresponding memory array (e.g., a memory cell for storing a processed value). This memory cell can be coupled to a sourcing systolic element that tags the data to indicate that it was processed by a particular worker/tensor array and then systolically pulses the tagged, processed data to the destination systolic elements of other workers. Thus, the systolic neural network engine 200 can operate using two-layer systolic data transmission: data is systolically transferred from worker to worker, and data is also systolically transferred within a worker from the tensor arrays to the memory arrays.

Systems and methods of embodiments of the present disclosure may implement the systolic neural network engines using field programmable systolic neural network engines. Using one or more systolic neural network engines can be advantageous because of the ability to adapt to perform computations of a range of neural networks in different architectures and/or having different capabilities, as well as the ability to reconfigure resource usage to efficiently implement larger or smaller neural networks. The disclosed systolic neural network engine, in some embodiments, can be adaptable to various configurations of convolution layers, max pooling layers, and fully-connected layers by using an array of data processing units ("DPUs") as their functional blocks. In some embodiments, the disclosed systolic neural network engine can be reconfigured to make a single worker to run the computational load of a plurality of nodes in a neural network.

The systolic neural network engine can reconfigure the functional blocks (e.g., the tensor arrays and memory arrays) into workers of various hardware configurations using the interconnect resources of the board, a chip, or a semiconductor die. In some implementations, certain tensor or memory arrays may not be used, for example because a worker needs twice as many output maps and thus reaches into an adjacent block to use the memory array (but not the tensor array) of that block. In such implementations, any resources not used become idle, such as, idle tensor arrays and/or idle memory arrays. The control processor can map the neural network to the available hardware on the systolic neural network dies. The control processor can create an identity for each worker and establish how to use the interconnections on the dies in order to achieve the needed arrangement of workers.

In some embodiments, the control processor can receive characteristics of the neural network, for example, from user-facing software that enables a user to specify the architecture of the neural network the user wishes to use. This can include, for example, receiving one or more of a number of inputs, a number of hidden layers, the type of layers, a number of nodes per layer, a number of outputs, or the like. The control processor can compile this information to generate commands to the tensor array and pixel array elements on the die to configure them into workers. The control processor can then provide each configured worker its identity, and the workers can behave according to this assigned identity. For example, the control processor can assign the worker to one or more nodes of the neural network. This can involve defining the process the worker is to perform, the filters the worker is to use, how many pixels maps to construct, and/or the which data from the previous layer is to be used in its processing.

In some embodiments, the control processor can include a software stack running on a user computer. The user can interact with this software stack to simulate the intended DNN architecture. The user informs the software stack of the resources on the target chip, because the chip can be of different sizes and capacities in the number of functional units on the die. The software stack can optimize and create a plan for mapping the user's DNN architecture to the structures on the die. The software stack can create a file or a collection of instructions that is sent to the control processor on the die. The file can include a sequence of steps for the control processor to reconfigure the tensor field arrays and the pixel field arrays on the die to reconfigure them. The control processor can organize the data and synchronize the operations of all the workers on the die. The field programmable neural network can include cores (e.g. workers) that are reconfigurable. The cores can include tensor arrays and/or memory arrays that can be connected based on a synthesized neural network model. The synthesized neural network model can be created by the simulation software and sent to the control processor in the die to configure and/or reconfigure the cores in order to implement the neural network according to the characteristics required by the layers of the neural network.

Advantageously, systems and methods of some embodiments of the present disclosure can utilize the resources of multiplesystolic neural network engines to process data through large neural networks. For example, a computing system can be programmed to use several systolic neural network engines to realize a neural network with a large number of nodes exceeding the capability of a single systolic neural network engine.

In some embodiments, disclosed systolic neural network engine can be disposed on a server with access to external data repositories, in a local memory device, and/or the like. In some embodiments, multiple systolic neural network engine SoCs can be used together on the same (or different) servers and/or local memory devices to realize large neural networks. The systolic neural network engine can include several dies and packages linked together via buses from one layer to the next. For example, the buses can connect an output of a tensor array to an input of a memory array. The board can include a control processor 202 (see FIG. 2A) that can determine the how to configure and/or reconfigure on-die resources to implement the characteristics of a given neural network. The control processor 202 can reconfigure the dies (e.g., by assigning identities to workers of the systolic neural network engine), and the systolic neural network engine can process data through the neural network accordingly.

EXAMPLES OF DISTRIBUTION OF WORKERS ON A DIE

FIGS. 3A-3F depict illustrative examples of a reconfigurable systolic neural network engine that reconfigures its reconfigurable functional elements to account for various neural network characteristics in accordance with some embodiments. As shown in FIGS. 3A-3F, the reconfigurable systolic neural network engine can include tensor arrays 302A, 302B, 302C, 302D (collectively referred to herein as tensor arrays 302), and memory arrays 304A, 304B, 304C, 304D, such as pixel arrays, (collectively referred to herein as pixel arrays 304). In some embodiments, the tensor arrays 302 are disposed such that they alternate between the pixel arrays 304. A worker can include one or more of the tensor array elements and/or pixel array elements. Although the embodiments in FIGS. 3A-3F may illustrate convolutional neural networks that process one or more images, the illustrated and described concepts can be used for any other type of neural network.

Figure 3A:
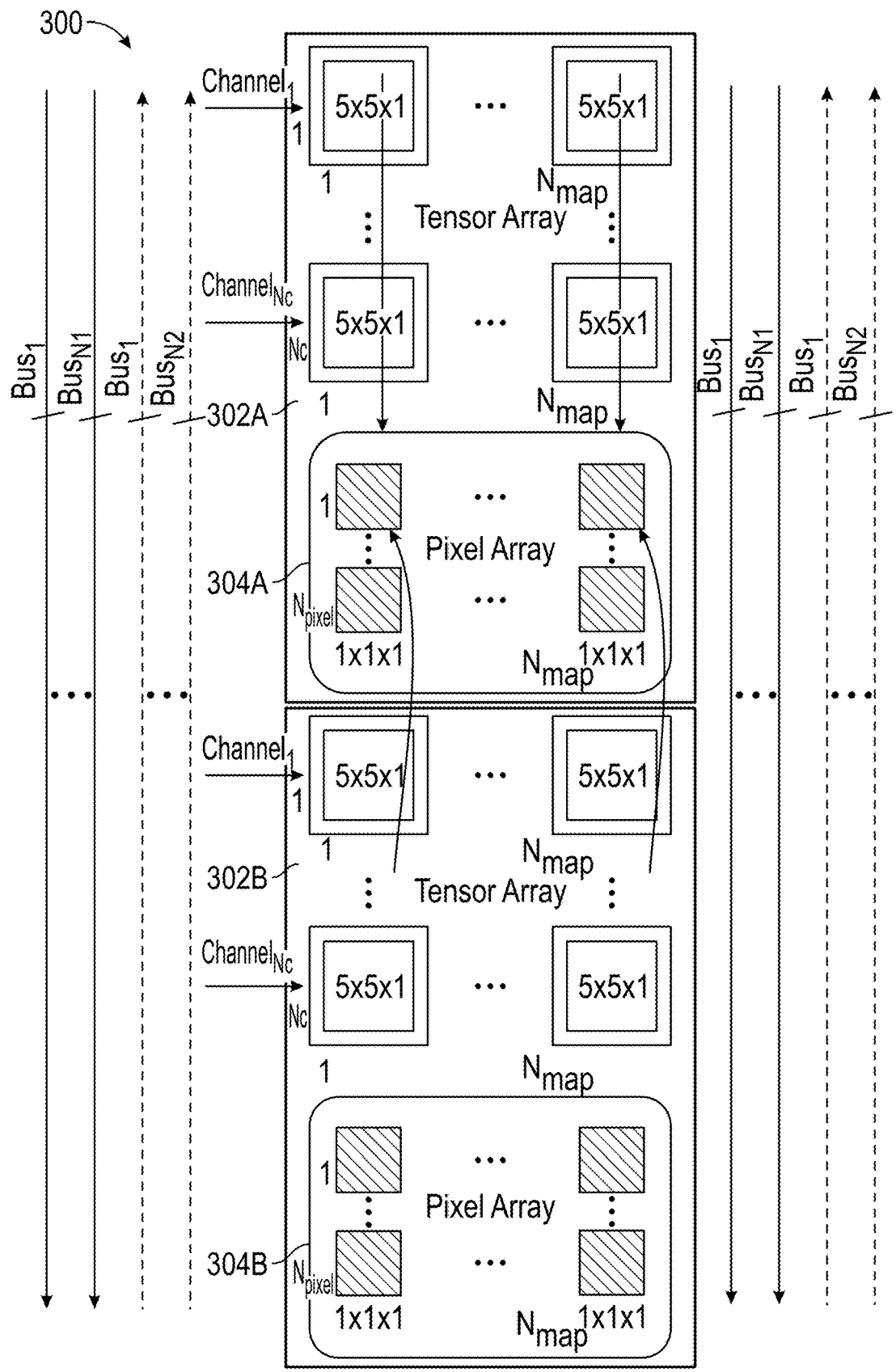
FIGS. 3A-3F depict illustrative examples of a reconfigurable systolic neural network engine that reconfigures reconfigurable functional elements on a die to account for various characteristics in accordance with at least some embodiments.

The tensor arrays 302 and the pixel arrays 304 can be connected using one or more buses. The tensor arrays 302 can perform a combination of operations, such as a multiplication operation with a weighting and/or an addition operation. Though shown as having a 5×5×1 filter size (which can refer to a convolution filter of width and height of 5×5 with 1 referring to a single convolution filter), the tensor arrays can be adapted to perform convolutions for different filter sizes, such as 3×3 filters, by padding the outermost values with zeros. Further, the tensor arrays can be adapted to perform weighting for non-convolutional (e.g., fully connected) neural network layers by padding all values with zeros except for the center value. Thus, the tensor arrays 302 can be adapted to various types of neural network computational requirements. The tensor arrays 302 can pass the output of their processing operations to the pixel arrays 304. FIGS. 3A and 3C illustrate the alternating interconnect channels and tensor array and pixel array areas on die of a systolic neural network engine. In an alternative design, the tensor arrays and pixel arrays can be realized in two or more different dies.

Figure 3B:
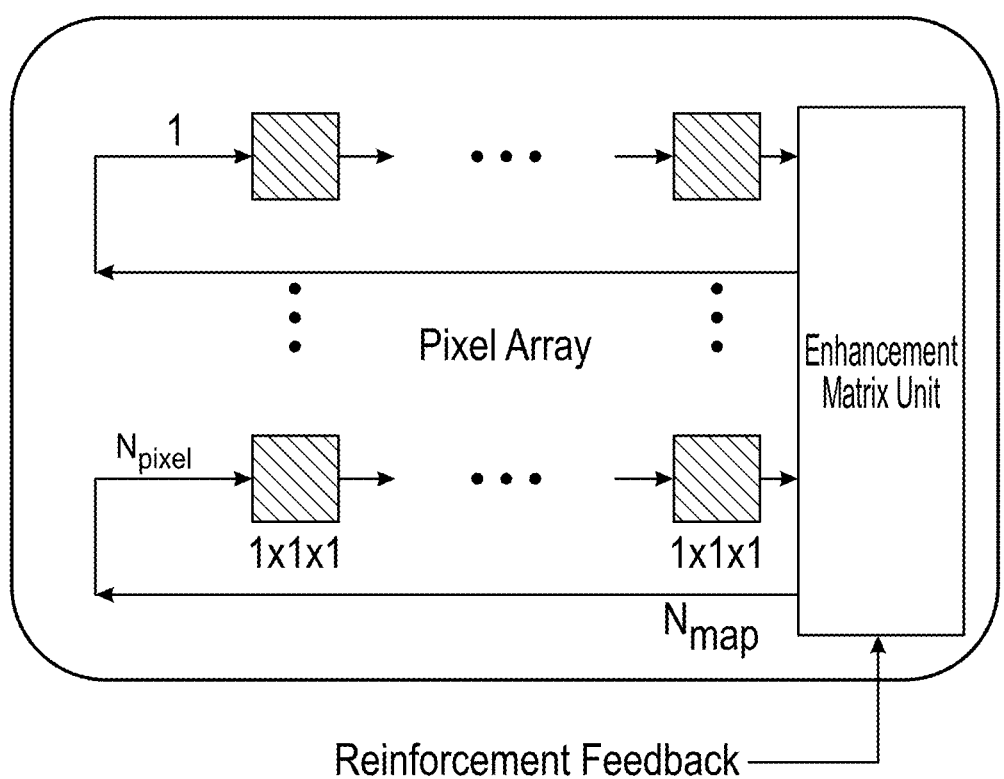
Figure 3C:
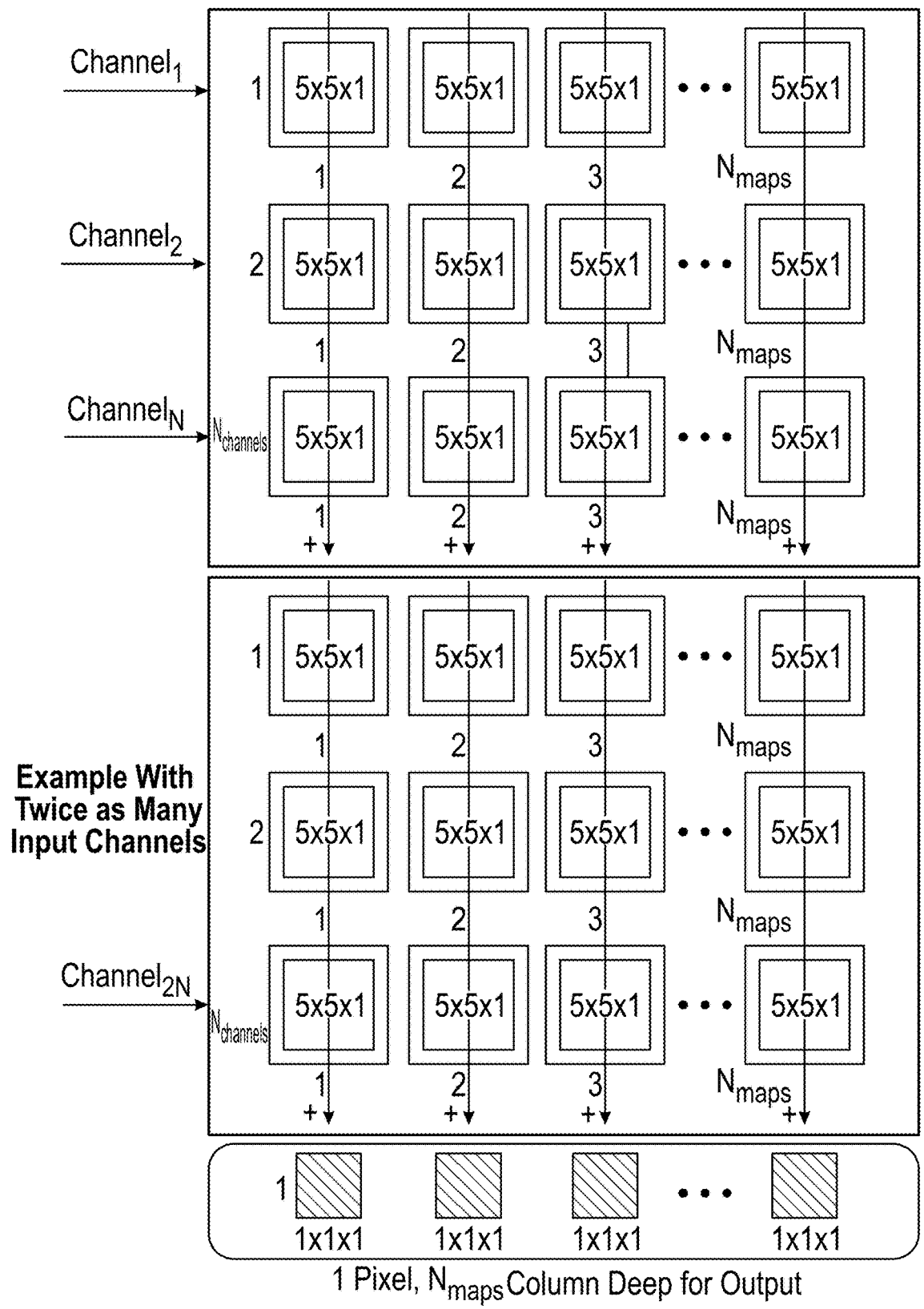

FIG. 3B illustrates hardware structures for the field-programmable neural network processor. An enhancement matrix unit can compare relative amplitudes of activation signals across the maps in a pixel (e.g. a 1D array) and the associated clustering. The enhancement matrix unit can use a "softmax" function to create an enhancement factor for each pixel. A reinforcement feedback can bring information on the enhancement used by a following convolution layer. This additional information, can be used to further enhance the pixels in the current convolution layer, for example in a single cycle. This produces an effect of "dynamic routing" between consecutive convolution layers. Advantageously, dynamic routing between consecutive convolutional layers can be realized in a field programmable neural network. This layer with the enhanced matrix can be used for other purposes, including data augmentation, pruning with the objective of counter-acting the tendency of overfitting in DNNs with many layers, and/or the like.

Enhancement of the convolutional layer activation can be determined by the enhancement matrix unit of FIG. 3B. A circular shift of the content of each pixel can be used to apply the calculated enhancement to each pixel content. The enhancement can exclude irrelevant features in the image. For example, if the image has a crack in the background, the crack may have been detected by filters used by a convolutional layer sensitive to similar inclinations to the crack. If other filters identified the crack, the output of the convolutional filter that identified the crack may be less weighted. Feedback from the enhancement matrix can be used to further adjust the number in the enhancement matrix in the previous convolutional layer, which can be transferred via the reinforcement feedback. This feedback can be used to calculate new enhancement coefficients for each pixel in the previous convolutional layer in order for the DNN to ignore spurious activation outputs in a convolution layer. The coincidence mapping, as described in further detail for FIGS. 6A and 6B, can include the enhancement reinforcement feedback.

Deeper convolution layers can detect higher level patterns in the image than shallower convolutional layers. The output from deeper layers can also be enhanced by the corresponding circuitry available at that convolution layer using the same criteria used in the previous convolution layer. Feedback from the enhancement matrix calculated for the deeper convolution layer can be used to further adjust the number in the enhancement matrix in the previous shallower convolution layer. This information can be transferred back by the reinforcement feedback feed shown in FIG. 3B. This feedback can be used to calculate new enhancement coefficients for each of the pixels in the shallower convolution layer. This new activation outputs can be sent to the subsequent convolution layer and the final outputs from this deeper convolution layer are now propagated forward in the neural network, such as a DNN.

The enhancement in each convolution layer can emphasize "map coincidences". That is, activation outputs that occur around similar areas, which show close positions in the output maps, can be reinforced. The further reinforcement by the feedback can tend to enhance low level patterns that also appear around similar areas in the maps where higher level patterns are also detected. These reinforcement by coincidence across different levels of pattern recognition can operates at the level of individual nodes of the DNN. Other functions can be implemented by these additional reinforcement layers, either by themselves and/or with additional feedback.

In some embodiments, a control processor can reconfigure tensor arrays to perform mathematical operations for a pixel array. For example, the embodiment of FIGS. 3A and 3C can be useful when a particular neural network requires more workers than the number of workers in a tensor array for a particular layer. Based on a determination of the computational load, the control processor can determine that the computational load is higher for this particular layer and may assign more workers for that layer. For example, the control processor can rewire or configure the data to be sent to both tensor arrays 302A and 302B for this particular layer. The data can be passed from the buses (illustrated in the figures) into both tensor arrays 302A and 302B. After operations are performed on the tensor arrays 302A and 302B, the output can be sent from the tensor arrays to the same pixel array 304A. For example, the output of the two tensor arrays 302A and 302B can be combined, such as by using a non-linear function, and placed in one pixel of the pixel array 304A. A sigmoid or hyperbolic function can be used. Advantageously, computations in the layer of the neural network that requires more computational load can be performed faster because multiple tensor arrays can be used.

The embodiments of FIG. 3A and 3C can also be advantageous when more input channels are needed for a pixel calculation than is available for a tensor array in accordance with at least some embodiments. If more input channels are needed for a particular layer of the neural network than is available, a plurality of tensor arrays 302 can be implemented for that particular layer. The control processor can communicate and reconfigure the tensor array fields such that the total input channels for the plurality of tensor arrays is equal to or greater than the number of input channels required for the particular worker in a layer of the neural network. For example, the input to this layer can be rerouted to the input to both tensor arrays 302A and 302B. The outputs of the sensor arrays 302A and 302B can be rerouted to the pixel array 304A. Accordingly, multiple tensor arrays can work together and the results can be combined for each pixel in the pixel array 304A.

Figure 3D:
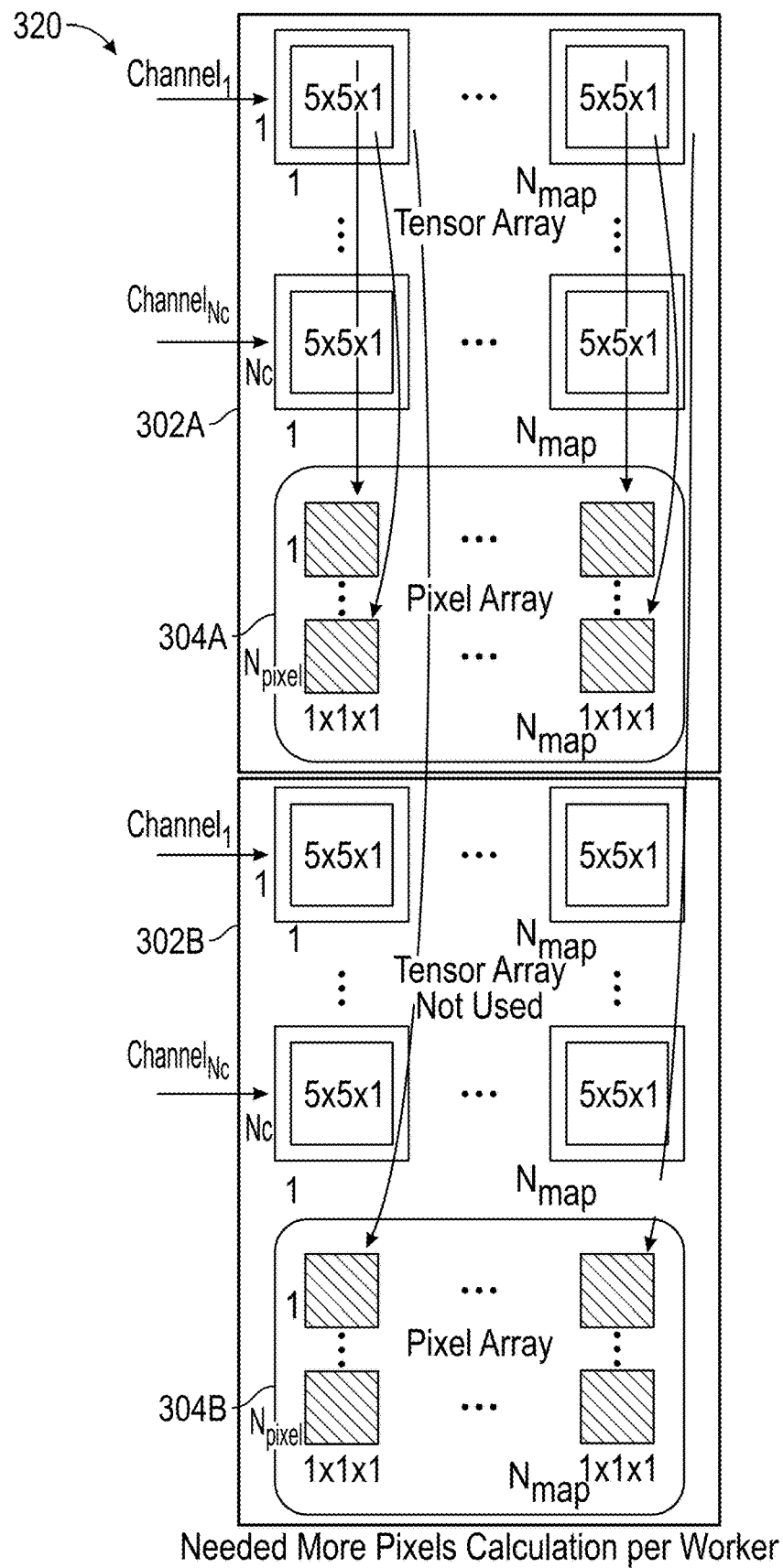

FIG. 3D illustrates a single tensor array 302A outputting to multiple pixel arrays 304A, 304B in accordance with some embodiments. Advantageously, if a certain layer of a neural network requires more outputs than provided by a tensor array, a control processor can reconfigure tensor arrays to perform pixel calculations per worker to multiple pixel arrays. In the example of FIG. 3D, the control processor can route the input channels to a single tensor array 302A. The tensor array 302A can perform mathematical operations, such as non-linear functions or max output. The control processor can then reroute the output of the tensor array 302A to multiple pixel arrays 304A, 304B.

Figure 3E:
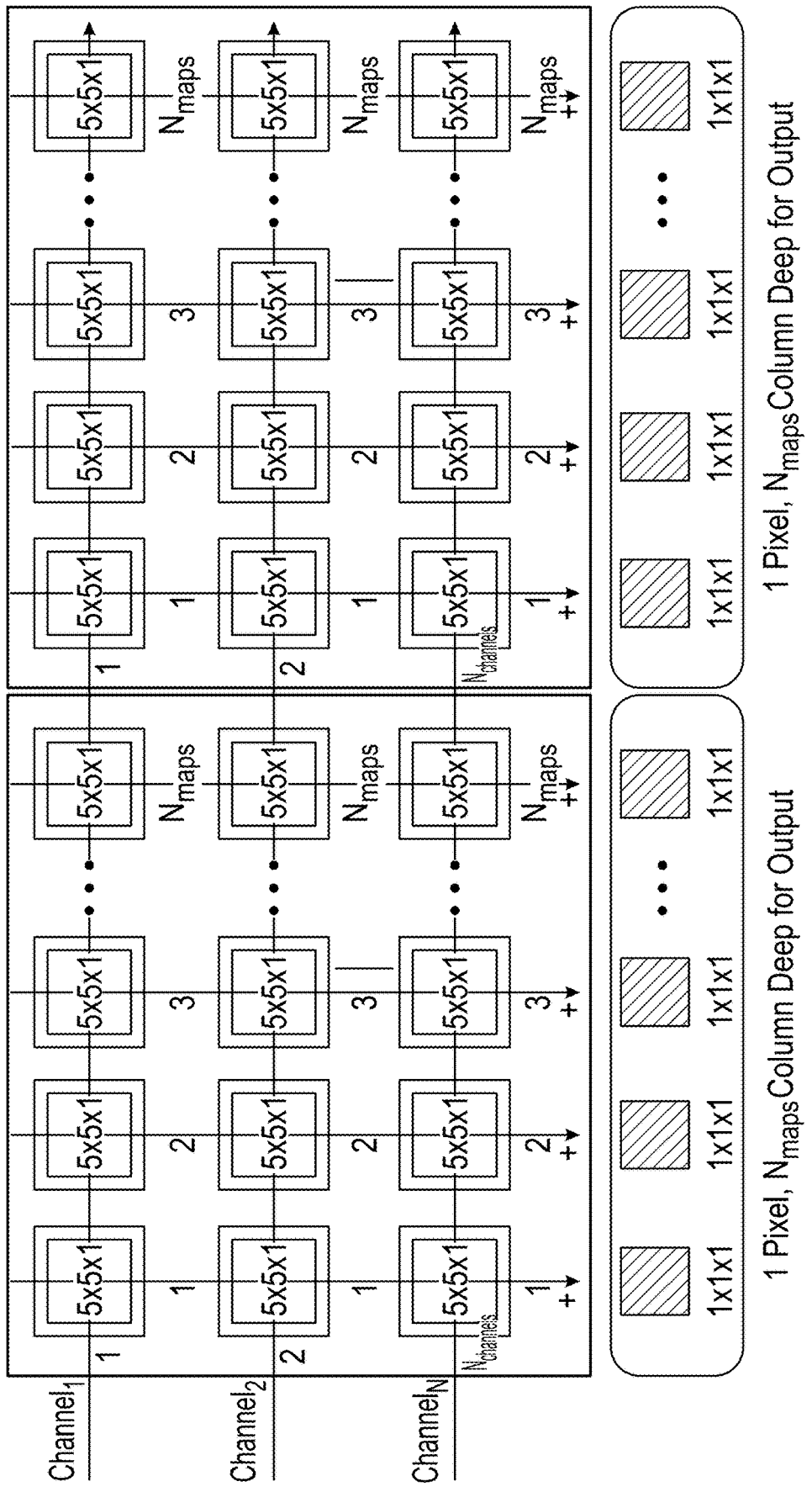
Figure 3F:
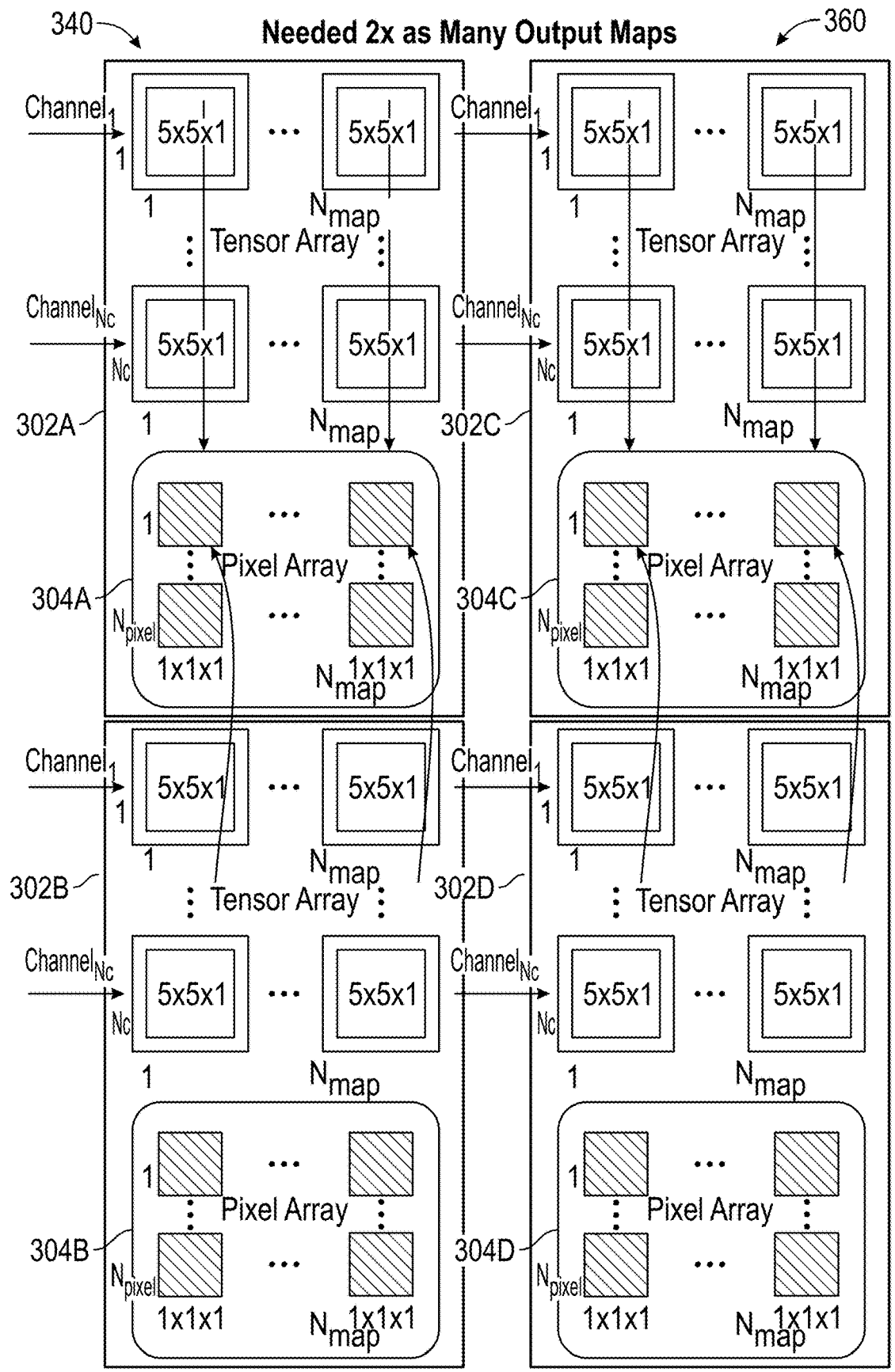

FIG. 3E and 3F illustrate examples of four tensor arrays 302A, 302B, 302C, 302B and four pixel arrays 304A, 304B, 304C, 304D for a particular layer of the neural network in accordance with some embodiments. If a particular worker requires twice as many output maps of pixel arrays than the embodiment of FIG. 3A and 3C, for example because it has been assigned to perform the computations of twice as many nodes of the neural network, the control processor can reroute the input of the layer as input into the four tensor arrays 302A, 302B, 302C, 302B. The four tensor arrays 302A, 302B, 302C, 302B can perform the mathematical operations. The control processor can reroute the output of the four tensor arrays 302A, 302B, 302C, 302B to four pixel arrays 304A, 304B, 304C, 304D. Advantageously, twice as many output maps can be created.

Using the control processor to dynamically configure workers to have a certain number of tensor arrays and/or pixel arrays can be advantageous. For example, the control processor can distribute the computational load of all neural network (such as DNN) nodes equally (e.g., balanced among workers available on die). For very large DNNs, the control processor can have more nodes to a worker, and each layer in the DNN can configure workers of different sizes. For example, some workers can be created with a larger number of tensor array fields or pixel array fields than other workers. Another advantage is that the control processor can reconfigure the die to accommodate to various requirements of different neural networks (e.g. neural networks requiring more channels for a pixel calculation, more pixel calculations on a certain layer per worker, twice as many output maps, and/or the like). Such reconfiguration can further allow for the use of multiple dies at the same time for very large neural networks.

Workers can be allocated to perform the work of multiple nodes in a neural network. In order to accommodate neural networks having more nodes than there are workers, a single worker can be configured to perform the work of multiple nodes. For example, one systolic neural network engine can include a certain number of workers W (e.g. 100,000 workers). The neural network can include a certain number of nodes N (e.g. 1,000,000 nodes). In this example, there are not enough workers for the number of nodes in the neural network. Thus, each worker can be tasked to perform the processing of multiple nodes (e.g. 100 nodes/worker).

Figure 3G:
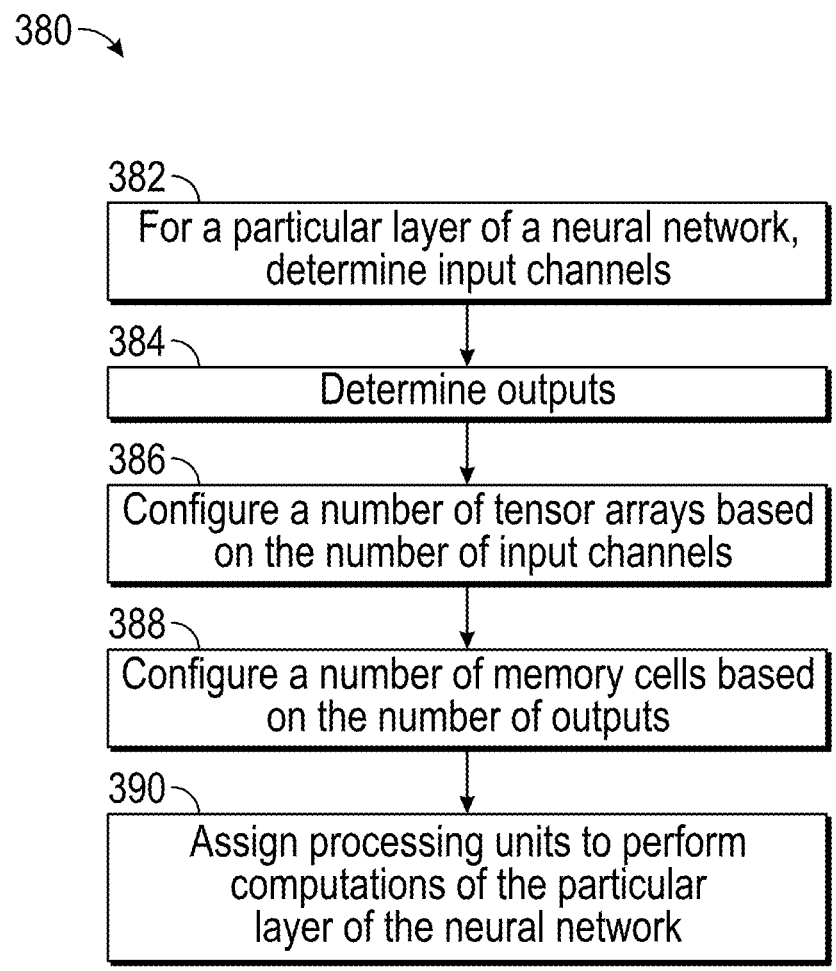
FIG. 3G illustrates an example flow diagram of a process for performing computations of a neural network by configuring a portion of a processing chip in accordance with some embodiments.

FIG. 3G illustrates an example flow diagram of a process 380 for performing computations of a neural network by configuring a portion of a processing chip in accordance with some embodiments. The process 380 can be performed by the control processor or controller. The process 380 can be implemented on a device for performing computations of a neural network that can include a processing chip and the controller. The processing chip can include an arrangement of a plurality of tensor arrays, an arrangement of a plurality of memory cells, and a plurality of interconnects connecting particular ones of the tensor arrays to the particular ones of the memory cells. The controller can determine a number of input channels and a number of output maps for particular memory arrays, such as pixels, configure a portion of the processing chip into a plurality of processing units (e.g. workers) to perform computations by configuring a number of tensor arrays and a number of memory cells, and assign the processing units (e.g. workers) to perform computations of a particular layer of a neural network. For example, the controller can configure a number of tensor arrays based on the number of input channels and/or the controller can configure a number of memory cells corresponding to a number of output maps.

At block 382, the process 380 can determine for a particular layer of a neural network a number of input channels. At block 384, the process 380 can determine a number of output maps generated for particular ones of a plurality of pixels.

At block 386, the process 380 can configure a number of tensor arrays based on the number of input channels. If a particular layer of the neural network requires more input channels than the number of input channels available for a single tensor array, the process 380 can configure a plurality of tensor arrays together to increase the number of input channels. For example, in the illustration of FIG. 3C, a tensor array can include N input channels. By configuring two tensor arrays, the number of input channels can be doubled to 2N as is illustrated in the figure.

In some embodiments, a tensor array can perform a single multiplication operation. In other embodiments, a tensor array can perform a plurality of multiplication operations.

At block 388, the process 380 can configure a number of memory cells based on the number of output maps. If a particular layer of the neural network requires more output maps than the number of output maps available for a single tensor array, the process 380 can configure a plurality of tensor arrays together to increase the number of output maps. For example, in the illustration of FIG. 3F, a tensor array can include N output maps. By configuring two tensor arrays, the number of output maps can be doubled to 2N output maps as is illustrated in the figure.

At block 390, the process 380 can assign processing units (e.g. workers) to perform computations of the particular layer of the neural network. The controller can route the input to the processing chip. Then, the processing units (e.g. workers) can perform computations of layers of the neural network. For a particular processing unit (e.g. worker), the tensor arrays can send output data to corresponding memory cells over the interconnects. The processing units (e.g. workers) can form an array that include systolic transfer structures to systolically transfer outputs generated by processing units (e.g. workers) for one layer to processing units (e.g. workers) for the following layer of the neural network. The controller can route an output of the processing chip as an output of the neural network.

In some embodiments, a default processing unit (e.g. worker) includes a tensor array and a memory cell connected via an interconnect, where the default processing unit (e.g. worker) has the capacity to process one channel and generate one output. The process 380 can determine that a number of input channels for a particular one of the plurality of memory arrays, such as pixels, in the particular layer exceeds the capacity of the default processing unit (e.g. worker). The process 380 can then configure processing units (e.g. workers) to combine tensor arrays to be able to process the number of input channels while using less than all of the tensor arrays.

In some embodiments, the process 380 can determine that a number of output maps generated for a particular one of the plurality of memory arrays, such as pixels, in the particular layer exceeds the capacity of the default processing unit (e.g. worker). The process 380 can then configure processing units (e.g. workers) to combine memory cells to be able to process the number of output maps while using less than all of the memory cells.

Figure 4A:
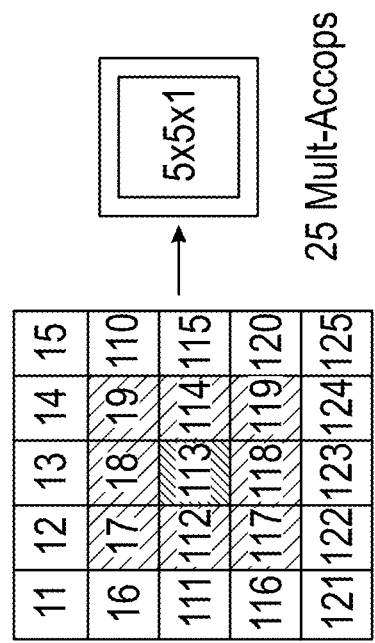
FIG. 4A illustrates an example of a 5×5×2 input into a layer in accordance with some embodiments.
Figure 4A:
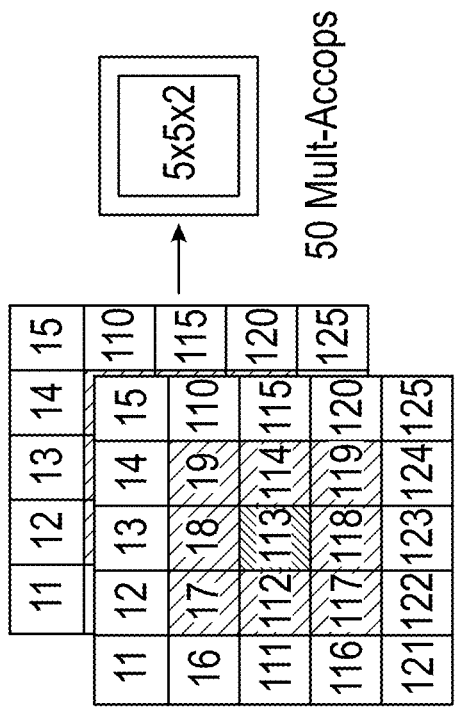
Figure 4A:
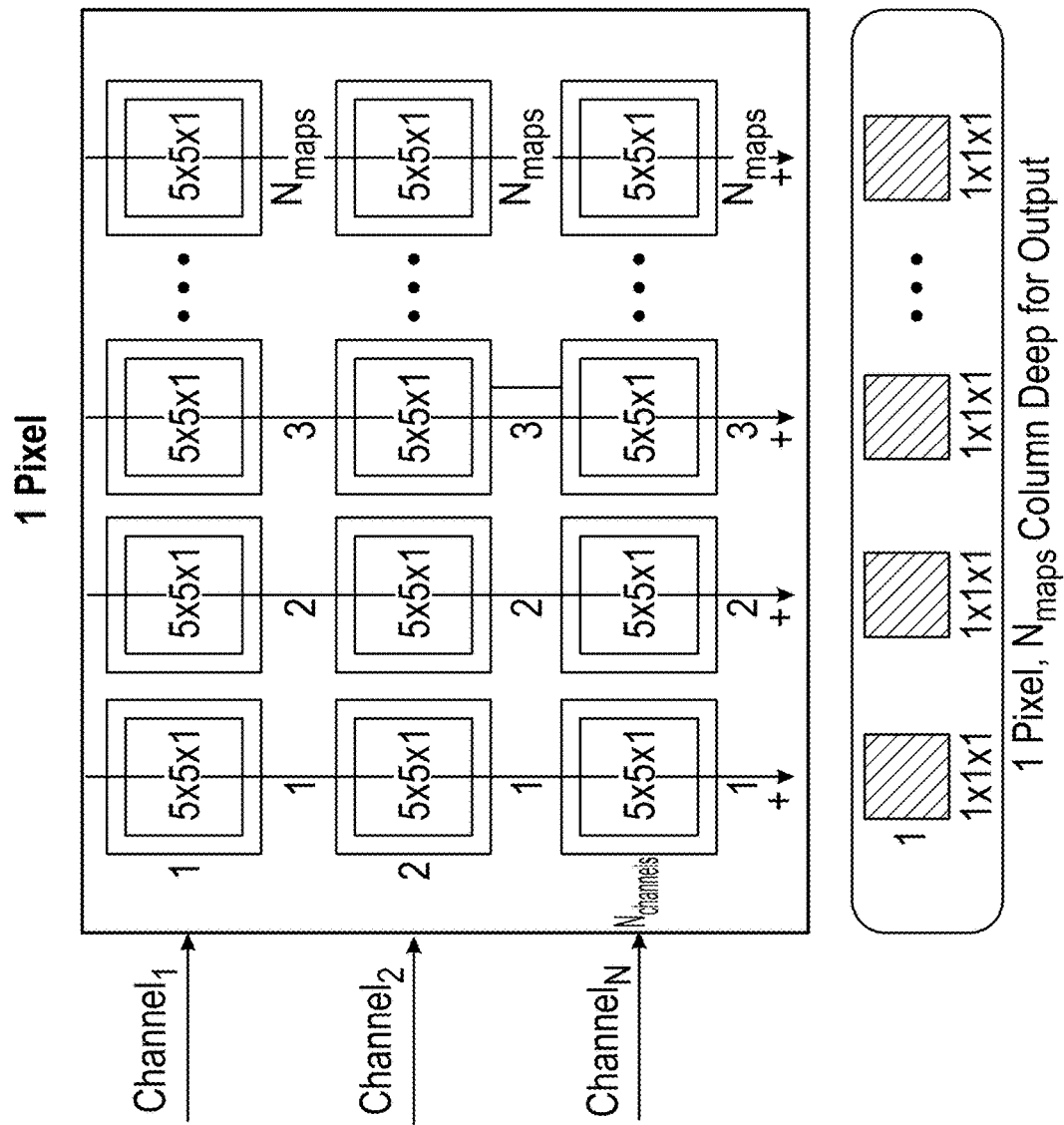

FIG. 4A illustrates an example of how a convolution layer can be realized as a worker of the systolic neural network. As is illustrated in the left portion of the figure, the input can have size of 5×5×2 (which represent width, height, and depth) input. The input can be subjected to 5×5×2 multiply-accumulate operations (or a total of 50 multiply-accumulate operations) on the left and/or 5×5×1 multiply-accumulate operations in the middle. The result of this operation on the right can represent convolution of the input. As is illustrated in the right portion of the figure, the worker can accept N channels as inputs and can output 1×N pixels. In some embodiments, the number of input channels can be different from the number of output maps. The worker can include 5×5×1 tensor arrays, one or more of which can operate as a filter. Different filter sizes, such as 3×3 or 1×1 can be obtained by zero-padding 5×5 filters, as described herein.

Figure 4B:
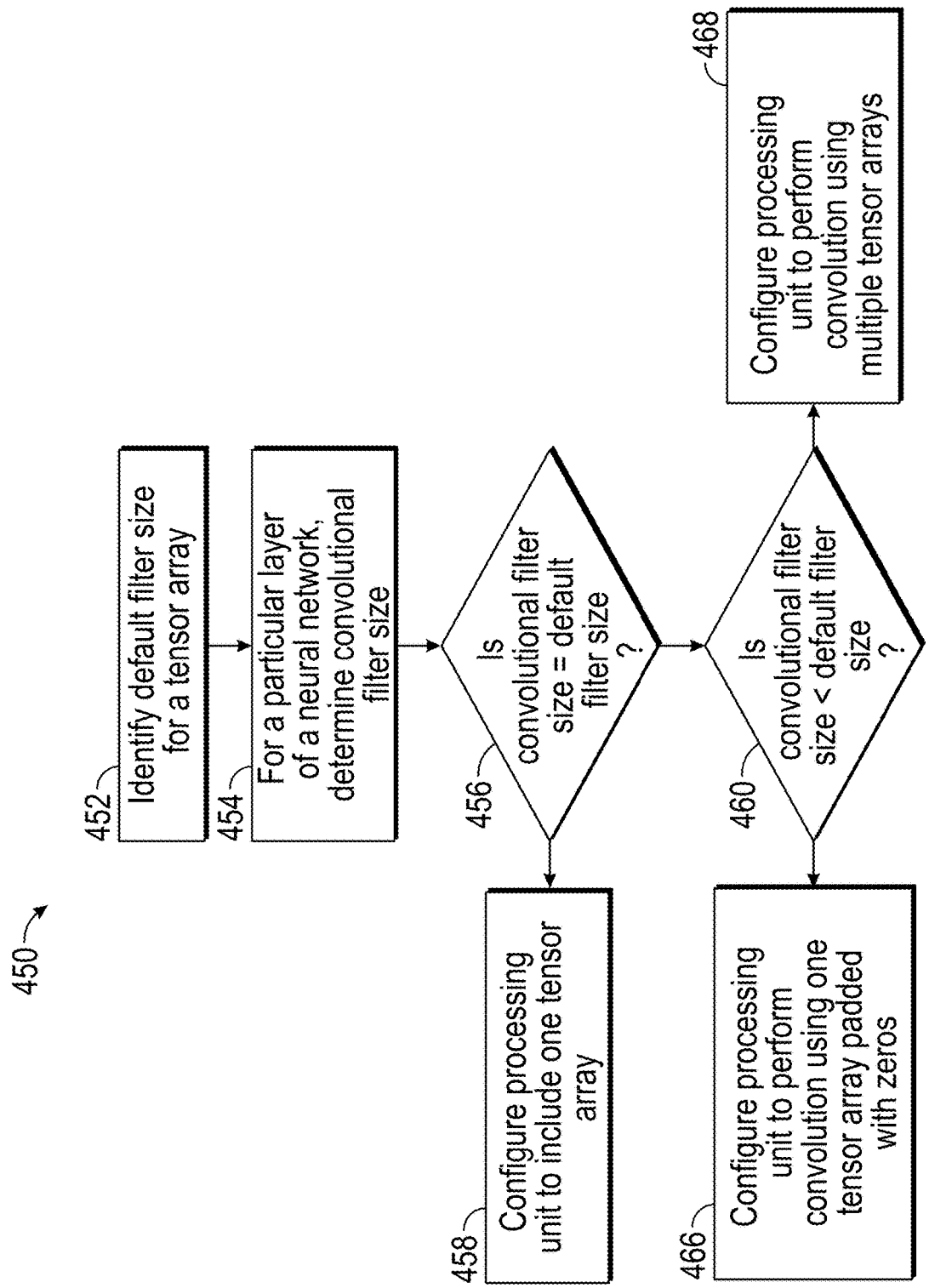
FIG. 4B illustrates an example flow diagram of a process for performing computations of a neural network based on a convolutional filter size in accordance with some embodiments.

FIG. 4B illustrates an example flow diagram of a process 450 for performing computations of a neural network based on a convolutional filter size in accordance with some embodiments. The process 450 can be performed by the control processor or controller. The process 450 can be implemented on a device for performing computations of a neural network can include a processor chip and the controller. The processor chip can include an arrangement of tensor arrays to perform computations of the neural network according to a convolutional filter size. The processing chip can include an arrangement of memory cells to store the output of the tensor arrays. The processing chip can include interconnects enabling communication between tensor arrays and the memory cells. The controller can determine convolutional filter sizes for a particular convolution layer, and configure tensor arrays to perform the computations of the convolutional layer.

At block 452, the process 450 can identify a default filter size, such as a default convolutional filter size, for the tensor array. The processing chip can include a plurality of tensor arrays. In some embodiments, the default filter size for each of the tensor arrays can be the same and/or of different size. The tensor arrays can each perform a single computation (e.g. multiplication, addition) and/or a plurality of operations. The processing units (e.g. workers) can form an array that include systolic transfer structures to systolically transfer outputs generated by processing units for one layer to processing units for a following layer of the neural network.

At block 454, the process 450 can determine, for a particular layer of a convolutional neural network, a particular convolutional filter size used for to perform the convolution.

At block 454, the process 450 can determine whether the convolutional filter size is the same as the default filter size. In some embodiments, the default convolutional filter size is 5×5×1. If the convolutional filter size is equal to the default filter size, the process 450 can proceed to block 458, where it can configure a processing unit (e.g. worker) to include one of the tensor arrays and configure the processing unit (e.g. worker) to perform the convolution using the default convolutional filter size.

If at block 456, the convolutional filter size is not equal to the default filter size, the process 450 can proceed to block 460, where it can determine if the convolutional filter size is greater than the default filter size. If the convolutional filter size is smaller than the default filter size, the process 450 can proceed to block 466 where it can configure the processing unit (e.g. worker) to include one tensor array and configure the processing unit to perform the convolution using the default convolutional filter size padded with zeros, as described herein. A zero-padded portion with an unpadded portion of the default convolutional filter can correspond to the particular convolutional filter size. The process 450 can configure a particular tensor array to perform computation of a fully connected layer of the convolutional neural network by instructing the tensor array to use a center value of the default convolutional filter for processing input data and padding remaining values of the default convolutional filter with zeros.

If at block 460 the convolutional filter size is greater than the default filter size, the process 450 can proceed to block 468 where it can configure the processing unit (e.g. worker) to include multiple tensor arrays to perform the particular convolution.

Figure 4C:
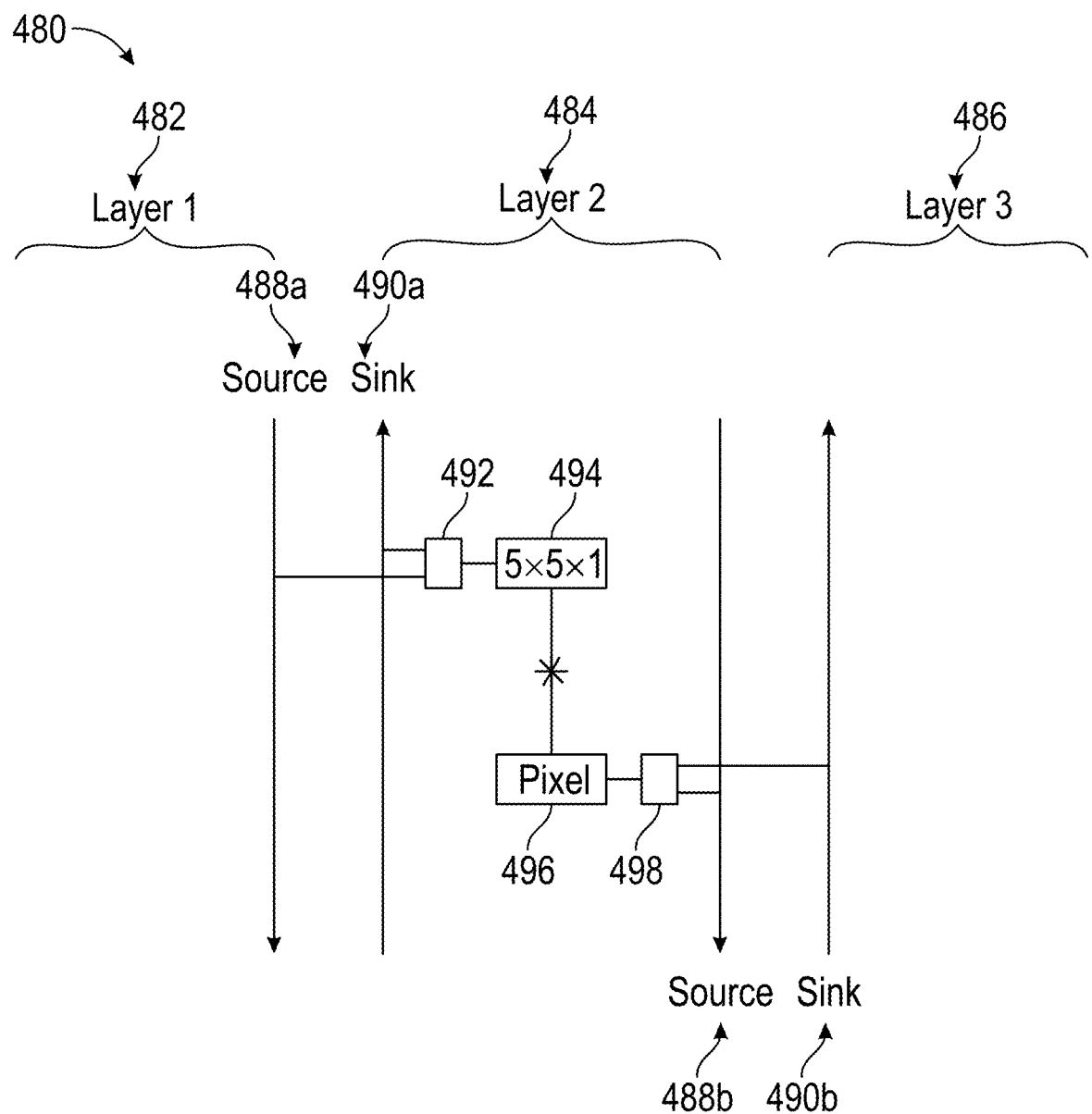
FIG. 4C illustrates an example systolic transfer structure in accordance with some embodiments.

The controller can route the input into the processing chip for the processing chip to perform the particular convolution using the processing unit. After the processing units of the processing chip perform the computations of the neural network, the controller can route an output of the processing chip as an output of the neural network. FIG. 4C illustrates an example systolic transfer structure 480 in accordance with some embodiments. The neural network can include a plurality of layers, such as a first layer 482, a second layer 484, and a third layer 486. The information can be communicated via one or more sources 488A and 488B, and one or more sinks 490A and 490B.

The systolic transfer structure can include an input systolic element 492, a filter 494 (such as a convolutional filter of size 5×5×1), a pixel 496, and an output systolic element 498. The input systolic element 492 of the first layer 484 can receive the input, pass the input to the filter 494, the output of which can be stored in the pixel 496, and sent to the output systolic element 498, to be passed to the third layer 486. Data can be transferred by the systolic transfer structure 480, for example, from layer 482 to layer 484 during inference, and/or backward, such as from layer 486 to layer 484 during backpropagation. In case of backward transfer, the roles of sources and sinks can be reversed, such that 490b can act as a source and 488b can act as a sink. Although the embodiments in FIGS. 4A-4C may illustrate convolutional neural networks that process one or more images, the illustrated and described concepts can be used for any other type of neural network.

EXAMPLES OF MAPPING NODES TO WORKERS FOR EACH LAYER OF THE NEURAL NETWORK

In some cases, the control processor can reconfigure tensor array fields and pixel array fields into workers. Each layer in the DNN may need different sized workers. Each layer in the DNN might have different number of workers realized on the die, and a different number of nodes in a layer may be mapped to the workers created for that layer. The final number of workers can depend on the available resources on a given die. For example, received characteristics may include number of layers, number of nodes per layer, node interconnections, and node computations input layer, and output layer, and any number of intermediate, internal, or "hidden" layers between the input and output layer, a number of inputs, a number of hidden layers, the type of layers, a number of outputs, non-linearity of the layers, hyperparameters for learning on the targeted neural network, and/or the like. TABLE 1 illustrates an example of nine out of nineteen layers of a convolutional neural network in accordance with some embodiments.

TABLE 1

| | Layers of a Convolutional Neural Network | | | | |
|---|---|---|---|---|---|
| VGG-16 | Activation Size | Act Function | Activation Count | Parameters to Learn | Computational Load |
| Input | (224, 224, 3) | | 150,528 | 0 | |
| 1 Conv1 (f = 3, s = 1, same) | (224, 224, 64) | ReLU | 3,211,264 | 1,792 | 86,704,128 |
| 2 Conv2 (f = 3, s = 1, same) | (224, 224, 64) | ReLU | 3,211,264 | 36,928 | 1,849,688,064 |
| 3 Max Pool2 (f = 2, s = 2) | (112, 112, 64) | — | 802,816 | 0 | |
| 4 Conv3 (f = 3, s = 1, same) | (112, 112, 128) | ReLU | 1,605,632 | 73,856 | 924,844,032 |
| 5 Conv4 (f = 3, s = 1, same) | (112, 112, 128) | ReLU | 1,605,632 | 147,584 | 1,849,688,064 |
| 6 Max Pool4 (f = 2, s = 2) | (56, 56, 128) | — | 401,408 | 0 | |
| 7 Conv5 (f = 3, s = 1, same) | (56, 56, 256) | ReLU | 802,816 | 295,168 | 924,844,032 |
| . . . | | | | | |
| 18 Max Pool13 (f = 2, s = 2) | (7, 7, 512) | — | 25,088 | 0 | |
| 19 FC14 | 4,096 | ReLU | 4,096 | 102,760,449 | 102,760,448 |

TABLE 2 illustrates an example of assignment of workers for the nine layers of the convolutional neural network in accordance with some embodiments.

TABLE 2

Assigning Workers to Layers

| | Total # of Workers (Target): 100,000 # Workers (Equal Computational Load) | Die Area (%) | N (Nodes/ Worker) | # of Pixels/ Worker |
|---|---|---|---|---|
| 1 | 560 | 0.56 | 5,730 | 89.53 |
| 2 | 11,956 | 11.96 | 269 | 4.20 |
| 3 | | | | |
| 4 | 5,978 | 5.98 | 269 | 2.10 |
| 5 | 11,956 | 11.96 | 134 | 1.05 |
| 6 | | | | |
| 7 | 5,978 | 5.98 | 134 | 0.52 |
| . | | | | |
| . | | | | |
| . | | | | |
| 18 | | | | |
| 19 | 654 | 0.66 | 6 | 6.17 |

As shown in TABLE 1, the input to the neural network is a 224×224×3 array. The first convolution channel creates 64 output channels. The activation size is 224×224×64, and the activation count is 3,211,264 (or 224 times 224 times 64), as illustrated in Table 1. There are 3 input channels for the first convolution layer and a 3×3 filter is used. Thus, the computational load for the first convolution layer is 86,704,128 (or 3,211,264 times 3 times 3).

As shown in TABLE 2, a total number of 100,000 available workers are available on the die. The workers can be assigned to the layers based on the computational load. For example, the computational load of the first convolution layer is smaller than the other convolutional layers. Accordingly, a smaller number of workers are assigned to the first convolutional layer than that of the other convolutional layers.

Figure 5A:
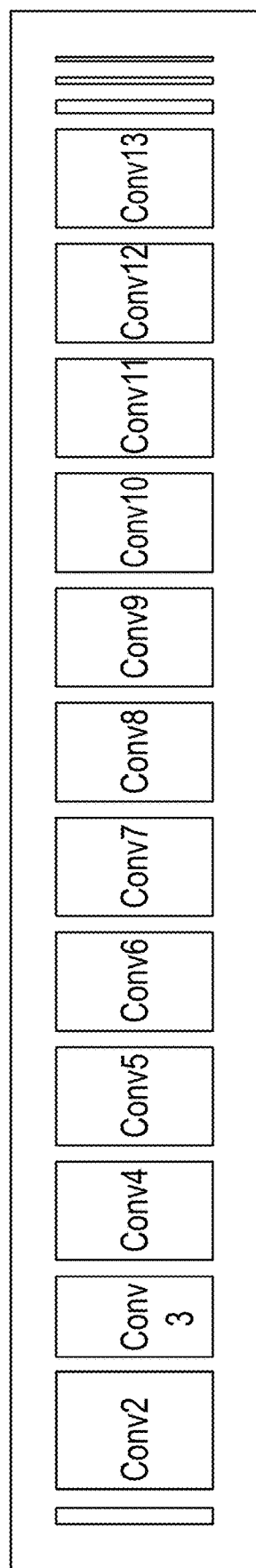
FIG. 5A illustrates an example of worker assignment for convolutional layers on a die in accordance with some embodiments.

FIG. 5A illustrates an example of worker assignment for convolutional layers on die in accordance with some embodiments. As shown, convolutional layer 2 has a higher computational load than convolutional layers 1 and 3. Thus as shown in FIG. 5, more resources (e.g. more workers) are assigned to convolutional layer 2, and this layer occupies more of the die area than the convolutional layers 1 and 3. Advantageously, two or more layers with different computational loads can be performed in substantially the same or similar time. Additionally or alternatively, the time it takes for a convolutional layer to perform its operations is reduced and/or increased to be closer to the time for another convolutional layer. In some embodiments, the workers can be distributed such that computation(s) for each layer of the neural network is completed at substantially the same or similar time.

In some embodiments, a group of workers can be assigned the same or similar computational resources. In such circumstances, the workers for each group can be assigned to convolutional layers based on a relative computational load of the convolutional layer as compared to the full computational load for the neural network. For example, if there are 6 workers available each with the same computational load, and a neural network has two convolutional layers, the first convolutional layer with computational load twice as large as that for the second convolutional layer, the first convolutional layer can be assigned to 4 workers and the second convolutional layer can be assigned 2 workers.

In some embodiments, workers can include different computational resources. In such circumstances, the assignment of the workers can be based on both the computational load and the computational resources available for the workers. For example, a die can include 6 available workers, a first set of 3 workers with twice as many computational resources than the second set of 3 workers. If a neural network includes two convolutional layers, the first convolutional layer with computational load twice as large as that for the second convolutional layer, the first convolutional layer can be assigned to the first set of 3 workers, and the second convolutional layer can be assigned the second set of 3 workers.

Traditional processors, when performing neural network computations, assign all resources to a particular layer of the neural network. The processor resources perform the computations of that layer, the output values are saved into a memory or buffer, and then the saved data is fetched back again to the same processing hardware for performing computations of the next layer. In contrast, embodiments of the disclosed neural network engine implement a pipelined structure where different workers can be assigned to different layers, such that inter-layer data is systolically pulsed through the workers without the need to save/fetch data from an external memory. Advantageously, this can speed up the time it takes to process data through the neural network by reducing the need to move data in and out of a memory from one layer to the next. Therefore, the delay in transferring the activation signals from one layer to the next is eliminated as this delay is overlapped by the computation in each receiving node.

Referring to the illustrations in Tables 1 and 2, for the first convolutional layer, because its computational load can be 86,704,128 and because there can be 560 workers assigned for the first convolutional layer, the number of nodes assigned per workers can be 5,730. Because the output of the first convolutional layer can be 224×224×64 (in other words, the output has 64 output channels), the total number of pixels assigned to each worker can be 89.53, rounded up to 90.

Figure 5B:
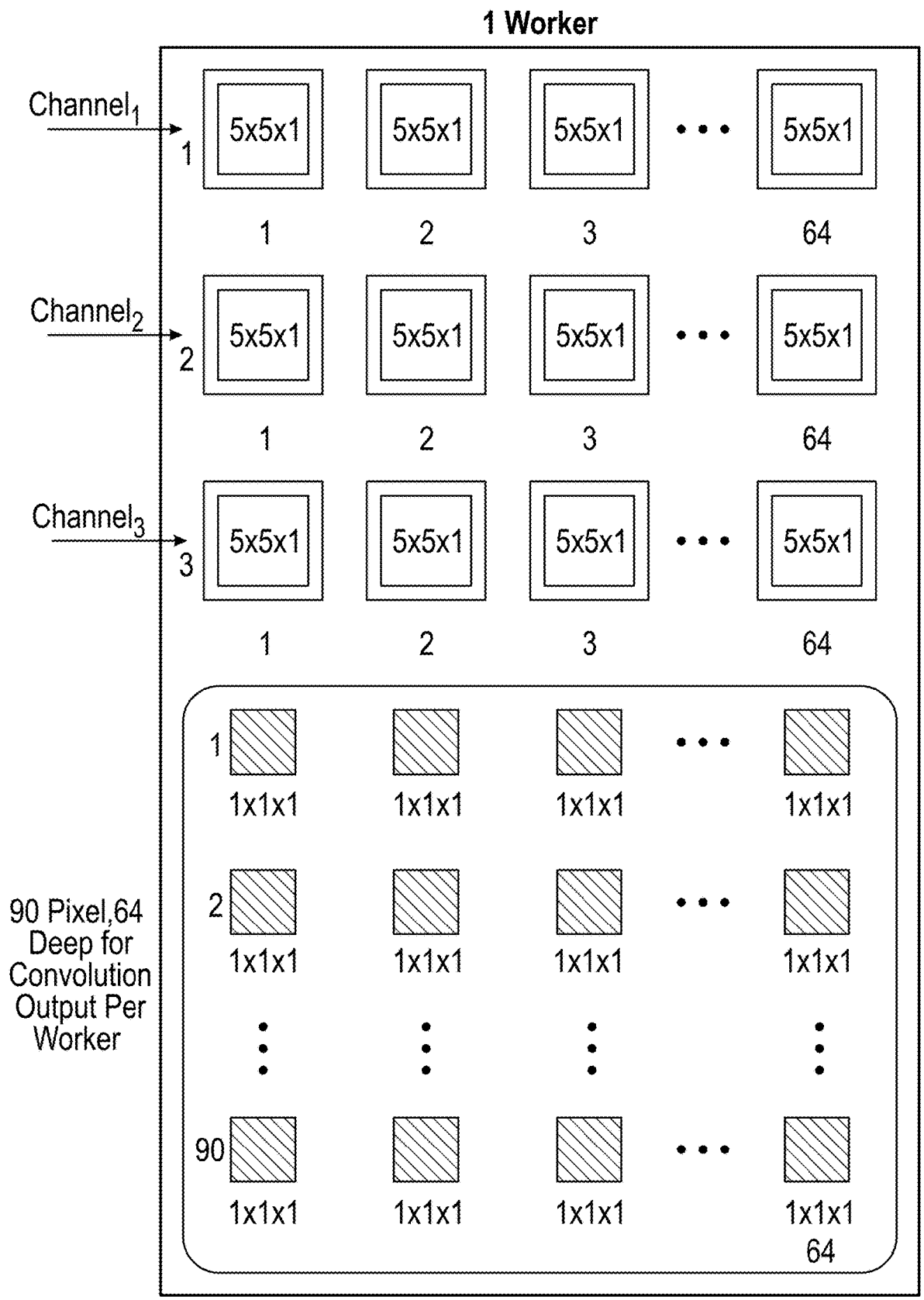
FIGS. 5B-5D illustrate examples of a final configuration of workers in accordance with particular layers of the neural network in accordance with some embodiments.
Figure 5C:
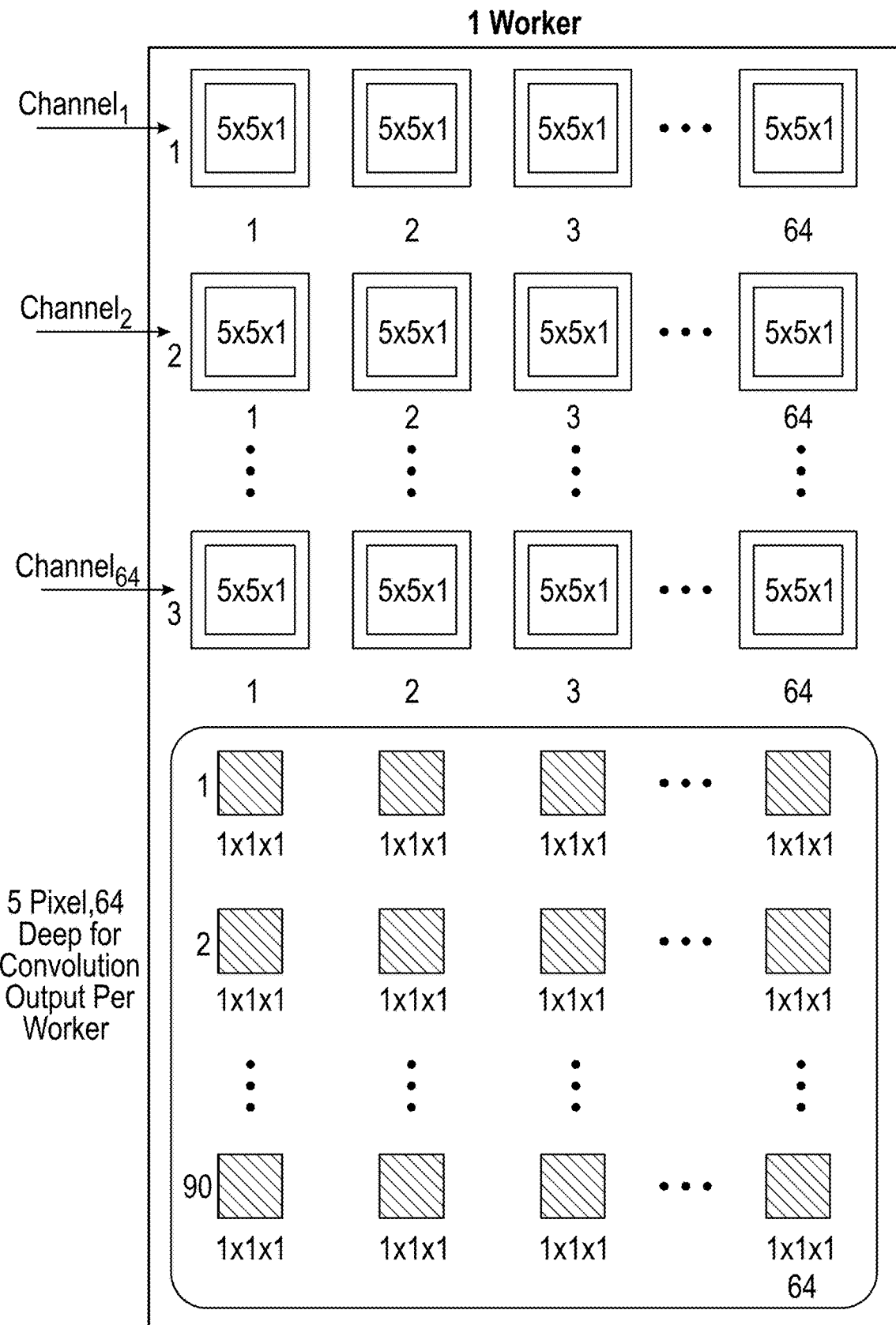
Figure 5D:
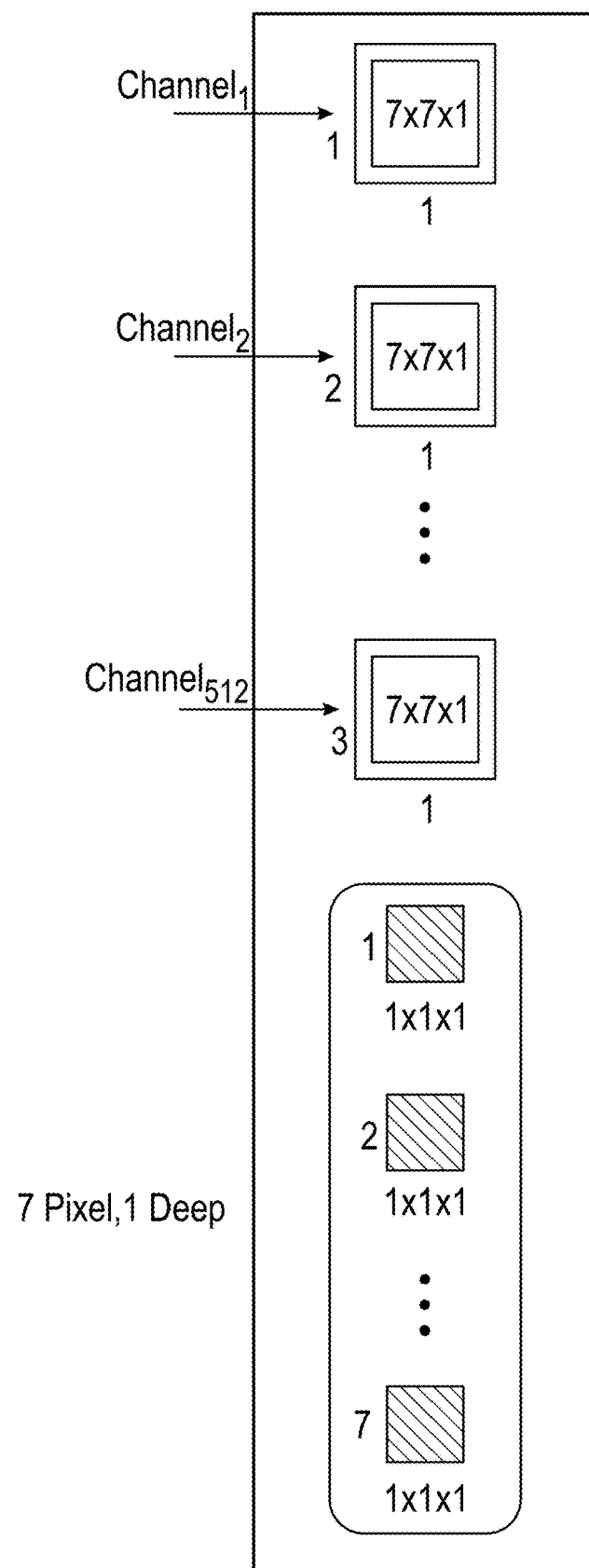

FIGS. 5B-5D illustrate examples of a final configuration of workers in accordance with particular layers of the neural network in accordance with some embodiments. FIG. 5B illustrates an example of workers assigned to a number of nodes for a first convolutional layer of a systolic neural network in accordance with some embodiments.

As described above in connection with Table 2, 560 workers can be assigned to the first convolutional layer. The 3 input channels can be fed in parallel into the systolic neural network. 90 5×5 sets of input data can be fed into each of the 3 input channels of a tensor array. The tensor array can perform mathematical operations to generate 90 1×1×1 pixels across 64 output channels.

FIG. 5C illustrates an example of workers assigned to a number of nodes for a second convolutional layer of a systolic neural network in accordance with some embodiments. For the second convolutional layer, because the computational load can be 1,849,688,064 and because 11,956 workers can be assigned to the second convolutional layer (see Tables 1 and 2), the number of nodes assigned per worker can be 269. Because the output of the first convolutional layer can be 224×224×64 (in other words, the output has 64 output channels), the total number of pixels assigned to each worker can be about 4.2, rounded up to 5.

The 64 input channels can be fed in parallel into a systolic neural network. 5 5×5 sets of input data can be fed into each of the 64 input channels of a tensor array. The tensor array can perform mathematical operations to generate 5 1×1×1 pixels across 64 output channels.

FIG. 5D illustrates an example of workers assigned to a number of nodes for the fully connected layer of a systolic neural network in accordance with some embodiments. For the fully connected layer, because the computational load can be 102,760,449 and because there can be 664 workers assigned to a first convolutional layer, the number of nodes assigned to each worker can be 6. Because the output of the first convolutional layer can be 7×7×512 (in other words, the output has 512 output channels), the total number of pixels assigned to each worker can be about 4.2, rounded up to 5. The 512 input channels can be fed in parallel into a systolic neural network. A tensor array performs mathematical operations (such as, weighted summation using padding to effect a 1×1×1 filter to weight each input, followed by an activation function) to generate a single output for each of the 7 assigned pixels. For example, the fully connected layer can be a softmax layer configured to receive the output of the previous convolutional layer and identify a probability that each pixel belongs to a particular class. In this example, the worker is assigned to 7 nodes, and thus, this worker can generate 7 different output scores (one for each of seven pixels) based on the output of the previous convolutional layer. Other workers can be assigned to the remaining pixels such that the systolic neural network processor outputs a pixel-wise score for each pixel of the input image data.

Figure 5E:
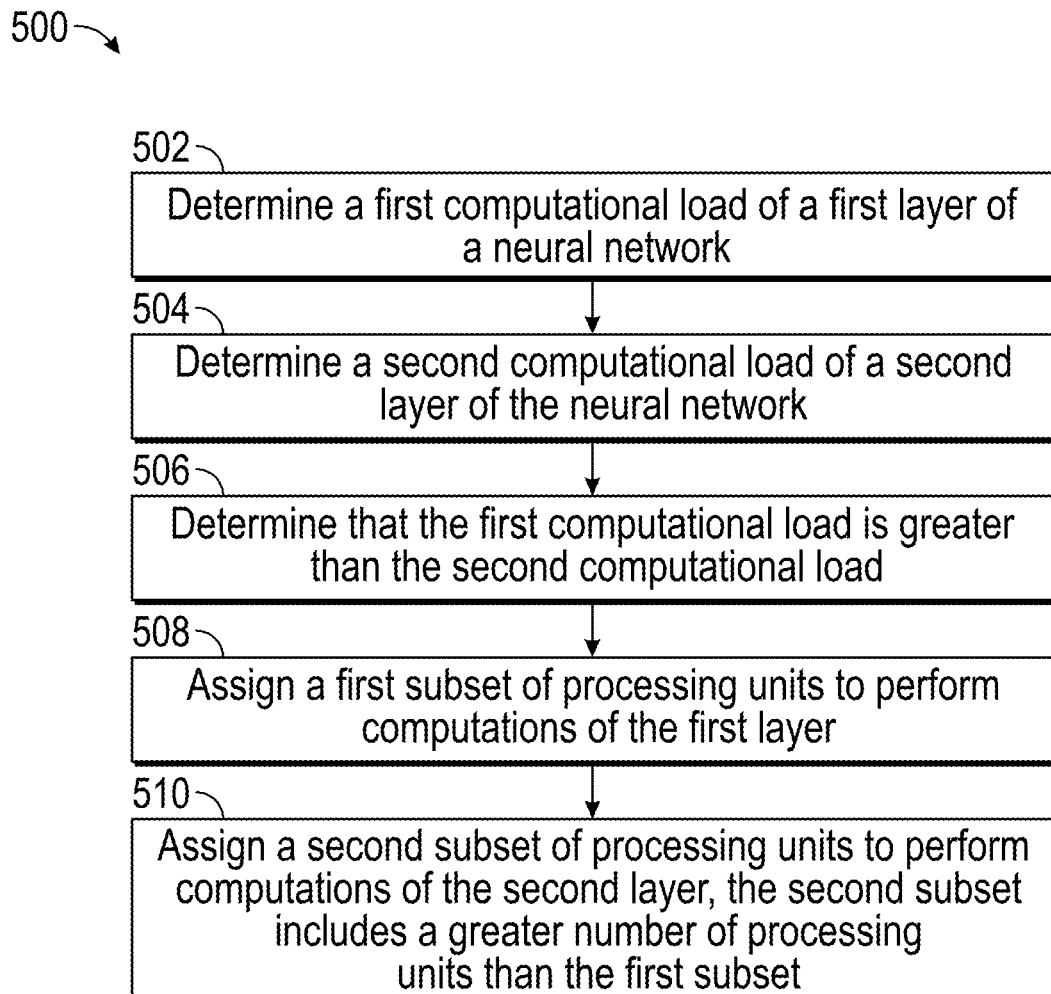
FIG. 5E illustrates an example flow diagram of a process for performing computations of a neural network including a first and second layer in accordance with some embodiments.

FIG. 5E illustrates an example flow diagram of a process 500 for performing computations of a neural network including a first and second layer in accordance with some embodiments. The process 500 can be performed by the control processor or controller. The process 500 can be implemented by a device configured to perform computations of a neural network, where the neural network can include a plurality of layers, such as at least first and second layers. The device can include an array of processing units each including processing circuitry and memory. The array of processing units can transmit data systolically between processing units. The device can include the controller to determine computational loads and assign processing units to perform computations of certain layers of the neural network.

At block 502, the process 500 can determine a first computational load of a first layer. For example, the first layer in Table 1 includes an activation count of 3,211,264 (224×224×64) with 3 input channels and a 3×3 mask, resulting in a computational load of 86,704,128 (3,211,264× 3×3×3).

At block 504, the process 500 can determine a second computational load of another layer of the neural network. For example, fourth layer includes an activation count of 1,605,632 (112×112×128) with 64 input channels and a 3×3 mask, resulting in a computational load of 924,844,032 (1,605,632×64×3×3).

At block 506, the process 500 can determine that the first computational load is greater than the second computational load. For example, the computational load for layer 1 is substantially smaller than the computational load for layer 4.

At block 508, the process 500 can assign a first subset of processing units to perform computations of the first layer. At block 510, the process 500 can assign a second subset of processing units to perform computations of the second layer, where the second subset includes a greater number of processing units than the first subset.

In some embodiments, the number of processing units assigned to a layer of the neural network is based on a proportion of the computational load of the layer to the computational load of one or more other layers of the neural network. For example, as shown in Table 2, the number of workers assigned to layer 4 is 5,978, whereas the number of workers assigned to layer 1 is 560. The number of workers assigned is substantially proportional to the associated computational load. The ratio of the computational load to the number of workers assigned for layer 1 is 154,828 (86,704, 128/560), whereas the ratio of the computational load to the number of workers assigned for layer 4 is 154,707 (924, 844,032/5,978). As illustrated in FIG. 5A, Conv1 (to the left of Conv2) is substantially smaller than Conv4, illustrating that the processing units on the processing chip assigned to Conv4 can take up more die space than the processing units of Conv1.

In some embodiments, processing power of the array of processing units can be different. In such cases, the process 500 and/or controller can assign processing units based on the processing power of the processing units. The process 500 and/or controller can proportionately assign the processing units according to the processing power and the computational load of the layer relative to the computational load of other layers in the neural network. Advantageously, the computations of the first and second layers can be performed at substantially the same time, or closer in time, than if an equal number of processing units were assigned to layers with varying computational loads. As an illustrative example, one layer that requires a high computational load may create a bottleneck for the neural network if the same number of processing units are assigned to each layer. For example, in Table 1, if an equal number of processing units were assigned to layer 1 and layer 4, then layer 1 may complete its computation before layer 4 and the output of layer 1 and possibly other layers with smaller computational loads may be idle until the output of layer 4 is computed. However if the number of processing units are assigned based on computational load, layer 1 and layer 4 may complete its computations at substantially the same time, and thus, the use of the computational resources are optimized by reducing idle time at each layer.

In addition, if a plurality of layers complete its computation at substantially the same time, the output of the plurality of layers can pulse the data to the next layer with minimal delay. Advantageously, the need to store output data of a previous layer and retrieve the data in a subsequent layer can be reduced and/or eliminated. Reducing and/or eliminating the need to store and retrieve data can significantly reduce power requirements of the processing chip.

In some embodiments, assigning the processing units to particular nodes of a layer include tagging the processing units with tag data, such as a tuple. In some embodiments, data can be systolically pulsed between neural network layers, and thus, the nodes of the subsequent layer can receive all output from the previous layer. Because multiple processing units can be assigned to each layer, each of the processing units can be assigned to perform a subset of the total computations for that layer. The tag data can be used by the processing unit to identify the relevant data from the previous layer to process for its assigned computations. For example, the identifying tuple can be in an example format: {layer #, row #, column #}. The identifying tuple can include a worker ID, a map ID, and/or the like. The tag data can include a layer number to identify the layer of the neural network the processing unit is assigned to and to align to the proper input channels to use the associated weights. The tag data can include one or more row numbers and/or column numbers where a memory element to be processed by the processing unit is located. The tag data can include a processing unit ID number (such as a worker ID number) to identify the processing unit. Although the embodiments in FIGS. 5A-5E may illustrate convolutional neural networks that process one or more images, the illustrated and described concepts can be used for any other type of neural network.

EXAMPLES OF COINCIDENCE MAPPING

Figure 6A:
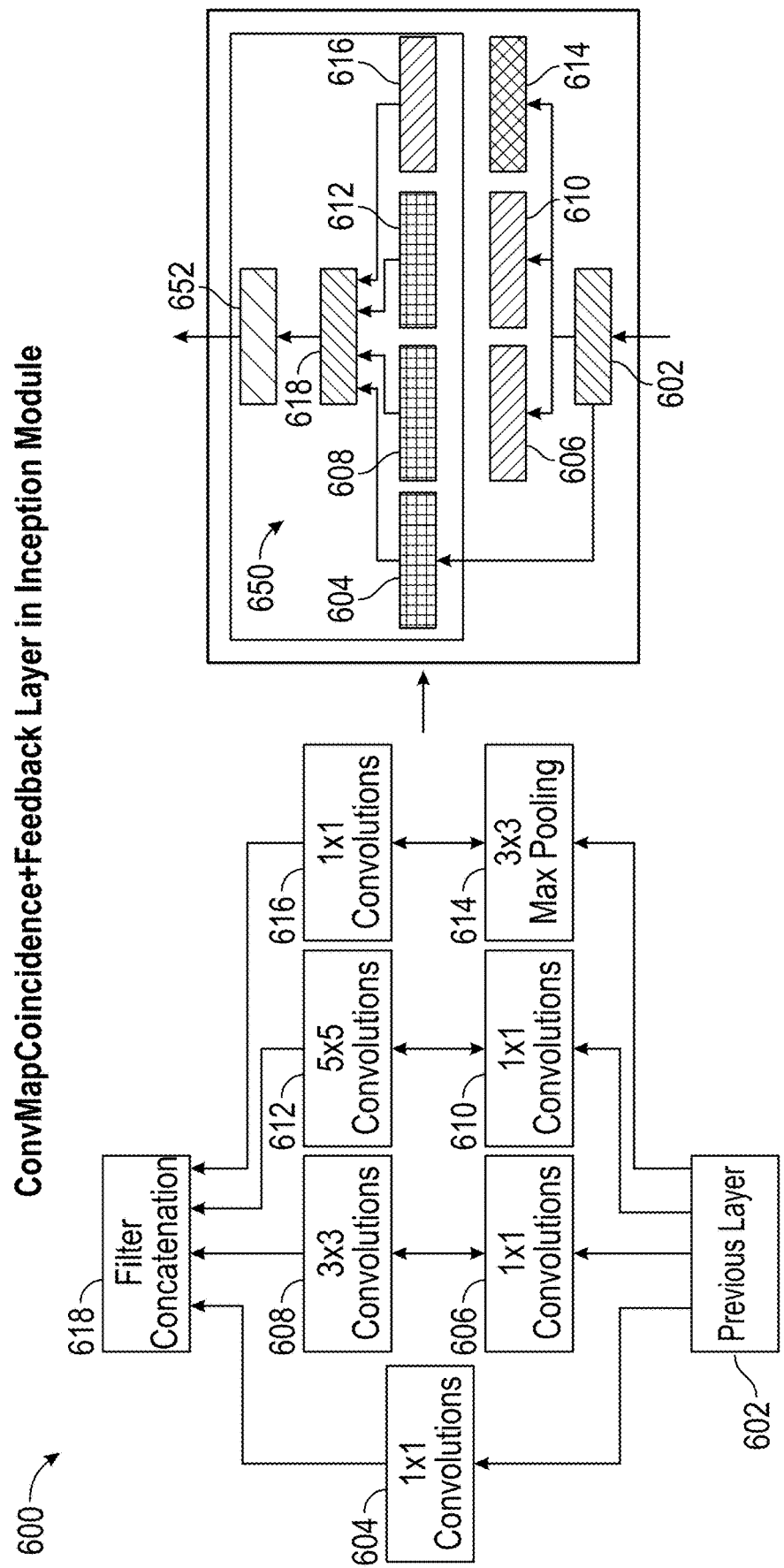
FIG. 6A illustrates a neural network with parallel convolutional layers in accordance with some embodiments.

In some embodiments, coincidence mapping can be used to reinforce certain nodes by looking for patterns across neural network layer, which can be convolutional layers. As described above, where pooled (such as, max pooled) values come from the same point or region within a filter across layers, this can indicate that the convolutional filters are successfully identifying the feature that they are designed to detect. As such, the weights of these nodes can be reinforced, for example by doubling the weights or multiplying them by another suitable number. TABLES 3A and 3B, and FIG. 6A illustrate an example of coincidence mapping across parallel convolutional layers according to some examples.

TABLE 3A

Coincidence Mapping Using Parallel Convolutional Layers

| Inception Module | Activation Size | | Activation Size | | Activation Size |
|---|---|---|---|---|---|
| Input | (28, 28, 192) | | | | |
| Conv1a (f = 1, s = 1, same) | (28, 28, 16) | Conv1b (f = 1, s = 1, same) | (28, 28, 96) | | |
| Conv2a (f = 5, s = 1, same) | (28, 28, 32) | Conv2b (f = 3, s = 1, same) | (28, 28, 128) | Conv2c (f = 1, s = 1, same) | (28, 28, 64) |
| Channel Concatnation | (28, 28, 256) | | | | |

TABLE 3B

Coincidence Mapping Using Parallel Convolutional Layers

| | Activation Size | Activation Count | Parameters to Learn |
|---|---|---|---|
| | | 150,528 | — |
| MaxPool (f = 3, s = 1, same) | (28, 28, 192) | 238,336 | 21,616 |
| Conv2d (f = 1, s = 1, same) | (28, 28, 32) | 200,704 | 142,080 |
| | | 200,704 | — |
| Total: | | 790,272 | 163,696 |

The convolutional layers can be used to detect particular patterns in the data. For example, convolutional layers can be used to detect an eye, a nose, or a mouth in a picture. In some circumstances, a smaller field of view (such as, a 1×1 convolution filter) can be more optimal at detecting a pattern. In others, a larger field of view (such as, a 5×5 convolutional filter) may be more optimal.

Traditional systems use convolutional layers and max pooling. The pooling layer often selects the maximum value out of the convolutional layer outputs. However, after performing max pooling, a lot of the original data can be reduced down and lost. For example, one convolutional filter may detect an eye whereas another convolution filter may detect a mouth. However, the mouth may be in one location and the eye may be in a location that does not correlate to a face. There may be more than one person in the picture, or the picture may be an abstract painting. Thus, there is an interest in not only detecting patterns, but looking at patterns in the context of the full data set.

Embodiments of systems and methods disclosed herein include having a plurality of convolutional filters in a single convolutional filter. Instead of selecting a particular field of view, the convolutional layer can include a plurality of convolutional filters (such as, for different fields of view) filtering the data in parallel. After the plurality of convolutional filters filter the data in parallel, the outputs of the parallel convolutional filters can be compared. For example, a convolution layer can identify an eye. Then in the next layer, the convolution layer can determine where on the face the eye should be located. If the location does not coincide, then the weighting of the previous layer can be reduced. In another example, if one convolution layer finds an eye and another convolutional layer finds a mouth in parallel, the next convolution layer can determine if the location of the mouth and the eye coincide relative to one another (such as, the mouth and the eye are located in a particular configuration such that the locations the mouth and eye coincide with a face). Then, the two previous convolutional layers can be reinforced (for example, increase the weightings in the two previous convolutional layers).

FIG. 6A illustrates a neural network 600 with parallel convolutional layers in accordance with some embodiments. The neural network can include a previous layer 602 that provides inputs to 4 parallel convolutional layers. The first convolutional layer can include a 1×1 convolutional filter 604. The second convolutional layer can include a 1×1 convolutional filter 606 and a 3×3 convolutional filter 608. The third convolutional layer can include a 1×1 convolutional filter 610 and a 5×5 convolutional filter 612. The fourth convolutional layer can include a 3×3 max pooling layer 614 and a 1×1 convolutional filter 616. Filter concatenation block 618 can concatenate the outputs of the four parallel convolutional layers.

A neural network 650 with parallel convolutional layers can include a coincidence mapping layer 652. The coincidence mapping layer 652 can accept the outputs of the four parallel convolutional layers, look for coincidences among the four parallel convolutional layers, and determine whether to change the weightings for each of the four parallel convolutional layers based on the coincidences found across two or more of the four parallel convolutional layers.

In some embodiments, the coincidence mapping layer 652 can determine coincidences by looking at fields of view and checking whether certain values are in similar areas of the fields of view. For example, if the neural network was looking for a mouth, the first convolution layer 604 may be looking in a 1×1 pixel grid, the second convolution layer 606 and 608 may be looking in a 3×3 pixel grid, the third convolution layer 610 and 612 may be looking in a 5×5 pixel grid, and the fourth convolutional layer 614 and 616 may be looking at a 1×1 pixel after a 3×3 max pooling. The coincidence mapping layer 652 may look to see if the mouth found in the second convolutional layer is in a similar location to the location of the third convolutional layer. For example, a mouth may have been found by the 3×3 and 5×5 field of view toward the middle bottom of the picture by the second and third convolutional layers, respectively. Then, the coincidence mapping layer 652 can reinforce the outputs of the second and third convolutional layers by increasing their weightings. In some embodiments, the coincidence mapping layer 652 compares the locations of a maximum value of two or more convolutional layers to determine coincidences. As such, the coincidence mapping layer 652 can allow for multiple levels of granularity in the detection of patterns for the same output. The analysis of activity across output maps created and concatenated by these layers provide for effective reinforcement of relevant layers.

In some embodiments, coincidence mapping can be applied to systolic neural networks, other neural networks, machine learning networks, and/or the like. Coincidence mapping can also be applied to other classifications including decision trees, semi-supervised expectation maximization functions, and other suitable machine learning models.

Figure 6B:
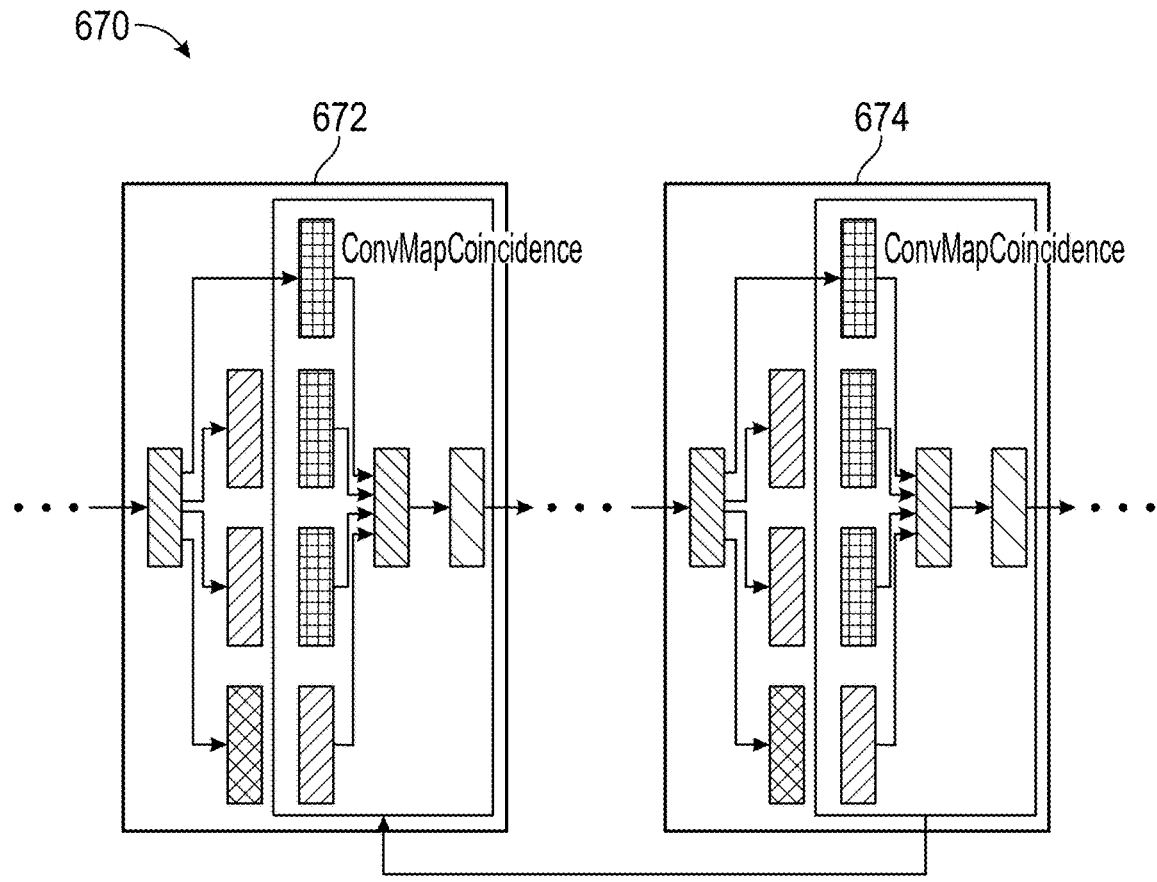
FIG. 6B illustrates a neural network 670 with parallel convolutional layers and reinforcement feedback in accordance with some embodiments.

FIG. 6B illustrates a neural network 670 with parallel convolutional layers and reinforcement feedback in accordance with some embodiments. The convolutional layer 672 can include parallel convolutional layers, such as the parallel convolutional layers described in FIG. 6A. The parallel convolutional layers can have different fields of view, and the coincidence mapping layer can reinforce the outputs of the convolutional layers. In a later stage of the neural network, another convolutional layer 674 can also include parallel convolutional layers, such as the parallel convolutional layers described in FIG. 6A. The coincidence mapping layer of the later (or subsequent) convolutional layer 674 can identify coincidences across different convolutional layers of the neural network, such as the convolutional layer(s) of 672. If a coincidence is found by the coincidence mapping layer, the later convolutional layer can reinforce the previous convolutional layer 672. Accordingly, the reinforcement of the coincidence mapping across convolutional layers can occur for different stages (such as, different convolutional layers) of the neural network.

As described above in FIG. 3B, the map coincidences can be used to determine the enhancement reinforcement feedback. In some embodiments, activation outputs that occur in similar areas across convolutional areas can be reinforced. In some embodiments, lower indication of patterns of one convolutional area that occur in similar areas of higher indications of patterns of another convolutional area can be determined to be a coincidence and reinforced.

In some embodiments, training modes can be used to train the map coincidence layer. For example, an image-correlated disturbance mode and/or a set-correlated enhancement mode can be used. The image-correlated disturbance mode can correlate disturbances to the image, and the enhancement can be seen as noise. Thus, the enhancement matrix may function on the activation outputs without a learned parameter, such that the enhancement matrix may not need learned parameters. In the set-correlated enhancement mode, the enhancement matrix can include one or more learned parameters. Even though the enhancement parameters are a function of the activation outputs, they become part of the learned parameters and are therefore related to the full training set.

Figure 6C:
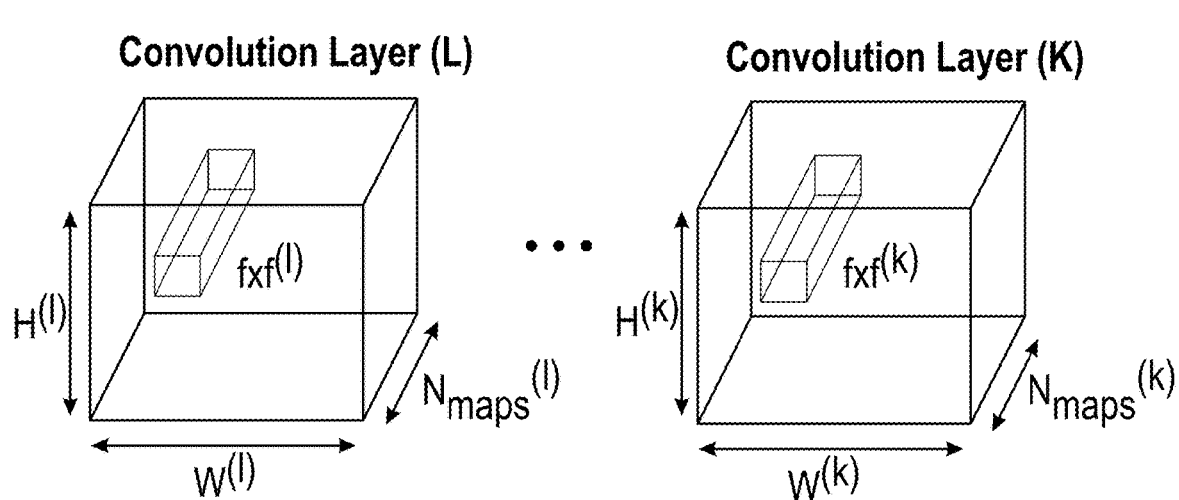
FIG. 6C illustrates coefficients in the enhancement matrix calculated by summing over corresponding positions across maps created by a convolutional layer in accordance with some embodiments.

FIG. 6C illustrates coefficients in the enhancement matrix calculated by summing over corresponding positions across maps created by a convolutional layer in accordance with some embodiments. For example, 1×1, 3×3, 5×5, and/or 7×7 masks can be used to define the granularity of clusters in the activation outputs. Strides can correspond to 1, 3, 5, and 7 pixels to avoid overlapping elements from neighboring mask volumes. The summation of all activation outputs for each mask across the maps can represent the level of coincidence in certain locations on the maps to detect a pattern across the maps. Each mask volume can produce one coefficient to be placed into the enhancement matrix. All the summation results in the enhancement matrix can be "softmaxed" so that no enhancement coefficient is larger than 1 and the sum of all of the enhancement coefficients is 1.

Figures 1, 6D:
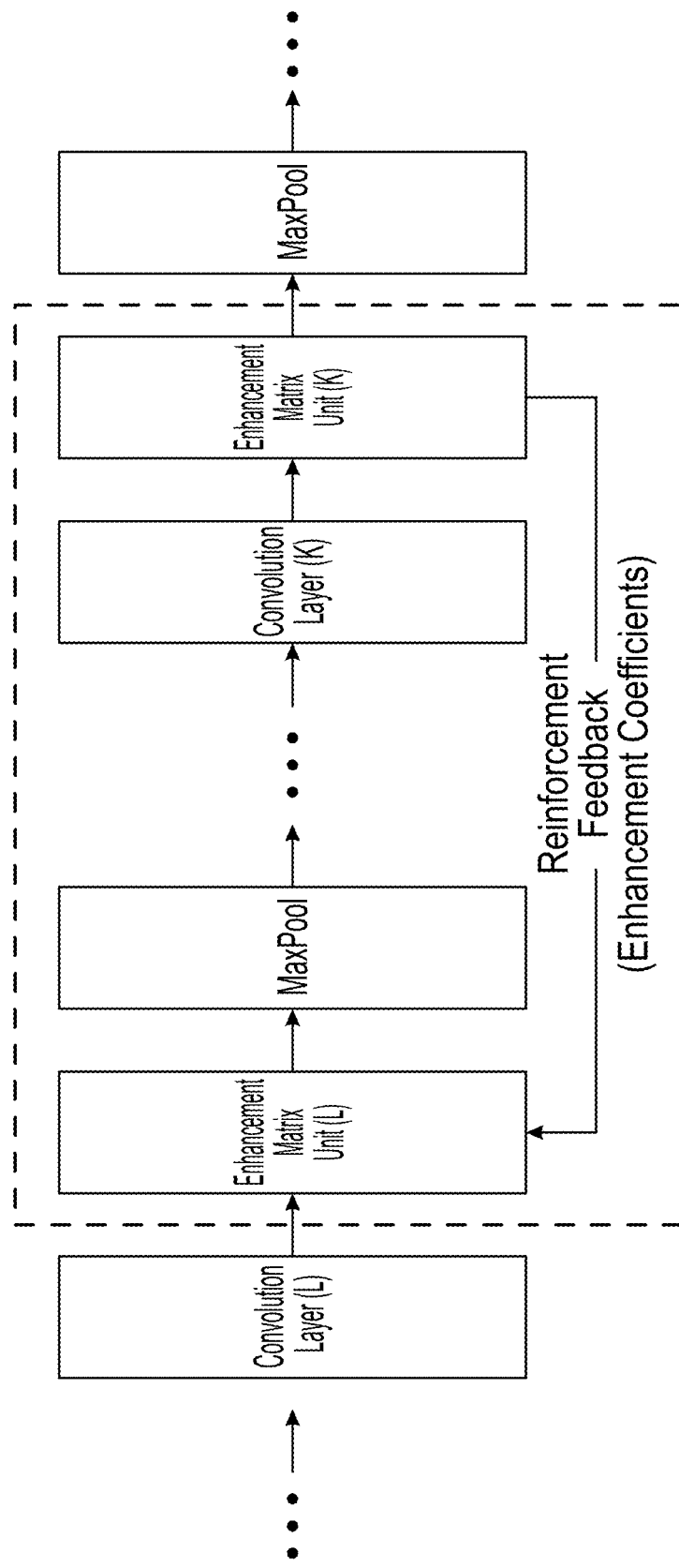
FIGS. 6D-1, 6D-2, and 6D-3 illustrate examples of an enhancement matrix unit in accordance with some embodiments.
Figures 2, 6D:
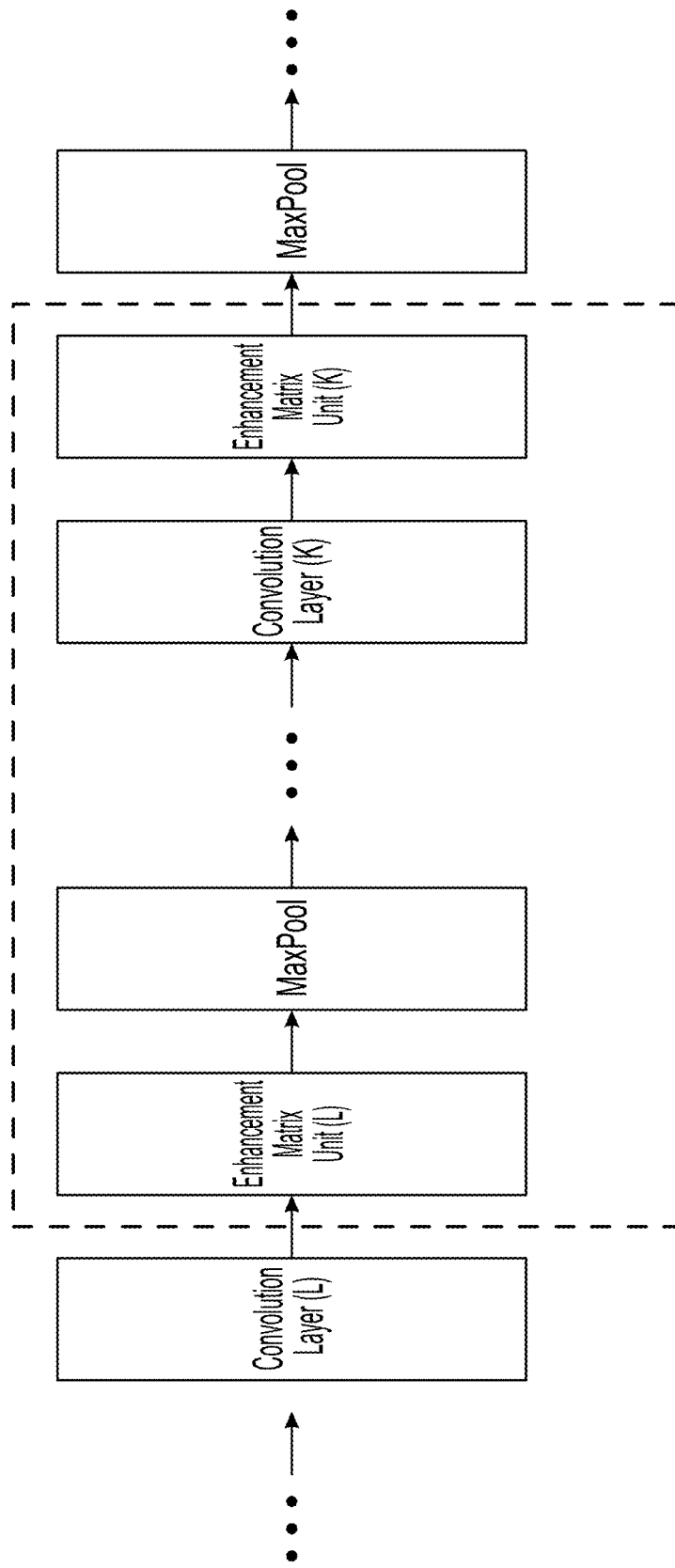
Figures 3, 6D:
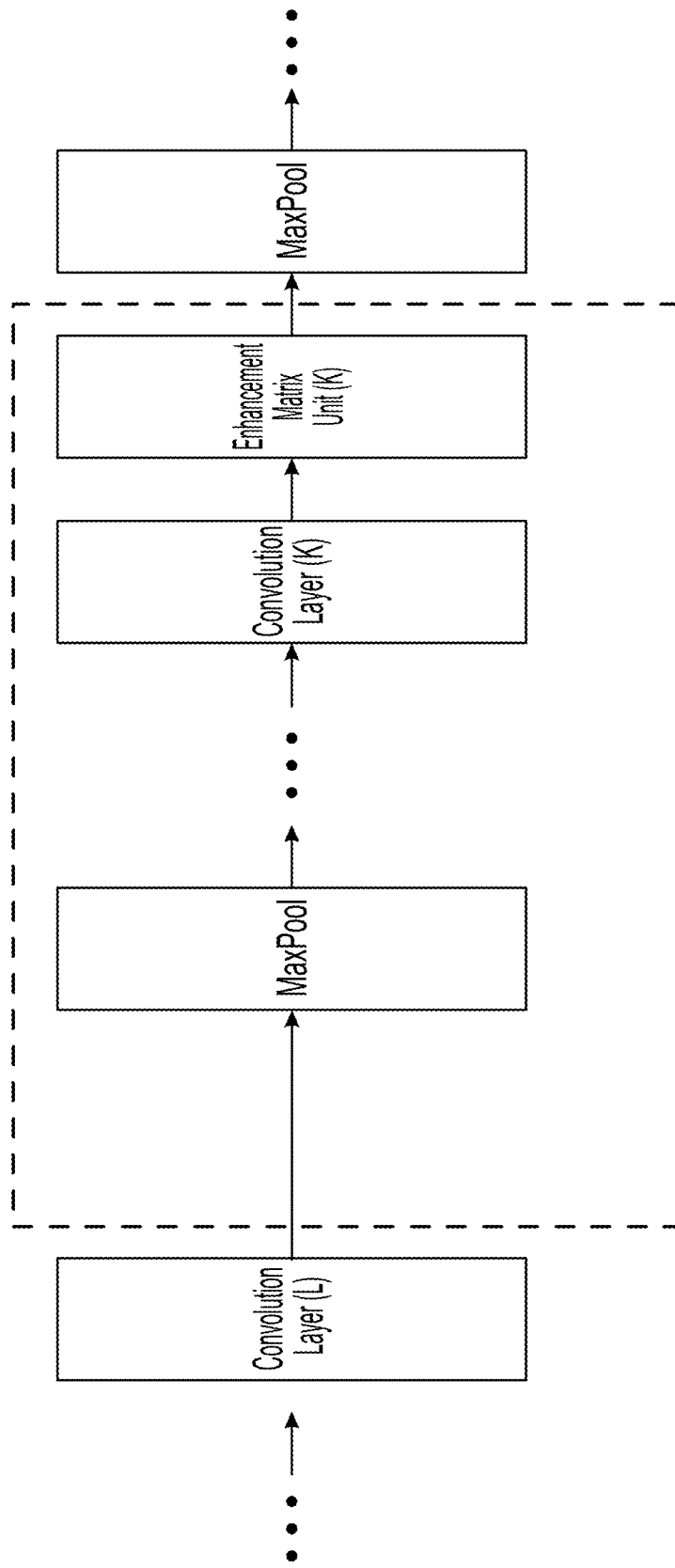

FIG. 6D-1, 6D-2, and 6D-3 illustrate examples of an enhancement matrix unit in accordance with some embodiments. FIG. 6D-1 illustrates two enhancement layers, both including outputs with the same height and width and feedback in accordance with some embodiments. The enhancement matrix unit on the left can compute enhancement coefficients, such as the example described in FIG. 6C and/or can store the enhancement coefficients (such as, in a cache). The enhanced output from the left convolutional layer can propagate toward the convolutional layer on the right. The enhancement matrix for the right convolutional layer can calculate its own enhancement coefficients. The coefficients from the right enhancement matrix unit can be sent back to the enhancement matrix unit on the left. Then, the convolutional layer on the left can use the additional coefficients received from the right to enhance its own output. Advantageously, the enhancement coefficients can reinforce coincidences across different levels of pattern recognition at different stages of the neural network. For example, if the convolutional layer on the left detects "noses" and "eyes" and the convolutional layer on the right detects a "face," the feedback can reinforce the convolutional layers when the "noses" and "eyes" are in positions consistent with a "face." FIG. 6D-2 illustrates two enhancement layers without feedback in accordance with some embodiments. FIG. 6D-3 illustrates one enhancement layer in accordance with some embodiments.

As described in the above including FIGS. 6A-6D, a single iterative loop for the enhancement matrix reinforcement feedback can be used. In some embodiments, a plurality of iterative loops can be used for the enhancement matrix reinforcement. The number of iterations continues in some implementations until there is no more substantial changes in the enhanced output from the second convolution layer. Some embodiments can use multiple feedback from different enhancement matrices attached to other deeper convolutional layers.

Figure 6E:
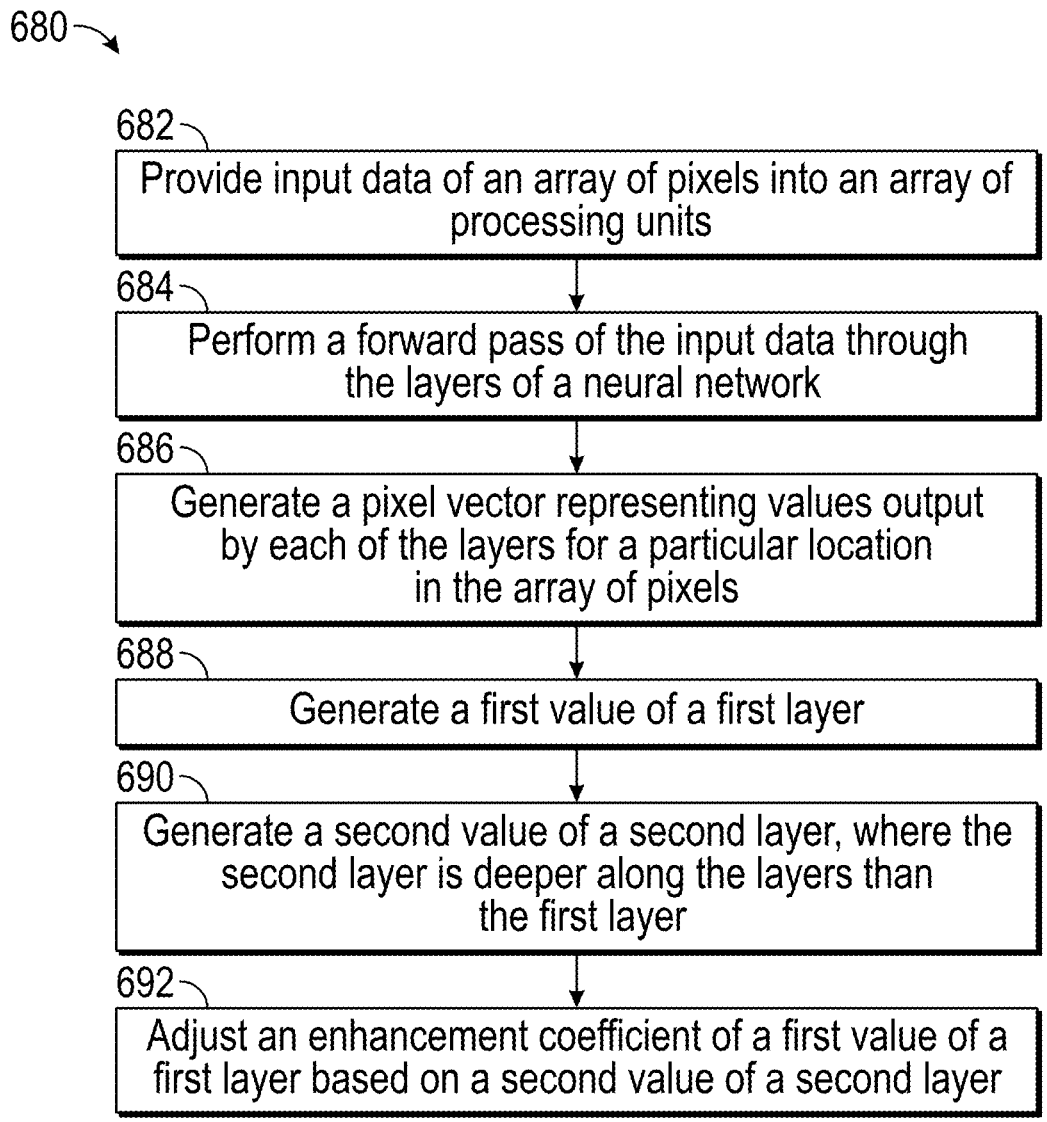
FIG. 6E illustrates an example flow diagram of a process for training a convolutional neural network comprising a plurality of layers in accordance with some embodiments.

FIG. 6E illustrates an example flow diagram of a process 680 for training a convolutional neural network comprising a plurality of layers in accordance with some embodiments. The process 680 can be performed by the control processor or controller. The process 680 can be implemented on a device for training the convolutional neural network that can include an array of processing units each including processing circuitry and memory, and the controller. The array of processing units can transmit data systolically between particular processing units. The controller can provide input data of an array of memory units, such as pixels, to the neural network, perform forward pass of the input data through the plurality of layers, generate a pixel vector representing values output by each of the layers for a particular location in the array of pixels, and adjust an enhancement coefficient based on the pixel vector.

At block 682, the process 680 can provide input data representing an image into an array of processing units. The image can include an array of pixels.

At block 684, the process 680 can perform and/or can initiate the performance of a forward pass of the input data through the layers of the neural network.

At block 686, for a particular location in the array of pixels, the process 680 can generate a pixel vector representing values output by each of the plurality layers for that particular location. The pixel vector can include a first value generated by a first layer of the plurality of layers and a second value generated by a second layer of the plurality of layers, where the second layer is deeper along the plurality of layers of the convolutional network than the first layer.

At block 692, the process 680 can adjust an enhancement coefficient of the first value of the first layer based on the second value of the second layer. Adjusting the enhancement coefficient can include increasing the weighting for the particular location based on finding a correspondence and/or decreasing the weighting for the particular location based on not finding a correspondence. Adjusting the enhancement coefficient can be based on image-correlated disturbance mode training by correlating disturbances to the image without a learned parameter and/or based on set-correlated enhancement mode training using one or more learned parameters.

Adjusting the enhancement coefficient can include computing the enhancement coefficient via an enhancement matrix by summing over corresponding positions across the maps using masks of different volumes, each mask volume producing one coefficient to be placed in an enhancement matrix. The mask volumes can include a 1×1, 3×3, 5×5, and/or 7×7 mask.

The process 680 can identify a correspondence based on the identification of similar values occurring at similar pixel locations. The process 680 can then adjust the first value based on the enhancement coefficient to generate an adjusted output value, and provide the adjusted output value to the second layer.

Figure 6F:
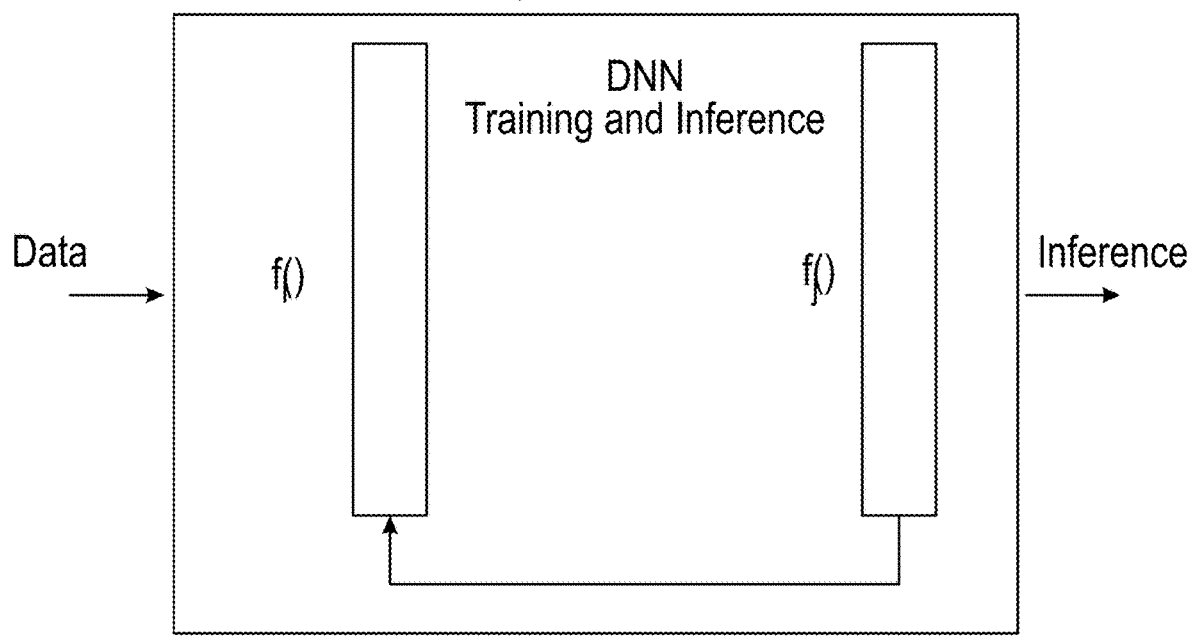
FIG. 6F illustrates an example block diagram of a single feedback in accordance with some embodiments.
Figure 6G:
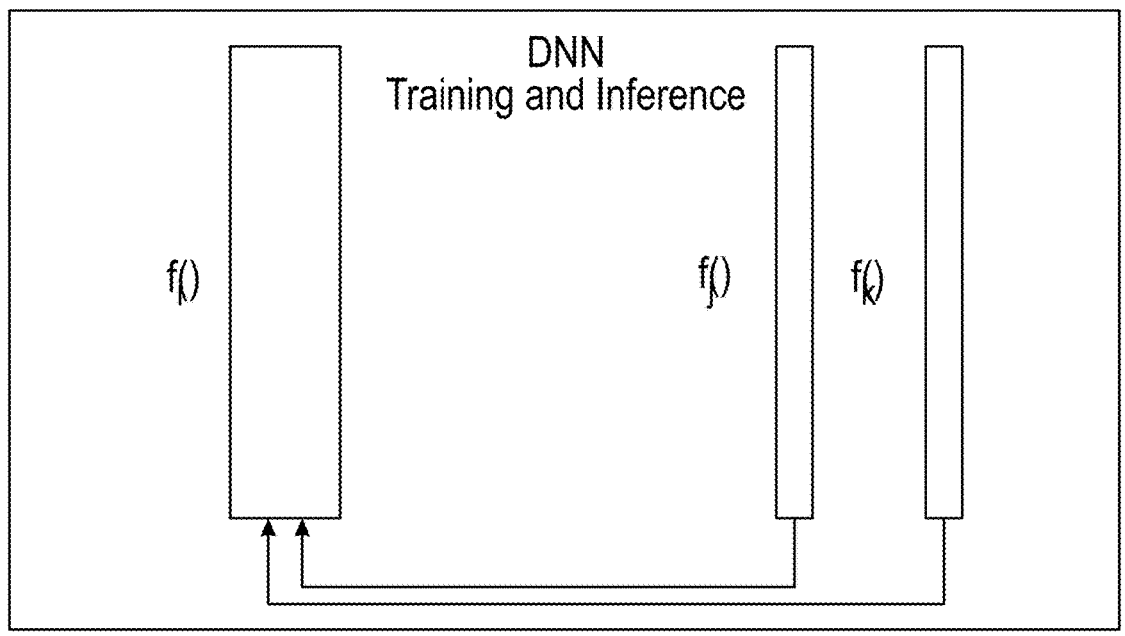
FIG. 6G illustrates an example block diagram of more than one feedback in accordance with some embodiments.

FIG. 6F illustrates an example block diagram of a single feedback in accordance with some embodiments. FIG. 6G illustrates an example block diagram of more than one feedback in accordance with some embodiments. Additional map-coincidence layers can be used to filter and reinforce more relevant activation signals across maps after a particular convolution layer. The feedback can be used to reinforce coincidences at higher level patterns, such as patterns detected at deeper layers of the neural network, based on low level patterns detected at shallower layers.

Figure 6H:
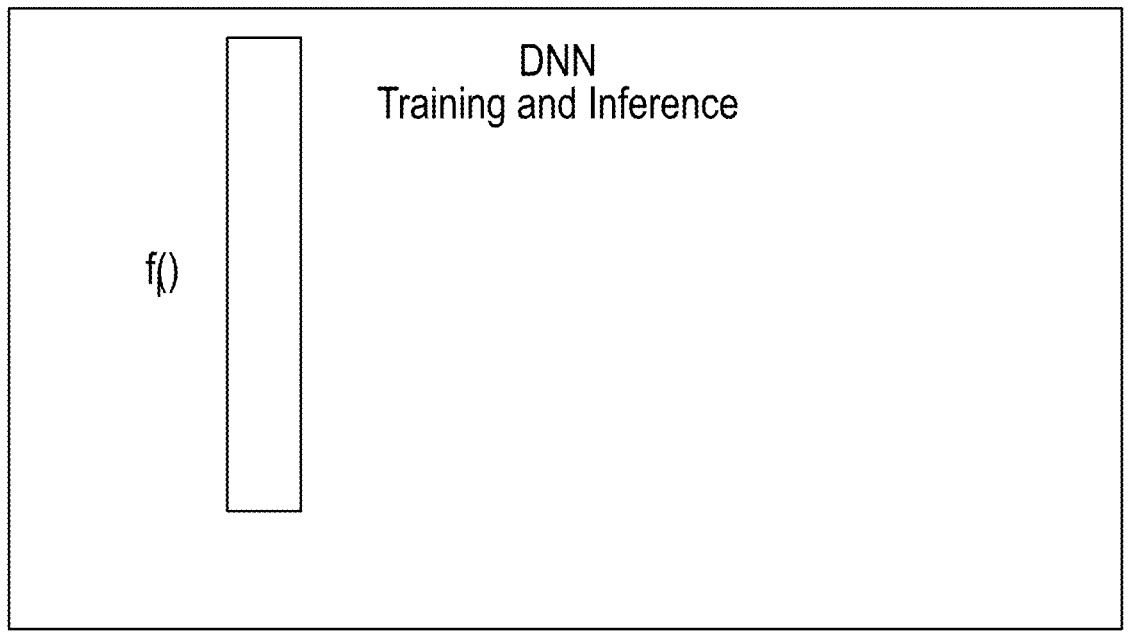
FIG. 6H illustrates an example block diagram of a single map-coincidence in accordance with some embodiments.
Figure 6I:
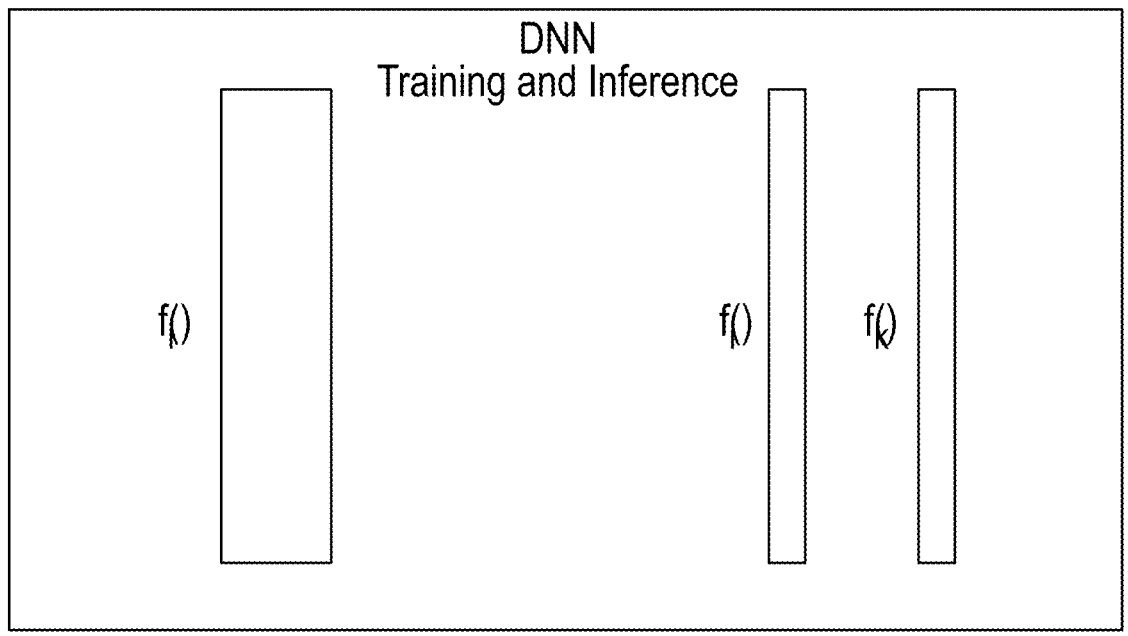
FIG. 6I illustrates an example block diagram of more than one map coincidence in accordance with some embodiments.

FIG. 6H illustrates an example block diagram of a single map-coincidence in accordance with some embodiments. FIG. 6I illustrates an example block diagram of more than one map coincidence in accordance with some embodiments. The single or multiple map-coincidence layers can be used to perform specific transformations on the activation output of the preceding layer. These transformations can occur randomly for each data presented during the training of the neural network. For example, a high capacity neural network with a relatively low number of training data sets can become ineffective in training the neural network. However, randomly turning on and/or off neurons in the layer can improve the performance of the training of the neural network. Such randomization can create scenarios of stretched, scaled, rotated, and/or translated versions of datasets already used to train the neural network. Thus, the neural network can also be trained to look for such augmented versions of input data.

Although the embodiments in FIGS. 6A-6I may illustrate convolutional neural networks that process one or more images, the illustrated and described concepts can be used for any other type of neural network.

Execution Environment

Figure 7:
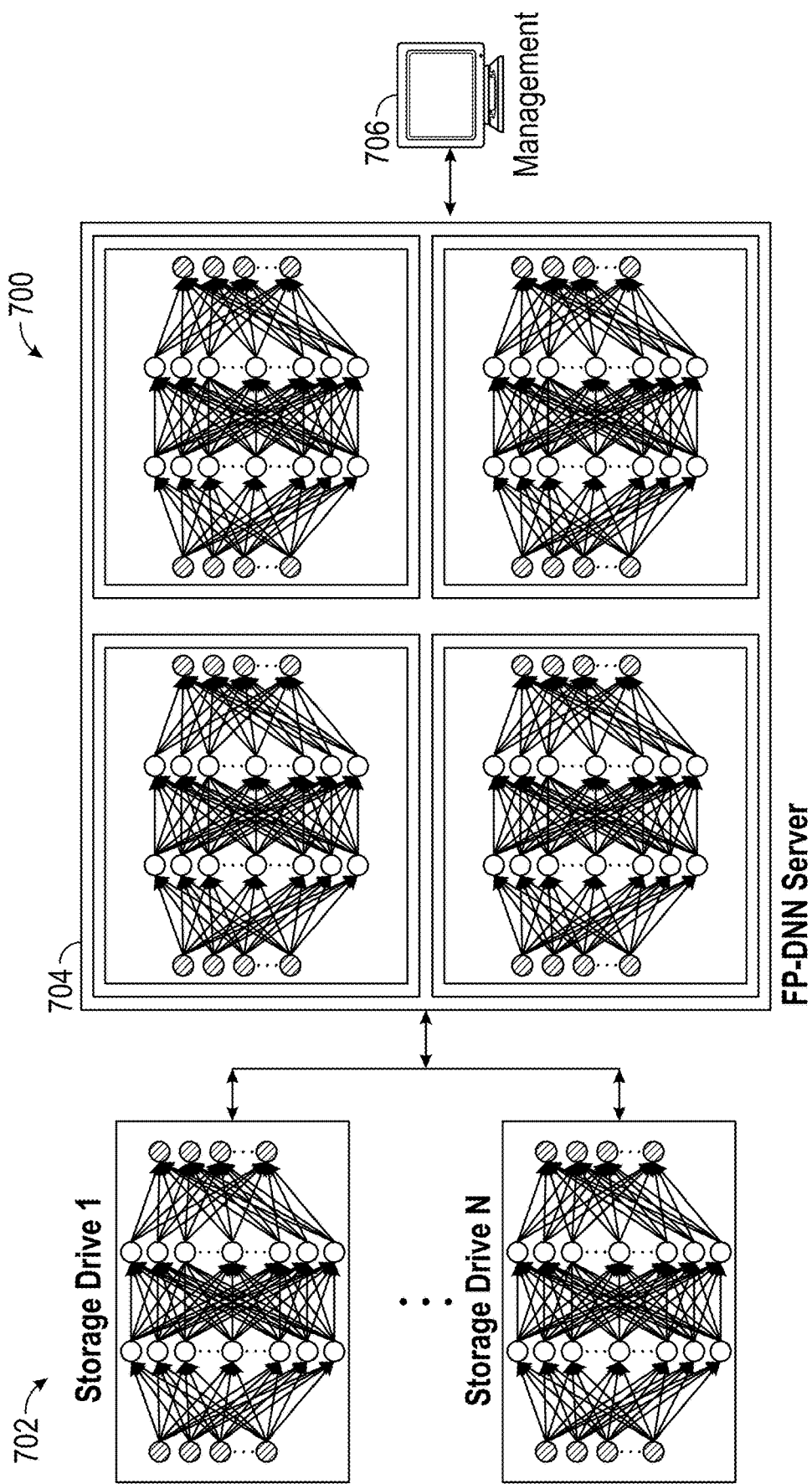
FIG. 7 illustrates an example system architecture for applications with large scale deployment of systolic neural network engine in accordance with some embodiments.

FIG. 7 illustrates an example system architecture 700 for applications with large scale deployment of systolic neural network engine in accordance with some embodiments. Storage devices that can be distributed in datacenters can include small versions of a systolic neural network engines. Large datasets from several storage devices can be processed by a larger systolic neural network engine in a server with multiple large size systolic neural networks. The systolic neural network engine can receive input specifying characteristics of the desired neural network, such as a number of inputs, a number of hidden layers, the types of layers, the number of nodes on each layer, non-linearity of the layers, the number of outputs, and hyperparameters for learning on the targeted neural network. The systolic neural network engine can compile this information and create a model file to be sent to each field programmable neural network in the server. Within each field programmable neural network, a control processor (not shown) can inform each worker of its identity, defining the behavior of each worker, such as the kinds of processes to be performed, the filters to be implemented, how many map pixels to construct, and/or which data from the previous layer to use for processing. The control processor can comprise of one or more local processors and/or one or more remote processors. For example, the control processor can include a processor in a memory device, a data center, a cloud network, and/or a server. The control processor can include software and/or firmware implementations. Very large datasets can be distributed among several drives and very large DNNs can be realized in multi-chip systolic neural network engine servers 704. Storage drives 702 can be equipped with smaller systolic neural network engine chips for pre-screening subsets of dataset. User's management computer 706 can pushed model configuration files onto the servers 704 and onto each storage drive 702.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The control processor can synthesize a model for an FPGA. For example, the control processor can synthesize a model for logical programmable gates to implement a tensor array and/or a pixel array. The control channel can synthesize a model to connect the tensor array and/or pixel array on an FPGA, a reconfigurable chip and/or die, and/or the like. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A device for performing computations of a convolutional neural network, the device comprising:
   a processing chip including:
      a first arrangement of a plurality of tensor arrays;
      a second arrangement of a plurality of memory cells;
      a plurality of interconnects connecting particular ones of the tensor arrays to particular ones of the memory cells;
   a computer-readable memory storing instructions for configuring the processing chip to perform computations of the convolutional neural network; and
   a controller configured by the instructions to:
      determine, for a particular layer of the convolutional neural network, a number of input channels and a number of output maps generated for particular ones of a plurality of pixels;
      configure a portion of the processing chip into a plurality of processing units, wherein a particular processing unit performs computations associated with a particular one of the plurality of pixels; and
      wherein individual ones of the plurality of processing units each includes:
         a number of the tensor arrays determined based on the number of input channels;
         a number of memory cells corresponding to the number of output maps; and a number of interconnects connecting the number of tensor arrays of the processing unit to the number of memory cells of the processing unit; and assign the plurality of processing units to perform computations of the particular layer.

2. The device of claim 1, wherein the device is configured to provide input into the processing chip, wherein a corresponding one of the processing units is configured to perform the computations of the particular layer for individual ones of the plurality of pixels using the number of tensor arrays and to store output using the number of memory cells, the device further configured to provide an output of the processing chip as an output of the convolutional neural network.

3. The device of claim 1, wherein within each processing unit of the plurality of processing units, the tensor arrays of the number of tensor arrays are configured to send output data to corresponding ones of the number of memory cells over the number of interconnects.

4. The device of claim 1, wherein a default processing unit includes one tensor array and one memory cell connected to one another by one interconnect, and wherein the default processing unit has capacity to process one channel and generate one output.

5. The device of claim 4, wherein the controller is further configured by the instructions to:

determine that the number of input channels for a particular one of the plurality of pixels in the particular layer exceeds the capacity of the default processing unit; and reconfigure a corresponding one of the plurality of processing units to add at least one tensor array to the corresponding processing unit from one or more adjacent processing units of the plurality of processing units to increase the number of input channels for the corresponding processing unit to the number of input channels for the particular one of the plurality of pixels.

6. The device of claim 4, wherein the controller is further configured by the instructions to:

determine that the number of output maps generated for a particular one of the plurality of pixels in the particular layer exceeds the capacity of the default processing unit, and configure a corresponding one of the plurality of processing units to combine the memory cells of multiple default processing units while using less than all of the tensor arrays of the plurality of processing units.

7. The device of claim 1, wherein at least one tensor array of the plurality of tensor arrays includes circuitry to perform a single multiplication operation.

8. The device of claim 1, wherein at least one tensor array of the plurality of tensor arrays includes circuitry to perform a plurality of multiplication operations.

9. The device of claim 1, wherein the controller is further configured by the instructions to configure the processing chip into a plurality of processing units that collectively perform the computations of multiple layers of the convolutional neural network.

10. The device of claim 9, wherein the plurality of processing units form an array, wherein the array comprises a plurality of systolic transfer structures to systolically transfer output maps generated by a first subset of the processing units for one layer of the convolutional neural network to a second subset of processing units assigned to a next layer of the convolutional neural network.

11. A method for performing computations of a neural network, the method comprising:

determining, for a particular layer of the neural network, a number of input channels and a number of output maps generated for particular ones of a plurality of pixels;

configuring a portion of a processing chip into a plurality of processing units, wherein the processing chip includes a plurality of tensor arrays and a plurality of memory cells, wherein a particular processing unit performs computations associated with a particular one of the plurality of pixels; and wherein individual ones of the plurality of processing units each includes:

a number of the tensor arrays determined based on the number of input channels, a number of memory cells corresponding to the number of output maps; and a number of interconnects connecting the number of tensor arrays of the processing unit to the number of memory cells of the processing unit; and assigning the plurality of processing units to perform computations of the particular layer.

12. The method of claim 11, further comprising:

providing input into the processing chip to perform the computations of the particular layer for individual ones of the plurality of pixels using the number of tensor arrays and to store output using the number of memory cells, and providing an output of the processing chip as an output of the neural network.

13. The method of claim 11, wherein within each processing unit of the plurality of processing units, the method further comprises sending, by the tensor arrays of the number of tensor arrays, output data to corresponding ones of the number of memory cells over the number of interconnects connecting particular ones of the tensor arrays to particular ones of the memory cells.

14. The method of claim 11, wherein a default processing unit includes one tensor array and one memory cell connected to one another by one interconnect connecting the one tensor array to the one memory cell, and wherein the method further comprises processing one channel and generating one output using the default processing unit.

15. The method of claim 14, wherein the method further comprises:

determining that the number of input channels for a particular one of the plurality of pixels in the particular layer exceeds a capacity of the default processing unit, and reconfiguring a corresponding one of the plurality of processing units to add at least one tensor array to the corresponding processing unit from one or more adjacent processing units of the plurality of processing units to increase the number of input channels for the corresponding processing unit to the number of input channels for the particular one of the plurality of pixels.

16. The method of claim 14, wherein the method further comprises:

determining that the number of output maps generated for a particular one of the plurality of pixels in the particular layer exceeds a capacity of the default processing unit, and configuring a corresponding one of the plurality of processing units to combine the memory cells of multiple default processing units while using less than all of the tensor arrays of the plurality of processing units.

17. A controller comprising one or more processors configured to:
- determine, for a particular layer of a neural network, a number of input channels and a number of output maps generated for particular ones of a plurality of pixels;
- configure a portion of a processing chip into a plurality of processing units, wherein the processing chip includes a plurality of tensor arrays and a plurality of pixel arrays, wherein a particular processing unit performs computations associated with a particular one of the plurality of pixels; and wherein individual ones of the plurality of processing units each includes:
  - a number of the tensor arrays determined based on the number of input channels;
  - a number of pixel arrays corresponding to the number of output maps; and
  - a number of interconnects connecting the number of tensor arrays of the processing unit to the number of pixel arrays of the processing unit; and
- assign the plurality of processing units to perform computations of the particular layer.

18. The controller of claim 17, wherein the one or more processors are further configured to:
- provide input into the processing chip to perform the computations of the particular layer for individual ones of the plurality of pixels using the number of tensor arrays and to store output using the number of pixel arrays, and
- provide an output of the processing chip as an output of the neural network.

19. The controller of claim 17, wherein within each processing unit of the plurality of processing units, the one or more processors are further configured to cause to send, by the tensor arrays of the number of tensor arrays, output data to corresponding ones of the number of pixel arrays over the number of interconnects connecting particular ones of the tensor arrays to particular ones of the pixel arrays.

20. The controller of claim 17, wherein a default processing unit includes one tensor array and one pixel array connected to one another by one interconnect connecting the one tensor array to the one memory cell for processing one channel and generating one output, and wherein the one or more processors are further configured to:
- determine that the number of input channels for a particular one of the plurality of pixels in the particular layer exceeds a capacity of the default processing unit; and
- reconfigure a corresponding one of the plurality of processing units to add at least one tensor array to the corresponding processing unit from one or more adjacent processing units of the plurality of processing units to increase the number of input channels for the corresponding processing unit to the number of input channels for the particular one of the plurality of pixels, wherein the controller performs the operations by computer executable instructions stored in a non-transitory computer-readable medium.

* * * * *